(12) United States Patent
Kijima et al.

(10) Patent No.: US 6,230,084 B1
(45) Date of Patent: May 8, 2001

(54) VEHICLE CHARACTERISTIC CHANGE SYSTEM AND METHOD

(75) Inventors: Takao Kijima, Hiroshima; Shin Takehara, Higashi-Hiroshima; Shigerumi Hirabayashi; Tomoko Nagata, both of Hiroshima; Hiroshi Ohmura, Hatsukaichi; Tetsuya Tachihata, Hiroshima; Kiyoshi Sakamoto; Tomoji Izumi, both of Hatsukaichi, all of (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 09/655,281

(22) Filed: Sep. 5, 2000

Related U.S. Application Data

(62) Division of application No. 09/013,302, filed on Jan. 26, 1998, now abandoned, which is a continuation of application No. 08/450,662, filed on May 30, 1995, now abandoned, which is a continuation of application No. 08/084,723, filed on Jul. 1, 1993, now abandoned.

(30) Foreign Application Priority Data

| Jul. 1, 1992 | (JP) | 4-174385 |
| Oct. 28, 1992 | (JP) | 4-314136 |
| Oct. 28, 1992 | (JP) | 4-314137 |
| Oct. 28, 1992 | (JP) | 4-314138 |
| Jan. 7, 1993 | (JP) | 5-018018 |
| Feb. 16, 1993 | (JP) | 5-051406 |

(51) Int. Cl.[7] .................................................. G06F 17/00
(52) U.S. Cl. ................................. 701/1; 701/36; 701/49; 307/10.4; 307/10.5
(58) Field of Search .................................. 701/1, 35, 36, 701/49, 58, 59; 307/9.1, 10.1, 10.4, 10.5, 10.7; 340/825.15, 825.31, 825.34; 235/375, 376, 380, 382, 382.5

(56) References Cited

U.S. PATENT DOCUMENTS

| 4,439,824 | * | 3/1984 | Mayer ..................................... 700/30 |
| 4,453,957 | * | 6/1984 | Friedman et al. .................... 600/300 |
| 4,477,874 | * | 10/1984 | Ikuta et al. ............................. 701/49 |
| 4,707,788 | * | 11/1987 | Tashiro et al. .......................... 701/49 |
| 4,716,458 | * | 12/1987 | Heitzman et al. .................... 348/115 |
| 4,814,896 | * | 3/1989 | Heitzman et al. ...................... 386/95 |
| 5,091,856 | * | 2/1992 | Hasegawa et al. .................... 701/36 |
| 5,162,997 | * | 11/1992 | Takahashi ................................ 701/1 |
| 5,285,523 | * | 2/1994 | Takahashi ............................. 706/20 |

FOREIGN PATENT DOCUMENTS 3-44029 * 7/1991 (JP).
5-112158 * 5/1993 (JP).

* cited by examiner

Primary Examiner—William A. Cuchlinski, Jr.
Assistant Examiner—Edward Pipala
(74) Attorney, Agent, or Firm—Martin Fleit; Fleit Kain Gibbons Gutman & Bongini

(57) ABSTRACT

A vehicle characteristic change system including characteristic information forming device for forming a characteristic information with which characteristics of an object vehicle are changed, information entry device for entering the characteristic information into the object vehicle, characteristic change device for changing the characteristics of the object vehicle in accordance with the characteristic information formed by the characteristic information forming means. Characteristics of a vehicle can be readily changed to meet a driver's taste, driving condition, driving circumstances and the like with compact system and low cost.

42 Claims, 75 Drawing Sheets

FIG. 8

| CTRL DATA | ACS | ABS | VGR | 4WS | TRC | EGC | PSC |
|---|---|---|---|---|---|---|---|
| A1 | 4 | 5 | 5 | 5 | 1 | 1 | 1 |
| A2 | 1 | 5 | 5 | 5 | 2 | 2 | 2 |
| A3 | 2 | 4 | 4 | 4 | 3 | 3 | 3 |
| A4 | 3 | 3 | 3 | 3 | 5 | 5 | 3 |
| A5 | 4 | 1 | 1 | 1 | 5 | 3 | 5 |
| A6 | 1 | 3 | 1 | 1 | 1 | 1 | 5 |
| A7 | 5 | 2 | 2 | 2 | 5 | 5 | 5 |
| B3 | 1 | 5 | 5 | 5 | 2 | 1 | 2 |

FIG. 9

| PROGRAM | TERRAIN | ACS | ABS | VGR | 4WS | TRC | EGC | PSC |
|---|---|---|---|---|---|---|---|---|
| C1 | FREQUENT UP AND DOWN | L | H | L | L | L | — | L |
| C2 | ABRUPT CURVE | H | L | H | H | L | H | L |
| C3 | STEEP SLOPE | — | — | — | — | H | H | — |

L … LOW VALUE
H … HIGH VALUE

FIG. 10

| PROGRAM | OPERATION | ACS | ABS | VGR | 4WS | TRC | EGC | PSC |
|---|---|---|---|---|---|---|---|---|
| D1 | HIGH VEHICLE SPEED | H | L | L | L | L | H | H |
| D3 | HIGH STEER SPEED | H | — | H | H | — | — | H |
| D4 | GREAT YAWRATE CHANGE SPEED | H | — | H | H | — | — | H |
| D4 | GREAT YAWRATE CHANGE | H | — | L | L | — | — | H |
| D5 | HIGH ACCELERATION SPEED | H | H | — | — | L | H | — |
| D5 | HIGH BRAKING SPEED | H | — | — | — | — | — | — |
| D5 | HIGH CLUTCH OPERATION SPEED | H | — | — | — | L | H | — |
| D6 | HIGH SHIFTLEVER OPERATION SPEED | H | — | — | — | L | H | — |
| D2 | BRAKING PLACE, ACS, ABS ··· H | | | | | | | |
| D7 | MANUAL SWITCH OPERATION ··· CONTROL GAIN COMPENSATION | | | | | | | |

FIG. 11

| PROGRAM | CIRCUMSTANCE, OPERATION | ACS | ABS | VGR | 4WS | TRC | EGC | PSC |
|---|---|---|---|---|---|---|---|---|
| E 1 | NIGHT | L | H | L | L | L | L | L |
| E 2 | BAD TRAFFIC | H | H | H | H | L | L | L |
| E 3 | WIPER | L | H | L | L | L | L | H |
| E 4 | LONG DRIVE | L | H | L | L | L | L | L |
| E 5 | HIGH STEER SPEED | H | — | H | H | — | — | H |
| E 5 | HIGH ACCELERATION SPEED | H | — | — | — | — | H | — |
| E 5 | HIGH BRAKING SPEED | H | H | — | — | — | — | — |
| E 6 | UNSTABLE RUNNING | H | H | L | L | L | L | H |
| E 7 | MANUAL SWITCH OPERATION ··· CONTROL GAIN COMPENSATION | | | | | | | |

FID.35

FID.43

FIG.62

| FIRST PATTERN DATA ITEM |
|---|

A. DRIVER (「0」or「1」)

| (1) SEX | ☐ MALE | ☐ FEMALE | | |
| --- | --- | --- | --- | --- |
| (2) AGE | ☐ ~20 | ☐ 21~30 | ☐ 31~50 | ☐ 51~ |
| (3) EXPERIENCE | ☐ LESS THAN ONE YEAR | ☐ LESS THAN FIVE YEARS | ☐ FIVE YEARS OR MORE | |
| (4) NUMBER | ☐ ONE | ☐ TWO OR MORE OTHERS | | |
| (5) USE | ☐ OWNER | | ☐ OTHERS | |

B. CIRCUMSTANCE

| (1) TEMP. | ☐ COLD | ☐ NON-COLD (「0」or「1」) | | |
| --- | --- | --- | --- | --- |
| (2) AREA | ☐ CITY | ☐ SUBURBAN | ☐ RURAL | ☐ MOUNTAIN |
| (3) HEIGHT | ☐ 500m~ | ☐ 300~500m | ☐ 100~300m | ☐ ~100m |

C. USE

| (1) PURPOSE | ☐ COMMUTE | ☐ LEISUR | ☐ SHOPPING | ☐ BUSINESS |
| --- | --- | --- | --- | --- |
| (2) FELLOW PASSENGER | ☐ NONE | ☐ CHILD | ☐ FRIEND | ☐ ELDER |

D. PERFORMANCE (「0」or「1」)

| (1) DRIVABILITY | ☐ SHARP | ☐ MILD | ☐ NUTRAL |
| --- | --- | --- | --- |
| (2) COMFORT | ☐ SPORTY | ☐ COMFORTABLE | ☐ NUTRAL |
| (3) FUEL | ☐ ECONOMY | ☐ NORMAL | |

|   |              |             | CTRL GAIN COMPENSATE | SYMBOL |
|---|--------------|-------------|----------------------|--------|
| A | (1) SEX      | MALE        | 1.0                  | a1     |
|   |              | FEMALE      | 0.8                  |        |
|   | (2) AGE      | ~20         | 0.8                  | a2     |
|   |              | 21~30       | 1.2                  |        |
|   |              | 31~50       | 1.0                  |        |
|   |              | 51~         | 0.8                  |        |
|   | (3) EXPERIENCE | ~1.5 YEAR | 0.8                  | a3     |
|   |              | ~5 YEAR     | 1.0                  |        |
|   |              | 5 YEAR~     | 1.2                  |        |
|   | (4) NUMBER   | ONE         | 0.9                  | a4     |
|   |              | TWO OR MORE | 1.0                  |        |
|   | (5) USE      | OWNER       | 1.0                  | a5     |
|   |              | OTHERS      | 0.8                  |        |

FIG.64

| | | | CTRL GAIN COMPENSATE | | | | SYMBOL | |
|---|---|---|---|---|---|---|---|---|
| | | | EGI | ACS | 4WS | P/S | | |
| B | (1) | NON-COLD | 1.0 | 1.0 | 1.0 | 1.0 | b1 | |
| | | COLD | 1.1 | 1.2 | 1.2 | 1.2 | | |
| | (2) | CITY | 0.9 | 1.0 | 0.9 | 1.1 | b21 | b2 |
| | | SUBURBAN | 1.0 | 1.0 | 1.0 | 1.0 | b22 | |
| | | RURAL | 1.2 | 1.2 | 1.1 | 0.9 | b23 | |
| | | MOUNTAIN | 1.2 | 1.2 | 1.2 | 0.8 | b24 | |
| | (3) | HEIGHT 500m~ | 1.2 | 0.8 | 0.9 | 0.8 | b31 | b3 |
| | | HEIGHT 300~500m | 1.1 | 0.9 | 0.9 | 0.9 | b32 | |
| | | HEIGHT 100~300m | 1.0 | 1.0 | 1.0 | 1.0 | b33 | |
| | | HEIGHT ~100m | 1.0 | 1.0 | 1.0 | 1.0 | b34 | |
| C | (1) | COMMUTE | 0.8 | 0.8 | 1.0 | 0.8 | c11 | c1 |
| | | LEISUR | 1.2 | 1.2 | 1.2 | 1.2 | c12 | |
| | | SHOPPING | 0.8 | 0.8 | 0.8 | 0.8 | c13 | |
| | | BUSINESS | 1.0 | 1.0 | 0.8 | 0.8 | c14 | |
| | (2) | FELLOW NONE | 1.0 | 1.0 | 1.0 | 1.0 | c21 | c2 |
| | | FELLOW CHILD | 0.9 | 0.9 | 1.1 | 1.1 | c22 | |
| | | FELLOW FRIEND | 1.0 | 0.9 | 1.1 | 1.1 | c23 | |
| | | FELLOW ELDER | 0.8 | 0.8 | 1.1 | 1.2 | c24 | |
| D | (1) | SHARP | 1.2 | 1.2 | 0.8 | 1.0 | d1 | |
| | | MILD | 1.0 | 0.8 | 0.8 | 0.8 | | |
| | | NUTRAL | 1.0 | 1.0 | 1.0 | 0.9 | | |
| | (2) | SPORTY | 1.2 | 1.2 | 1.2 | 1.2 | d2 | |
| | | COMFORTABLE | 1.1 | 0.9 | 1.1 | 1.0 | | |
| | | NUTRAL | 1.0 | 1.0 | 1.0 | 1.0 | | |
| | (3) | ECONOMY | 0.8 | 1.0 | 0.8 | 0.8 | d3 | |
| | | NORMAL | 1.0 | 1.0 | 1.0 | 1.0 | | |

FIG.70

| SECOND PATTERN DATA ITEM [CTRL GAIN COMPENSATION ENTRY] |
|---|
| A. ENGINE CHARACTERISTIC (SELECT ONE)<br>  (1)INTAKE        0.8  0.9  1.0  1.1  1.2  (INCREASE)<br>  (2)FUEL INTECTION  0.8  0.9  1.0  1.1  1.2  (INCREASE)<br>  (3)IGNITION TIMING  0.8  0.9  1.0  1.1  1.2  (ADVANCE)<br>B. AT CHARACTERISTIC (SELECT ONE)<br>  (1)UP-SHIFT        0.9  1.0  1.1  (ADVANCE)<br>  (2)DOWN-SHIFT     0.9  1.0  1.1  (ADVANCE)<br>C. BRAKE CHARACTERISTIC (SELECT ONE)<br>  (1)BRAKE FORCE    0.9  1.0  1.1  (INCREASE)<br>D. TCS CHARACTERISTIC (SELECT ONE)<br>  (1)START         0.9  1.0  1.1  1.2  (RETARD)<br>E. ABS CHARACTERISTIC (SELECT ONE)<br>  (1)START         0.9  1.0  1.1  1.2  (RETARD)<br>F. POWER STEERING CHARACTERISTIC (SELECT ONE)<br>  (1)STEERING FORCE  0.8  0.9  1.0  1.1  1.2  (HEAVY)<br>G. REAR WHEEL STEER CHARACTERISTIC (SELECT ONE)<br>  (1)SAME PHASE  0.8  0.9  1.0  1.1  1.2  (INCREASE)<br>    STEER ANGLE<br>H. AIR CONDITIONER (SELECT ONE)<br>  (1)COOLER       0.8  0.9  1.0  1.1  1.2  (HIGH)<br>                        ↑<br>                        L—(STANDSRD) |

| FLAG | | CTRL GAIN COMPENSATE | | | | SYM-BOL |
|---|---|---|---|---|---|---|
| | | EGI | ACS | 4WS | P/S | |
| A | ORDINARY ROAD (Fa1) | 1.0 | 1.0 | 1.0 | 1.0 | Ca |
| | HIGHWAY (Fa2) | 0.9 | 1.2 | 1.2 | 1.2 | |
| B | CITY (Fb1) | 0.9 | 1.0 | 0.9 | 1.1 | Cb |
| | URBAN (Fb2) | 0.9 | 1.0 | 0.8 | 0.9 | |
| | SUBUEBAN (Fb3) | 1.0 | 1.0 | 1.0 | 1.1 | |
| | RESIDENTIAL (Fb4) | 0.8 | 0.9 | 0.8 | 0.8 | |
| C | COLD (Fc1) | 1.1 | 1.2 | 1.2 | 1.2 | Cc |
| | RAINY (Fc2) | 1.0 | 0.9 | 1.2 | 1.2 | |
| | NORMAL (Fc3) | 1.0 | 1.0 | 1.0 | 1.0 | |
| D | COMMUTE (Fd1) | 0.8 | 0.8 | 1.0 | 0.8 | Cd |
| | LEISURE (Fd2) | 1.2 | 1.2 | 1.2 | 1.2 | |
| | SHOPPING (Fd3) | 0.8 | 0.8 | 0.8 | 0.8 | |
| | BUSINESS (Fd4) | 1.0 | 1.0 | 0.8 | 0.8 | |
| | ALLROUND (Fd5) | 1.0 | 1.0 | 1.0 | 1.0 | |
| E | NUMBER (ONE) (Fe) | 0.9 | | | | Ce |
| F | EXPERIENCE (Ff) (3 YEARS OR MORE) | 1.1 | | | | Cf |
| G | 10000km (Fg) /YEARS OR MORE | 1.2 | | | | Cg |

VEHICLE CHARACTERISTIC CHANGE SYSTEM AND METHOD

RELATED APPLICATIONS

This application is a divisional of application Ser. No. 09/013,302 filed Jan. 26, 1998 now abandoned; which is a continuation of application Ser. No. 08/450,662 filed May 30, 1995 (now abandoned); which is a FWC of application Ser. No. 08/084,723 filed Jul. 1, 1993 (now abandon).

BACKGROUND OF THE INVENTION

1. Field of the Invention

The present invention relates to a system and method for making information concerning a vehicle characteristic and introducing it to an object vehicle so as to change the characteristics thereof.

2. Description of the Prior Art

Generally, a vehicle characteristic is provided so as to satisfy the driver's taste wherever the vehicle runs, whatever driving circumstances are and whatever the driver's personality is.

It has been known that the vehicle is provided with a manual switch for selecting a hard mode or soft mode of active suspension system and for sporty mode or normal mode of four wheel steering system by setting a specific control gain. This enables the vehicle running characteristic to match the driver's taste.

However, the conventional vehicle with such a manual switch is not enough to satisfy an average driver's desire. In view this, a learning control vehicle has been proposed that the driver's taste embodied in operation is learned for a feedback control and change a control gain of the running characteristic of the vehicle.

Japanese Patent Publication No. 3-44029, published for opposition on 1990, discloses a learning control vehicle in which a steering ratio between the front and rear wheels is changed based on the mean value of steering angle change speed, steering angle, yawing rate, side acceleration in a predetermined time period of the steering operation.

With the control gain change system as proposed conventionally, a part of the vehicle running characteristics is able to be changed. However, this is not able to change the vehicle characteristics systematically with regard to driving mechanisms such as the steering mechanism, suspension system, braking system in response to the driver's feeling and taste. In order to meet the driver's feeling or taste, it is necessary for the vehicle to have various sensors and control unit for processing signals from the sensors and learning features of the driver's operation to change the vehicle characteristics.

It should, however, be noted that each vehicle is necessary to be equipped with the various sensors and control unit with a complicate software and a large scale of memory for processing a large amount of the information from the sensors as well as the learning system for making the learning control. Specifically, it is necessary for each vehicle to increase the capacity of RAM for processing data of the learning control. This would raise the vehicle price.

SUMMARY OF THE INVENTION

It is therefore an object of the present invention to provide a simple system and method which can provide a desirable vehicle characteristic for individual object vehicle by making a characteristic information of the object vehicle, introducing it to the object vehicle to change the vehicle characteristic of the object vehicle to meet the driver's taste.

Another object of the present invention is to provide a system and method for making a characteristic information of the object vehicle outside thereof and introducing it to the object vehicle.

Still another object of the present invention is to provide a system and method which can provide efficiently an object vehicle with a characteristic information in accordance with the levels of characteristics required for the object vehicle respectively.

Further object of the present invention is to reduce the capacity of memory such as ROM, RAM, non-volatile RAM needed for the object vehicle.

Still further object of the present invention is to provide a compact control system for controlling the object vehicle in which the characteristic information formed outside of the object vehicle is installed.

Further object of the present invention is to provide a simple system and method for introducing the characteristic information formed outside of the object vehicle into the object vehicle.

The above and other object of the present invention can be accomplished by a characteristic change system comprising characteristic information forming means for forming a vehicle characteristic information which controls characteristics of an object vehicle with the characteristic information being formed outside of the object vehicle, information entry means for entering the characteristic information formed outside of the object vehicle therefor and characteristic change means for changing the characteristics of the object vehicle based on the characteristic information entered through the information entry means.

In another aspect, a method for changing the characteristics of the object vehicle. The method comprises steps of forming a characteristic information which controls characteristics of an object vehicle with the characteristic information is formed outside of the object vehicle, entering the characteristic information into the object vehicle and changing the characteristics of the object vehicle based on the characteristic information.

The vehicle characteristics include running properties of the object vehicle, such as suspension, steering, engine output, transmission, braking, and driving condition such as, an air conditioning, a seat level, seat hardness, seat position and the like.

Preferably, there is provided information hold means or storage means for storing the characteristic information formed by the characteristic information forming means prior to entering the characteristic information into the object vehicle.

(Characteristic Change Making Use Of Simulation System)

In a preferred embodiment, the characteristic information is formed by making use of a simulation system in which a driver makes a simulated driving operation to form his or her own characteristic information. The driver is supposed to drive the object vehicle after the characteristic information is entered to change the characteristics of the object vehicle. The characteristic information is formed and stored in a memory means. Then, information read means reads the characteristic information so that the characteristic change means changes the characteristics of the object vehicle. As a memory means, IC card can be utilized.

In a preferred embodiment, a simulation system is further provided with area input means for introducing a hypothetical running area in which the simulation driving operation is made, a screen for projecting a driving circumstance and body control means for oscillating and moving a simulation body formed in corresponding to the object vehicle.

The simulation system, provided with a control unit utilizing a computer, calculates a hypothetical running area where the simulation driving is underway, displays an image corresponding to the hypothetical running area, learns the driver's operation with regard to the hypothetical running area to form the characteristic information and store the information to the storage means when the simulation drive is finished.

In this case, if the calculated hypothetical running area is in a specific area defined within a predetermined distance from a base point, the computer displays a picture of a road in the specific area. The oscillating means oscillates the simulation body. If the hypothetical running area is outside of the specific area, the simulation system projects on the screen a general image of driving circumstance in accordance with a running area. The information storage means includes a learned characteristic information storage section for storing a learned characteristic information obtained through the simulation driving operation of the driver together with the terrain of the road in the specific area, standard characteristic information storage section for storing a standard characteristic information obtained through a simulation driving operation by the driver's in a running area other than the specific area, and a learning program storage section for a learning program which compensates the learning and standard characteristic informations.

In another embodiment, the learning program includes ones for learning terrains of roads in the specific area and for learning the driver's operation. The computer, making the driving simulation, reads the learned characteristic information stored in the learned characteristic information storage section of the characteristic information storage means, the standard characteristic information stored in the standard characteristic information storage section, and the learning program stored in the learning program storage sect area, the learned characteristic is compensated utilizing the learning program with regard to the terrain of the road and the driver's operation. When the simulation drive is made in the area other than the specific area, the standard characteristic information is compensated utilizing the learning program with regard to the driver's operation.

In another preferred embodiment, there is provided standard medical data storage means for storing a standard medical data of the driver. In this case, the simulation system is provided with medical data detecting means for detecting the medical date of the driver. The computer unit reads the standard medical data of the driver stored in the standard medical data storage section to compare them with the driver's medical data detected by the medical data detecting means to judge a driver's mental condition. If it is judged the driver's mental condition is not normal, the learning of the driver's operation is stopped. As a result, the learned data is not used for forming the characteristic information.

(Characteristic Change Making Use Of Characteristic Information Forming Vehicle)

The information forming means is able to be constituted by a characteristic information forming vehicle which is specifically arranged for forming the characteristic information by means of the learning control.

The characteristic information forming vehicle carries out the learning control based on an actual driving operation by the driver of the information forming vehicle and comprises driving operation control means having steering, suspension and brake system, characteristic information change means having a given characteristic information and learning the driver's feature or taste based on his or her driving operation to change the given characteristics so as to matches the driver's taste and information storage means for storing the changed characteristics in such a manner that the stored characteristics is able to be introduced to an external system. The characteristics includes the learned characteristic information formed through the learning control within the specific area and a predetermined characteristic information arranged for an area other than the specific area and a standard characteristic information which is formed by the change of the predetermined characteristics through the learning control.

The driver drives the information forming vehicle one or more times. The information storage means stores the characteristic information obtained through the actual driving of the information forming vehicle. The characteristic information is introduced through a storage medium, such as IC card, transmittal cable and the like into a control system of the object vehicle in which the characteristics of the object vehicle is changed or newly formed based on the characteristic information formed in the information forming means is newly formed. In a typical embodiment, the information forming vehicle is owned by a dealer who sell the object vehicle to the user.

(Characteristic change through Data Entry for Characteristic Information Forming)

In another aspect of the present invention, the characteristic information is formed by means of an independent information forming device to which various inforamtion or data is entered to form the characteristic information.

For example, there is provided a separate information forming device having a key board. The characteristic information for the object vehicle is formed as the driver operates keys or switches on the key board of the information forming device. The characteristic information formed through the driver's operation is stored in a storage medium. Thereafter, the information is read directly or indirectly by the control unit of the object vehicle to change the characteristics thereof. It will be understood that the characteristics of the object vehicle is originally set for an average or ordinary user when the object vehicle is manufactured.

In order to make the driver operate the information forming device properly, an instruction book therefor may be delivered to a driver or user to be. In a preferred embodiment, the control unit of the object vehicle may utilize the characteristics originally provided when the storage medium is not properly connected with the object vehicle. When the storage medium having the characteristic information formed by the information forming device is connected with the control unit of the object vehicle, the control unit reads the characteristic information from the storage medium to change the original characteristics to new characteristics based on the characteristic information formed in the information forming device. The characteristic information includes information concerning the driver's taste and use conditions of the object vehicle.

The information forming device is provided with an entry means such keys, switches for entering various information, display means for displaying the information entered through the driver's operation, connecting portion for connecting removably the storage medium and memory means for storing the information entered through the driver's operation. The characteristic information forming means may include processing means for processing the information or data entered by the driver so as to form the characteristic information for changing the characteristics of the object vehicle. The information forming device may display newly entered data and precedently entered data. Although the instruction book instructing how to enter the data can be prepared separately, the information forming means may include instruction message display means for displaying the instructions how to enter the data. This display can be commonly used as a calendar displaying the date, time and the like. When the storage medium is not connected thereto, the display means functions as a calender. In this case, the information forming means is provided with the data necessary for the calender and calculates information necessary to the calender display.

The information forming means may include a display means for displaying display means for displaying the characteristics obtained thereby and/or differences or gaps between the formed characteristics which is newly formed and base characteristics which is originally provided in the object vehicle. Further, the information forming means may include cancel switch means for canceling the characteristic information read in by the information read means. The information forming means may include memory means for storing sample information with which the characteristic information is formed, display the sample information which are accessible to be changed so as to form the characteristic information. The data can be entered into the information forming means through key entry operation by the driver, or operator who gets the data from the driver. In this case, the driver may fill out a data sheet answering various questions. Preferably, the data or information specifying the driver's taste and/or the use conditions of the object vehicle are entered to the information forming means by the entry means. The information forming means processes the information with characteristic change program to produce characteristic change signals which are transmitted through a change signal entry device to the control unit of the object vehicle which controls at least one of the power train, steering and suspension system.

The change signal entry device may be constituted by a diagnostic system of the computer for diagnosing a malfunction thereof. As a result, there is no need of separate entry device to save the manufacturing cost. The change signal entry device may include plural switches for entering the change signals to facilitate the entry of the data or information formed in the information forming means. The change signal entry device may be connected with the control unit of the object vehicle only when the change signals are entered to the control unit.

The change signal entry device may include plural switches provided on the object vehicle to change at hand the characteristics of the object vehicle when necessary. The change signals may be formed taking account of the use conditions of the object vehicle to change the characteristics in response to driver's experience. This makes the change of the characteristics of the object vehicle flexible. For example, the characteristics may be changed based on a driving experience, or annual running distance of the driver because these kinds of information is useful in assessing the driving skill of the driver.

The characteristic change means may not change the characteristics when the vehicle is in an abrupt steering condition, runs on a rough road or a low friction road. Under those conditions, the vehicle runs with the original characteristics to keep a safety thereof.

In another aspect of the present invention, the object vehicle is provided with plural switches for changing the characteristics of the object vehicle in accordance with the use conditions thereof wherein the characteristics of the vehicle are changed in accordance with the information entered through the switches.

In this system, the switches provides not only the information forming means but also characteristic change means so that the characteristics of the object vehicle can be readily changed according to the use condition thereof. This system is advantageous in simplicity and low cost. The switches may be disposed in an instrument panel of the object vehicle for the driver to operate at hand. The switches, where disposed in a control box of the object vehicle, keep the driver from operation error. With this system, the driver may select the characteristics arranged for a cold area and for a warm area by switching operation.

The driver may change the characteristics among one for city area, urban area, suburban area, residential area, local road and highway to match the respective driving conditions.

As the use conditions, the driver may select the characteristics for commuting to work place, leisure, shopping, shopping, and business. This will provide the diver with a driving comfort in response to the use conditions. Further, the driver may operate a switch to enter the information about the number of the vehicle he or she drives or owns. If the number of the vehicle entered is one, the change of the characteristics of the object vehicle is kept small because the object vehicle is likely to be driven by plural drivers and thus it is preferred to be neutral or basic characteristics. Accordingly, the information about the number of vehicle owned by the driver is useful to determine the characteristics of the vehicle.

Further objects, features and advantages of the present invention will become apparent from the Detailed Description of Preferred Embodiments which follows when read in light of the accompanying Figures.

BRIEF DESCRIPTION OF THE DRAWINGS

FIG. 8 is a table showing various control data for the designated data A1 through A7 and standard program B3:

FIG. 9 is a table showing control data for the learning programs C1 through C3:

FIG. 10 is a table showing control data for the learning programs D1 through D7:

FIG. 11 is a table showing control data for the compensation programs E1 through E7:

FIG. 62 is an illustrative view of a data list in accordance with the embodiment of FIG. 56:

FIGS. 63 and 64 are another example of the data list in accordance with the embodiment of FIG. 56:

FIG. 70 is an illustrative view of another example of a data list of second pattern in accordance with the embodiment of FIG. 56:

FIG. 78 is an illustrative view of a data list in accordance with the embodiment of FIG. 76: and, FIG. 79 is a flow chart of a process for obtaining a compensation coefficient.

DETAILED DESCRIPTION OF THE PREFERRED EMBODIMENTS

Figure 1:
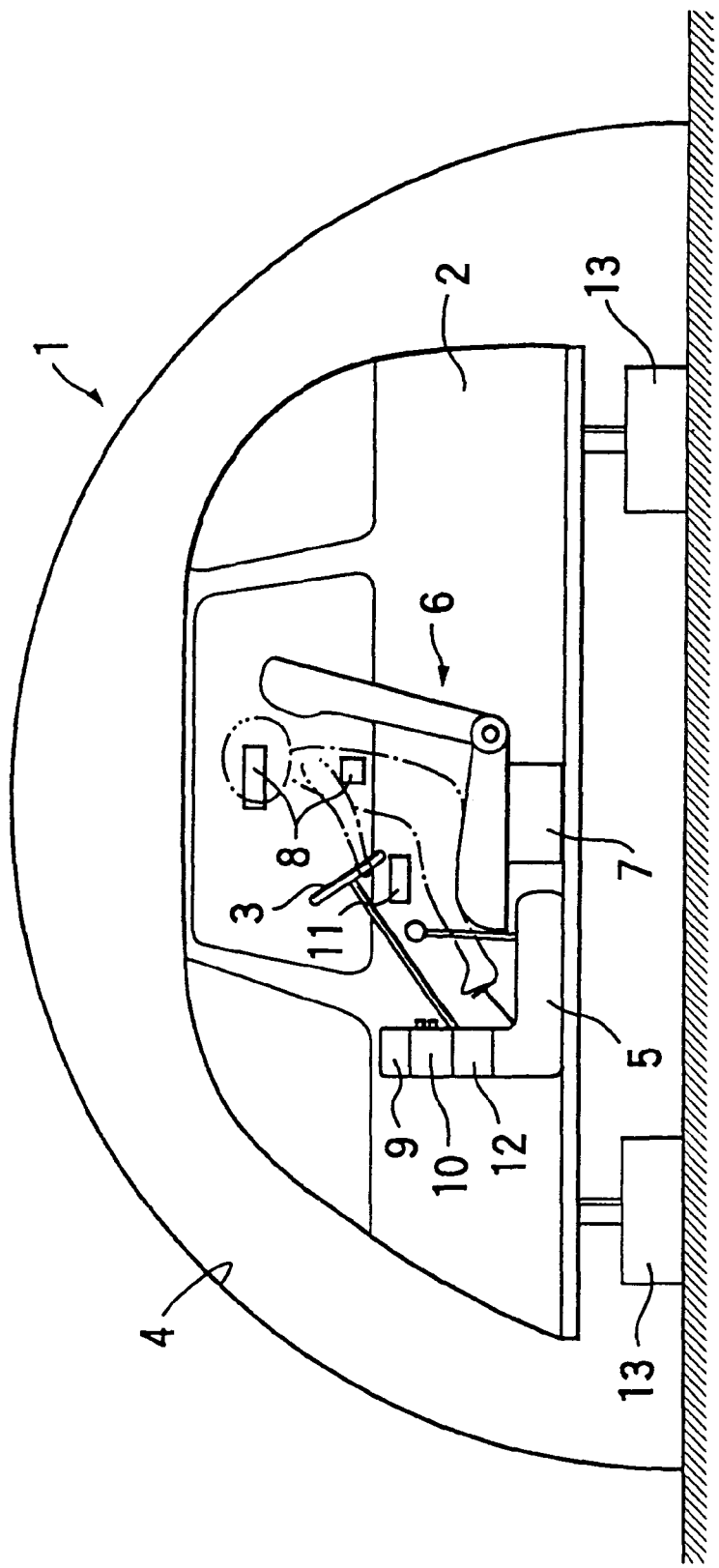
FIG. 1 is a schematic block diagram of a simulation system in accordance with the present invention.

Referring to FIG. 1, a driving simulation system 1 is installed in a facility belong a dealer who sell an object vehicle of which characteristics are subjected to be changed. A driver can make a simulation driving utilizing the simulation system for forming a characteristic information which is entered to the object vehicle so as to change an original characteristics to new characteristics.

In the driving simulation system, a program stored in IC (integrated circuit) card is read. The driver's simulation driving in the driving simulation system is learned utilizing the program to form learning control data. When the driver's simulation driving operation is carried out with regard to a hypothetical specific area, for example, an area within 20 km from a base point, such as driver's home, place of the dealer, the driver's operation is learned in connection with a terrain of each unit zone of each road in the specific area to form the learned control data. The learned data is stored in the IC card to renew old data therein previously.

When the simulation driving is made with regard to a hypothetical running area other than the specific area, the driver's operation is learned in connection with each driving area, such as city area, urban area, suburban area, mountain road and highway so as to renew the control data.

The illustrated simulation system 1 is provided with a driving system similar to an actual vehicle, such as vehicle body 2, steering wheel 3, acceleration pedal and brake pedal. The device 1 is also provided with a screen 4 formed on a semi-spherical wall surrounding the body 2. A pictorial image of the hypothetical running area is projected on the screen 4. The pictorial image of the hypothetical running area is synthesized with a pictorial image of a traffic condition in accordance with a certain time band and weather condition, such as, clear, rain, snow and the like. In addition, the brightness of the screen 4 can be adjusted for a simulation driving for the night time. The simulation system 1 is provided with a position change mechanism 5 for adjusting the position of the driving system including the steering wheel 3, acceleration pedal, the brake pedal and the like and a seat positioning mechanism 7 for adjusting a position, level, inclination of the seat back of a seat 6 in accordance with the driver's size and/or taste. The simulation system 1 is also provided with medical data detecting device 8 for detecting the driver's medical data such as heat beat, pulse, sweating condition, blood pressure, eye-point and the like. The simulation system 1 is also provided with IC card reader 9 for being connected with the IC card to read the information stored therein, running area entry means 10 for entering a start and end point of a hypothetical running area in which the simulation driving is made, manual switch 11 for changing control gain of a certain control device, and CD-ROM reader 12 for reading information stored in CD-ROM in which the terrains of the roads in the specific area, such as undulation, curvature, up and down of the road. Further, the simulation system 1 is provided with a body control mechanism 13 for changing the attitude of the simulation system 1 as if the vehicle is moved in accordance with driving condition and/or road condition, such as bouncing, rolling, pitching and the like. The device 1 is also provided with a steering force control mechanism for controlling the steering force needed for operating the steering wheel 3.

Figure 2:
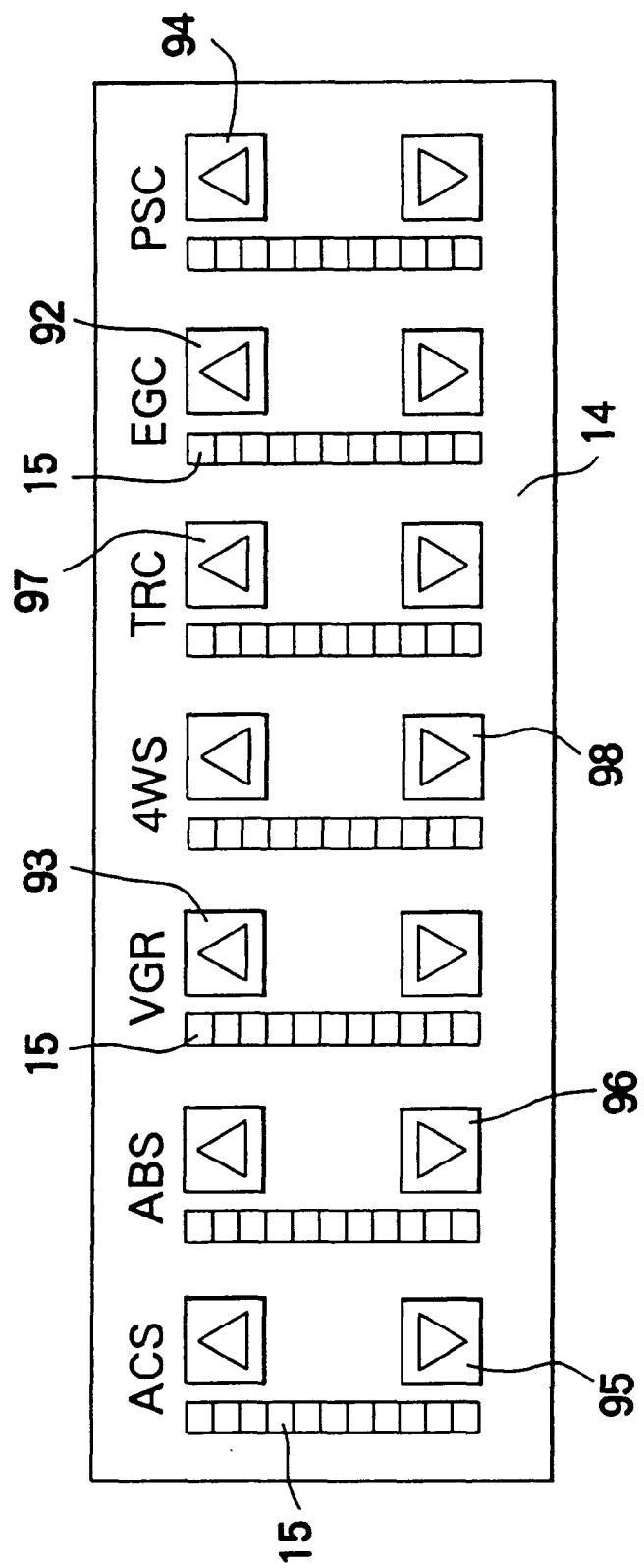
FIG. 2 is a front view of an instrument panel with a manual switch.

Referring to FIG. 2, an instrument panel 14 is illustrated. The manual switches 11 is provided on the panel 14. Numeral 15 is an indicator. On the panel 14 are disposed engine control manual switch 92, gear ratio control manual switch 93, power steering manual switch 94, active suspension manual switch 95, anti-lock braking system manual switch 96, traction control manual switch 97 and four wheel steering control manual switch 98.

Figure 3:
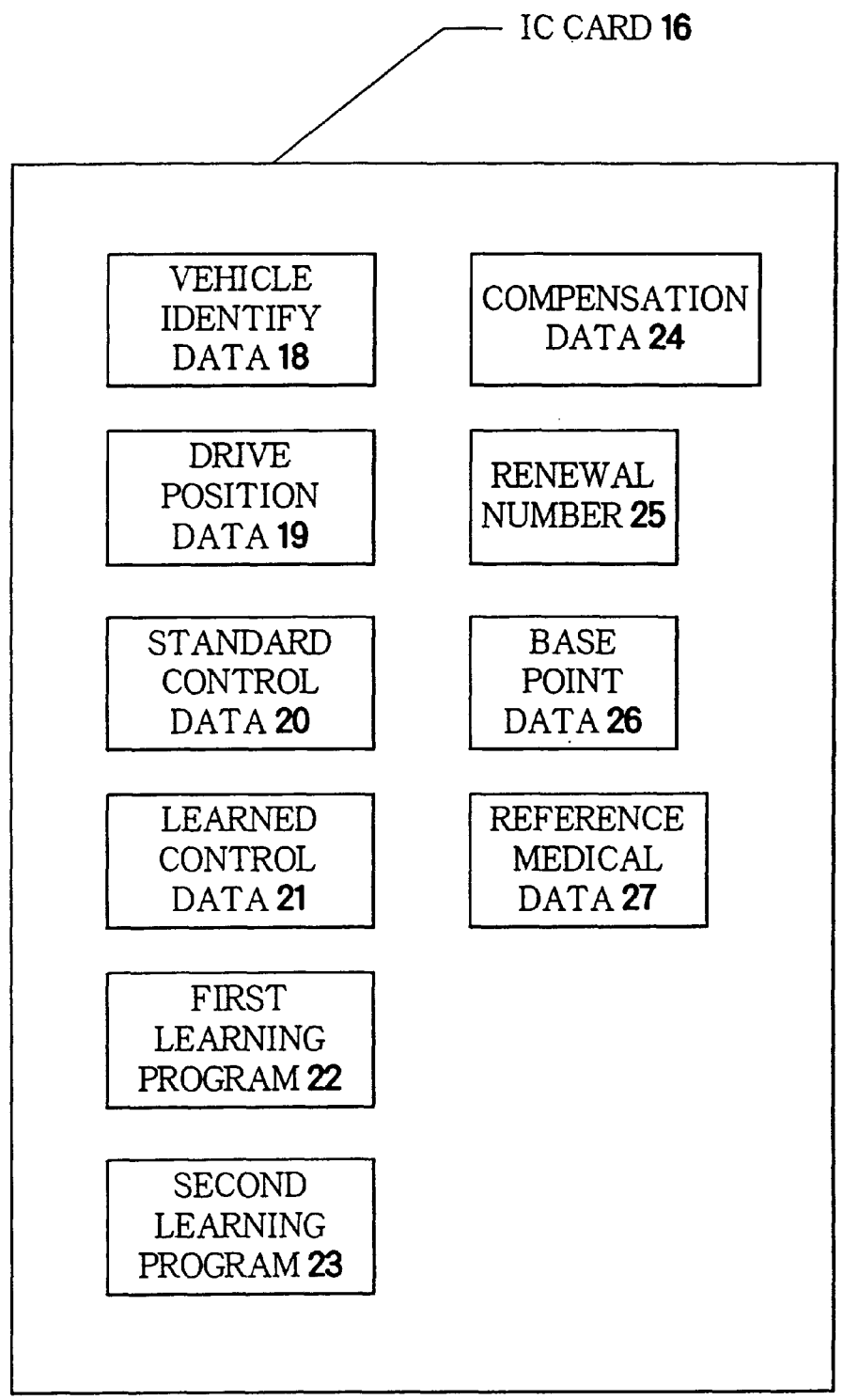
FIG. 3 is a schematic view showing data or program stored in IC card.

Referring to FIG. 3, the IC card 16 stores standard control data and learned control data formed through the simulation driving utilizing the simulation system 1. The IC card is connected with or received in the object vehicle so that The information stored in the IC card is read by the IC card reader to change the characteristics of the object vehicle. In this case, the characteristics are changed through, for example, control gains of control factors of the object vehicle.

The IC card 16 includes vehicle identifying section 18, driving position change data storage section 19, standard control data storage section 20, learned data storage section 21, first learning program storage section 22, second learning program storage section 23, compensation data storage section 24, renewal number storage section 25, base point data storage section 26 and reference medical data storage section 27.

The vehicle identifying data storage section 18 storages data for identifying a type of the object vehicle of which characteristics are changed based on the simulation driving in response to the operation of a cancel switch.

The storage section 19 stores driving position data, such as the inclination of the steering wheel 3, seat position.

The storage section 20 stores standard control data. The storage section 21 stores learned control data obtained through a learning control based on the simulation driving. The first learning program storage section 22 stores learning programs C1 and C2 for making learning data based on a terrain of a road for each unit zone.

The second learning program storage section 23 stores learning programs D1 through D7 for making learning data based on the driver's operation in the unit zone. The compensation data storage section 24 stores compensation data for compensating compensation control program based on driver's mental condition, medical data, response ability. The storage section 25 stores the renewal number of the control data. The section 26 stores base point data and the section 27 stores the medical data of the driver.

Figure 4:
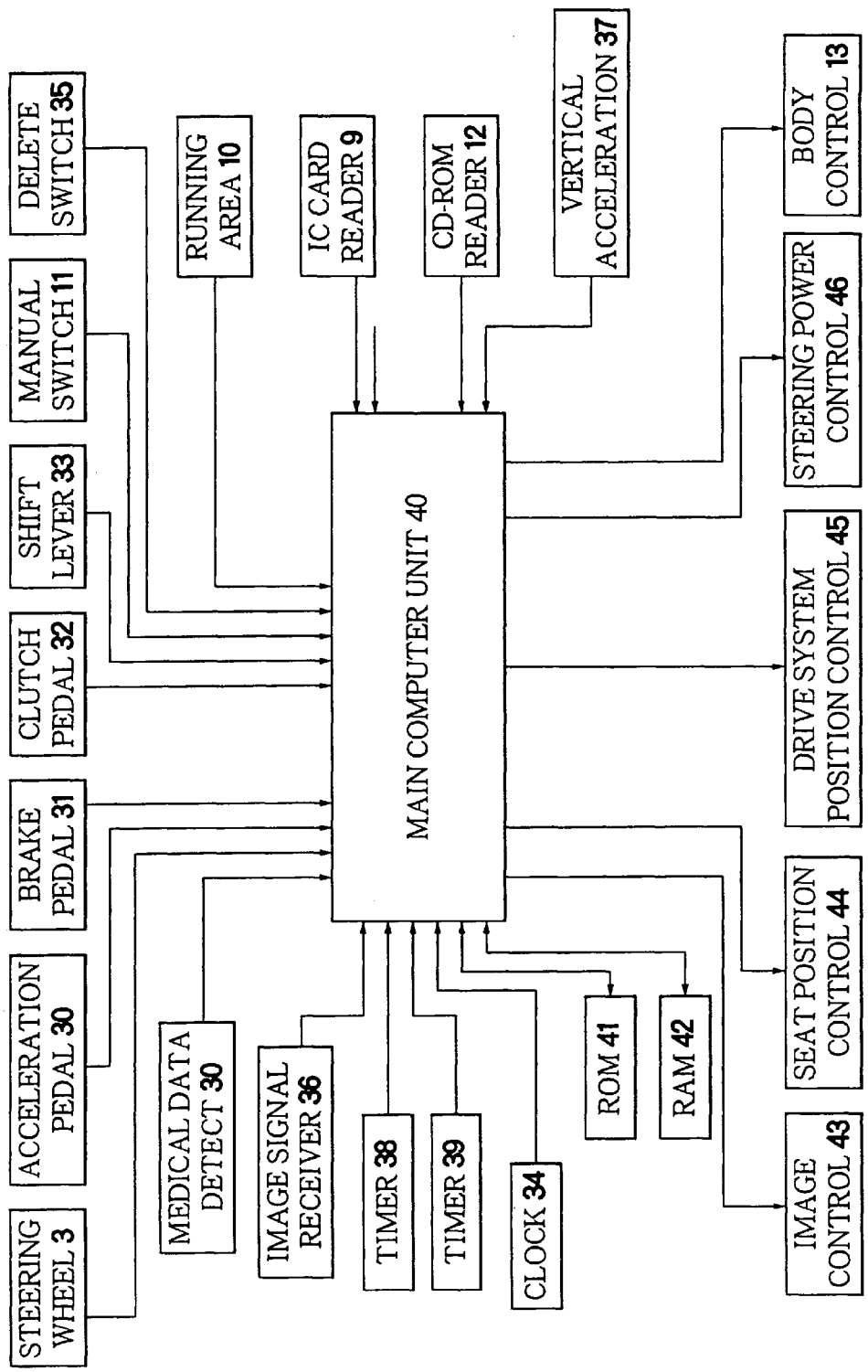
FIG. 4 is a schematic block diagram of the simulation system.

Referring to FIG. 4, the driving system of the simulation system 1 includes the steering wheel 3, acceleration pedal 30, brake pedal 31, clutch pedal 32, shift lever 33, running area entry device 10, manual switch 11 for a manual operation of entry the characteristic information, delete switch 35 for erasing the characteristic information. The delete switch 35 is operated when the driver wants to change the characteristic information because of improper data or useless data. For example, if the owner of the object vehicle is changed and old data is no longer useful for the new owner or driver, it is necessary to renew the data about driving position, standard control data, leaning control data, compensation data, driver identifying data.

The detecting system of the simulation system 1 includes medical data detecting device 8, IC card reader 9, pictorial image signal receiver 36 for receiving information about the hypothetical running area based on the hypothetical start and destination, driver's operation, CD-ROM reader 12 which stores the terrains of the road in the specific area, up and down acceleration sensor 37 for sensing acceleration of the simulation system 1 applied by the body control mechanism 13, timers 38 for changing the control data about engine control device, gear ratio control device, power steering control device, active suspension control device, anti-lock brake control device, traction control device and four wheel steering control device respectively within a predetermined time period and timer 39 for being used when the compensation data are to be changed. Numeral 34 is a clock.

The control system of the simulation system 1 includes main computer 40, ROM 41 storing various control data and control programs, RAM 42 storing various control data and control programs stored in the IC card 16, seat position control device 44, steering power control device 46 and body control mechanism 13. ROM 41 stores the control data A1 though A5 for each kind of the vehicles wherein the data A1 through A5 are changed to standard data B1 through B5 as the simulation driving is carried out for the first time or the delete switch 35 is operated.

The computer unit 40 produces position control signal based on the driving position data read in from the IC card reader to adjust the position of the seat 6 by means of the mechanisms 5 and 7. The storage section 19 stores reference data about the seat position originally provided and stores renewed data if the reference data are changed.

The computer 40 finds the hypothetical running area where the simulation driving is carried out, causes the pictorial image receiver 36 to receive the image signals and the image control device 43 to display a pictorial image of the hypothetical running area on the screen 4. The pictorial image on the screen 4 is changed in accordance with the driver's operation. Further, the computer 40 produces control signals to the body control mechanism 13 and steering power control mechanism 46 to cause the body 2 to make bouncing, rolling, pitching and changing the attitude of the body 2 like an actual drive in accordance with the driver's operation in response to the change of the pictorial image on the screen 4. The computer 40 calculates a hypothetical vehicle speed, yawing rate, acceleration and side force acting on the body 2.

When the computer 40 judges the simulation driving is made in an area other than the specific area, the computer 40 read in the IC card to produce control signal for the image control device 43, body control mechanism 13 and steering power control device 46 in accordance with the standard control data B1 through B5 so that the body 2 is moved and the image on the screen 4 is changed in synchronism with the driver's operation. At the same time, the computer 40 learns the driver's operation based on learning control programs D1, D3 through D6 to rewrite the standard data and write in the IC card. In this process, the computer 40 causes the image control device to project general pictorial image in accordance with area, such as city area, urban area, suburban area, mountain road and highway on the screen 4 when the hypothetical running area is not the specific area.

When the hypothetical area is the specific area, the computer 40 read in the IC card to produce control gain change signal in accordance with the learning control data stored in the RAM 42 to thereby control the image control device 43, body control mechanism 13, steering power control device 46. The computer 40 learns the terrain of the road in the specific area based on the learning program C1 and C2 and learns the driver's operation based on the learning program D1 through D7 to rewrite the learned control data and write in the IC card at the end of the simulation driving.

Further, the computer 40 changes the compensation data stored in the section 24 during the simulation based on the medical data of the driver and the like.

The computer 40 changes the control gains for the image control device 43 and the body control mechanism 13 when the manual switch 11 is operated. For example, if the driver operate the manual switch 98 for increasing the control gain of the four wheel steering control device, the body 2 is allowed to make a sharp turn and the image control device 43 is changed in synchronism with the change of the control gain of the body control mechanism 13.

Figure 5:
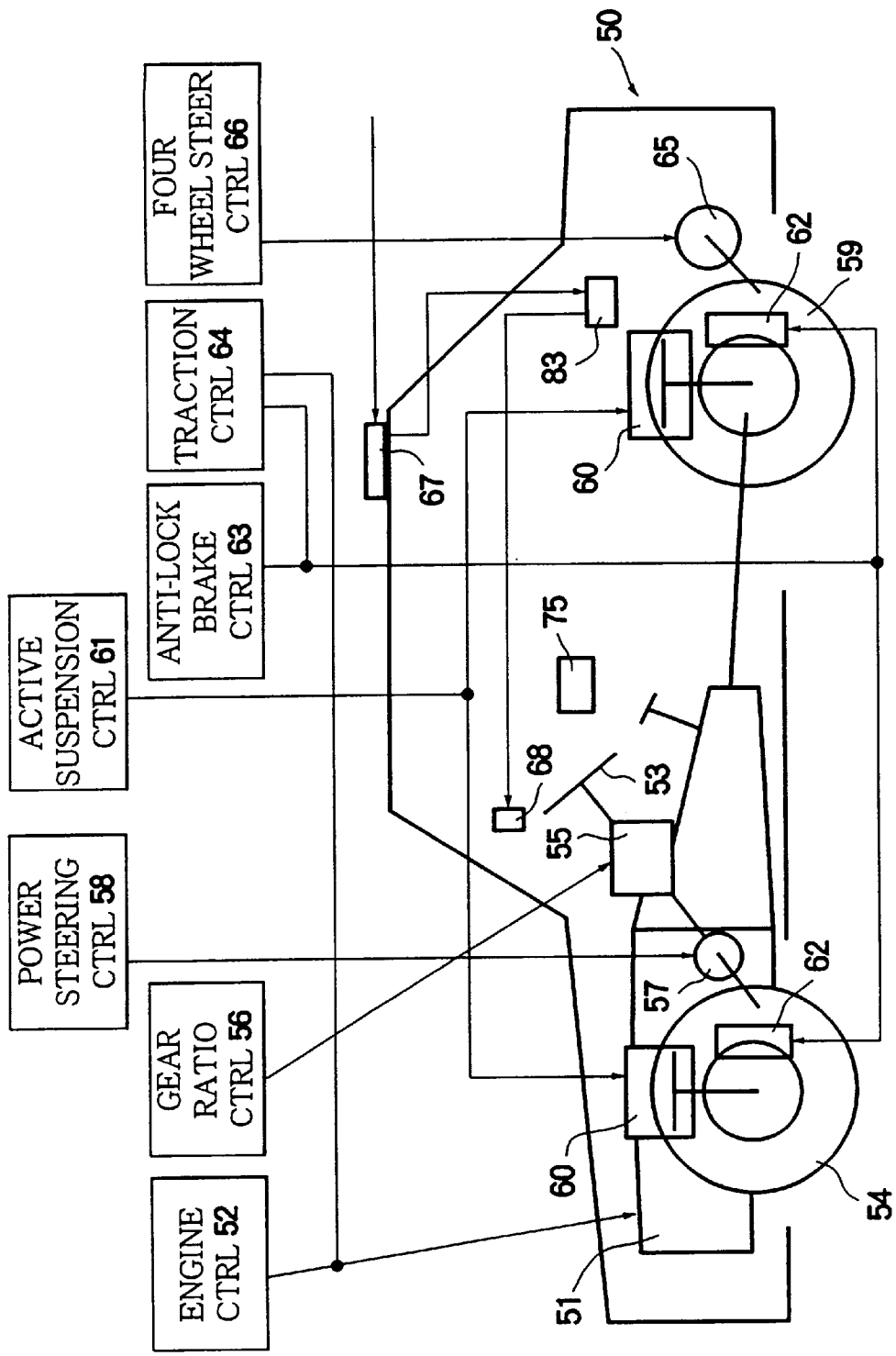
FIG. 5 is a block diagram of an object vehicle.

Referring to FIG. 5, the object vehicle 50 includes engine 51, engine control device 52 for controlling the amount of intake gas, ignition timing, fuel injection, gear ratio change device 55 for changing steering angle ratio of front wheels 54 to steering wheel 53, gear ratio control device 56 for controlling the gear ratio change device 55, power steering control device 58 for controlling power steering device 57, active suspension control device 61 for controlling active suspension 60 for front wheels 54 and rear wheels 59, anti-skid brake control device 63 for controlling brake system 62 for front and rear wheels 64, 59, traction control device 64 for controlling the engine 51 and the brake system 62 and four wheel steering control device 66 for controlling rear wheel steering device 65 which steers the rear wheels 59. In the drawing, numeral 67 designates location detecting sensor which receives a signal, such as magnetism from the earth, and other signals from satellite, sign post (not shown) and the like to detect the location of the vehicle 1. Numeral 68 designates display device for showing the location of the vehicle running on a map and the like. The object vehicle 50 includes IC card reader 75 for reading in the various data stored in the IC card 16.

Figure 6:
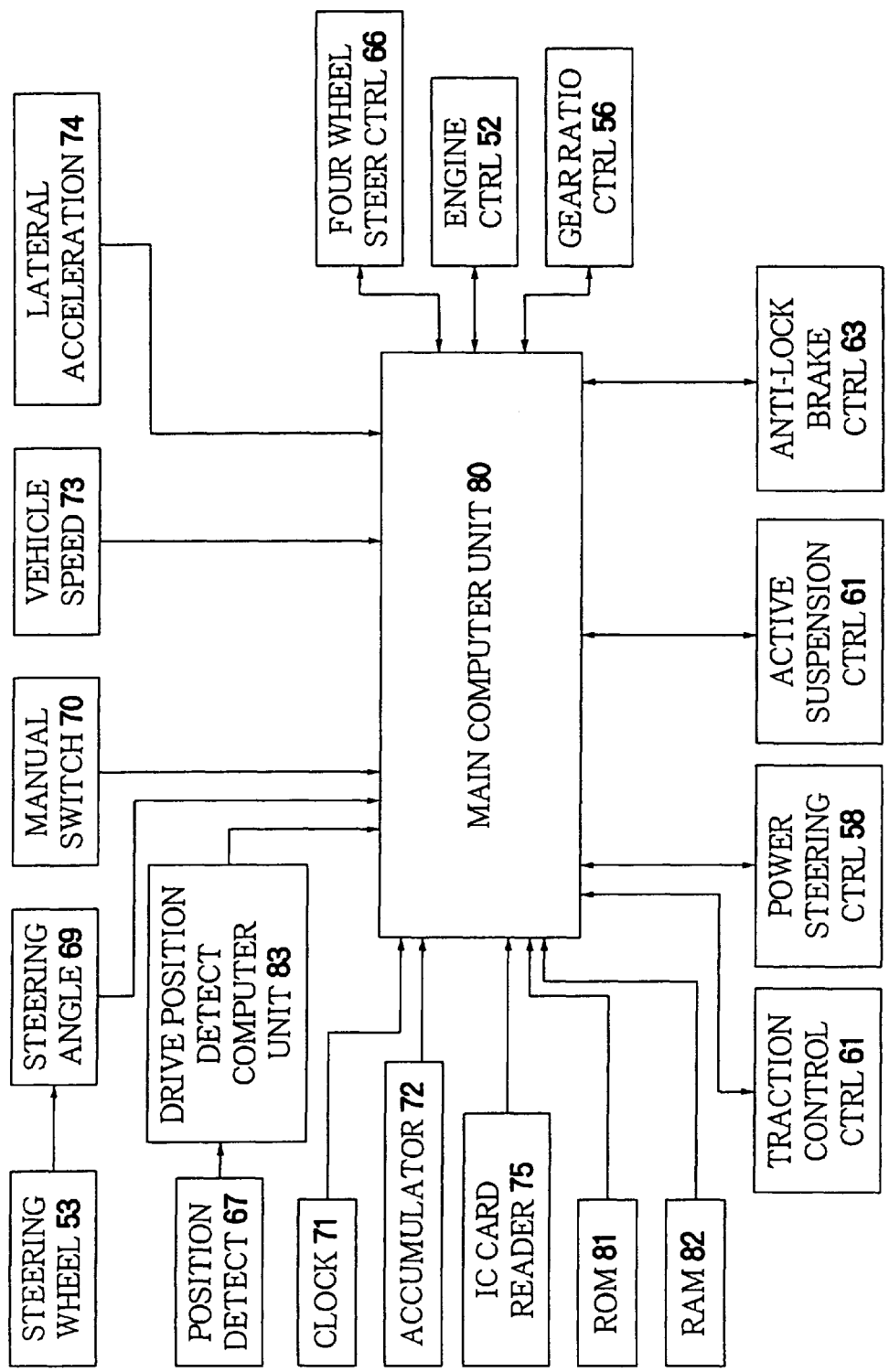
FIG. 6 is a schematic block diagram of the object vehicle.

Referring to FIG. 6, the vehicle 50 is operably provided with the steering wheel 53 and manual switch 70 for manually changing the control gain.

The object vehicle 50 is also provided for detection with the location detecting sensor 67, steering angle sensor 69 for sensing the steering angle of the steering wheel 53, clock 71, distance meter 72 for detecting running distance of the vehicle 50, vehicle speed sensor 73 for detecting the vehicle speed V, lateral acceleration sensor 74 for detecting side acceleration GL of the vehicle 1, and IC card reader 75. Built-in timers are provided on the power steering control device 58, active suspension control device 61, antilock braking device 63, traction control device 64 and four wheel steering device 66.

Further, the control system of the vehicle 50 includes main computer unit 80, ROM 81 which stores a predetermined program, RAM 82 which stores a program which can be rewritten, computer unit 83 for detecting the location of the vehicle 50 based on the signal from the location detecting sensor 67, engine control device 52, gear ratio control device 56, power steering control device 58, active suspension control device 61, anti-skid brake control device 62, traction control device 64 and four wheel steer control device 66.

The main computer unit 80 is accessible to programs stored in the ROM 81 and RAM 82 and receives signals from manual switch 70, location detecting sensor 67, steering angle sensor 69, clock 71, accumulating meter 72, vehicle speed sensor 73, lateral acceleration sensor 74, standard control data, learned control data and compensation control data from the IC reader 75 and produces signals to engine control device 52, gear ratio control device 56, power steering control device 58, active suspension control device 61, anti-skid brake control device 63, traction control device 65 and four wheel steer control device 66.

Figure 7:
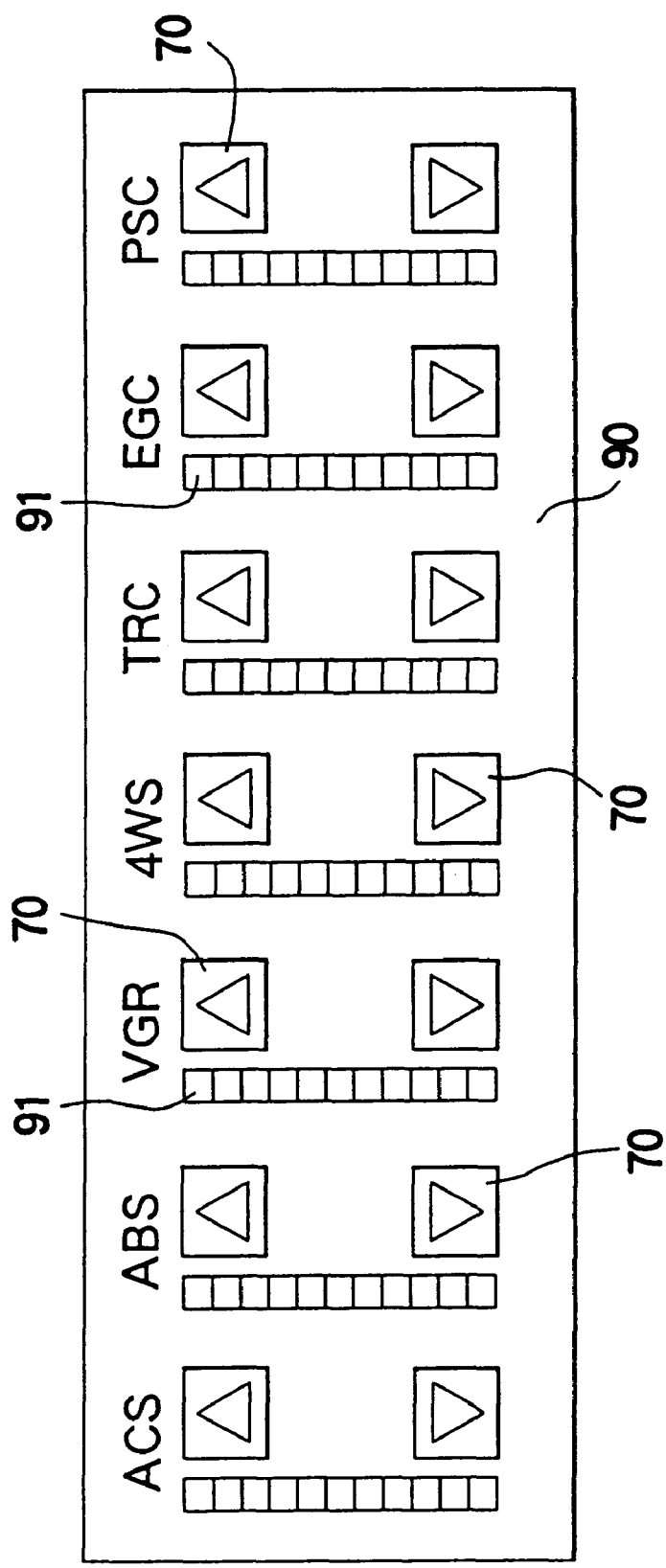
FIG. 7 is a front view of an instrument panel with a manual switch of the object vehicle.

A characteristic information or control gain for the engine control device 52, gear ratio control device 56, power steering control device 58, active suspension control device 61, anti-skid control device 63, traction control device 64 and four wheel steer control device 66 can be changed by means of the manual switch 70 in accordance with driver's taste. FIG. 7 shows an instrument panel 90 on which the manual switch is disposed wherein numeral 91 designates an indicator.

ROM 81 of the object vehicle 50 stores designated data A1 for city area drive, designated data A2 for urban area drive, designated data A3 for suburban area drive, designated data A4 for mountain area drive, designated data A5 for free way drive, designated data A6 for a road of which frictional coefficient $\mu$ is not greater than a predetermined value and designated data A7 which is used when the lateral acceleration of the vehicle 1 is greater than a predetermined value such as 0.5 G so as to improve the running stability.

ROM 41 of the simulation system stores the designated data A1 through A5 which are stored in standard data storage section 20 of the IC card as the standard data B1 through B5 as they stand when the simulation drive is carried out for the first time or when the delete switch 35 is operated. As the simulation driving is carried, the standard data B1 through B5 is compensated based on the learning control in which the learning program D1 and D3 through D6 learns the driver's operation and change the data B1 through B5. The learned data B1 through B5 are stored in the IC card 16 afterward.

The designated data A1 through A5 stored in ROM 81 are used only when the IC card is not read in by the card reader 75.

One of the designated data A1 through A5 is selected as a result of the detection of area where the vehicle 1 runs. The area is judged by the main computer 80 based on navigation signal from the computer unit 83 which receives the signal from the location detecting device 69. Where the simulation driving is not carried out yet or when the delete switch 35 is operated and simulation driving is not carried out but the object vehicle is driven after the IC card is read in by the card reader 77 of the object vehicle, the data A1 through A5 stored in the ROM 81 are used.

The designated data A6 and A7 stored in ROM 81 are used instead of the standard data B1 through B5 stored in the section 20 or learned data in the learned data storage section 21 of the IC card 16 when the vehicle 50 runs on a road of which frictional coefficient $\mu$ is not greater than the predetermined value and when the lateral acceleration GL is greater than the predetermined value such as 0.5 G so that the running stability can be obtained.

The standard data storage section 20 of the IC card 16 stores the data B1, B2, B3, B4 and B5 which are provided for city area drive, urban area drive, suburban drive, mountain area drive, and highway drive respectively. When the object vehicle 50 is driven after the IC card 16 is read in by the card reader 75, one of the data B1 through B5 is selected and used based on the signal from the location detecting device 67 which is processed in the computer unit 80 for detecting the area where the vehicle 50 is running.

The learned data storing section 21 stores learned control data which are used when the vehicle 50 runs in the specific area within a predetermined distance, for example, 20 km from the base point such as driver's house or the location of the dealer prior to the data B1 through B5. The judgment as to whether the vehicle 50 runs in the specific area is made based on the navigation signal produced by the computer unit 83. Initial learned data are produced by taking the mean value of data obtained based on the hypothetical driving in the specific area for the same range and same time band by a predetermined times. Thereafter, the learned data are compensated in accordance with the learning programs C1 and C2 and D1 through D7.

The programs C1 and C2 stored in the first learning program storage section 22 and program D1 through D7 stored in the second learning program storage section 23 are used for compensating the learned data stored in the section 21 when the simulation driving is made in the specific area. The learning program C1 detects and learns the vertical acceleration GV of the body 2 by means of the sensor 37 for each unit zone. The learning program C2 calculates and learns the lateral acceleration GL of the body 2 based on the curvature of roads in the specific area and driver's operation for each unit zone to compensate the learned data.

The learning programs D1 through D7 learn the driver's operation for the unit zone in the specific area with regard to a predetermined time band, such as every 3 hours of the day. The programs D1 learns vehicle speed V for the unit zone of the specific area and the predetermined time band of the day based on the driver's operation of the simulation system 1. The program D2 learns the location where the braking operation is made based on the driver's operation in the system 1. The program D3 calculates a mean value of the driver's operation for the steering wheel 53 for each unit zone, same time band in the specific area to learn the operation to thereby compensate the learned data. The program D4 learns a mean yaw rate Y for the unit zone of the road, for the same time band calculated by the main computer unit 40 based on the simulation driving to compensate the learned data. Likewise, the program D5 learns the driver's operation for the acceleration pedal 30, brake pedal 31 and clutch pedal 32 to compensate the learned data. The programs D6 and D7 learn the driver's operation for the shift lever 33 and the location where the manual switch 114 is operated respectively.

The unit zone is provided as for example 1 km of the road length wherein the adjacent unit zones have an overlapped road length, for example 100 m. Alternatively, the unit zone may be provided for a distance of 10 minute running of the vehicle 1 wherein adjacent unit zones have an overlapped portion of 1 minute running of the vehicle 1.

When the simulation driving is made by a predetermined times, such as 10 times, 50 times on the same unit zone of the same road in the same time band, the mean values about the terrain of the road are calculated so that the programs C1 through C2 are initially formed and stored in the section 21.

In forming the learned data, if the brake pedal 31 is operated within 5 m distance or if the manual switch 11 is operated within 10 m distance, such operations are deemed to occur at the same place.

RAM 82 of the object vehicle 50 includes compensation programs E1 through E7 for compensating the data B1 through B5 and learned control data in the IC card.

The program E1 compensates uniformly the standard data B1 through B5 when the main computer 80 detects night time based on a signal from the clock 71. The program E2 compensates uniformly the data B1 through B5 and learned control data when the computer unit 50 detects a bad traffic condition. The program E3 compensates uniformly the data B1 through B5 and learned control data when the computer unit 80 detects a weather condition of raining and snowing based on a signal from wiper and the like. The program E4 compensates uniformly the data B1 through B5 and learned control data when the computer unit 80 detects that a continuous driving time exceeds a predetermined period based on the accumulation meter 72. The compensation program E1 through E4 are formed based on experimental or theoretical data and stored in RAM 82.

The compensation program E5 compensates the standard data B1 through B5 based on the features of the specific driver's operation on the steering wheel 53 as a result of the operation speed of steering wheel 53 which are calculated by the main computer 80. When the main computer 80 detects instability of the vehicle running, the program E6 compensates uniformly the data B1 through B5 and learned control data.

The program E6 is formed experimentally and/or theoretically and stored in RAM 82 of the object vehicle 50. In forming the program E5, mean values of the operation speed of the steering wheel 53 is calculated for the same area, namely, city area, urban area, suburban area, mountain area and highway area and stored in RAM 82 when the vehicle has run a predetermined times, such as 100 times, and 200 times within the same area.

The programs E1 through E5 are not used for compensating learned control data but for compensating the data B1 through B5. There is no need for compensation of learned control data in the specific area because they are formed already taking account of the features of the driver's operation for every unit zone in the same time band of the day.

In FIG. 8, there is shown ratios of designated control data A1 through A5 stored in the ROM 41 of the simulation system 1 and the designated data A1 through A7 which are stored in ROM 81 of the object vehicle 50 and ratios of the standard data B3 formed after the simulation driving is made for a predetermined period and stored in the standard data storage section 20 of IC card 16.

In FIG. 8, ACS, ABS, VGR and 4WS are ratios between data A1 through A7 and B3 for the active suspension control device 12, anti-skid brake control device 14, gear ratio control device 7 and four wheel steer control device 17 respectively.

TRC, EGC and PSC are ratios between data A1 through A6 and B3 for the traction control device 15, engine control device 3 and power steering control device 9 respectively.

These ratios of the data is processed taking account of coefficients for the respective control devices so that actual control data can be obtained.

If ACS takes a value of 1, softest suspension characteristic can be obtained. Conversely, ACS value of 5 provides hardest one.

ABS value of 1 provides weakest control for the anti-skid control system in which the anti-skid control is relatively suppressed. Whereas, ABS value of 5 provides strongest control in which the anti-skid control is relatively facilitated. VGR value of 1 provides the greatest gear ratio while value of 5 provides the smallest gear ratio. 4 WS value of 1 provides the strongest tendency that the rear wheels are steered in the same direction as the front wheels. 4 WS value of 5 provides the strongest tendency that the rear wheels are steered in the opposite direction to the front wheels. TRC value of 1 provides the weakest traction control for suppressing a slip of the wheels while value of 5 provides the strongest traction control. EGC value of 1 provides an engine control for the best fuel consumption efficiency. EGC value of 5 provides an engine control for most powerful output. PSC value of 1 provides the strongest assistance for the steering operation while the value of 5 provides the weakest assistance for the operation.

These control data for controlling the running characteristics of the vehicle 1 are determined so as to satisfy the driver as many as possible.

In the designated data A1 for the city area drive, the ACS is set at a value of 4 which provides a relatively hard suspension characteristic. In the city area drive, the start and stop operation are frequently repeated because of a bad traffic and numerous traffic lights. Thus, the harder characteristic can improve a riding comfort because a squat and dive of the vehicle 50 resulting from the start and stop operation can be suppressed as low as possible. On the other hand, in the designated data A2 for urban area drive, the ACS is set at the smallest value of 1 to provide the softest suspension characteristic. In the urban area, the vehicle speed is increased in comparison with the city area. But, this increase of the vehicle speed is not remarkable and the running stability can be maintained. In view of this, the ACS is set at the smallest degree so as to pursue the riding comfort. In the designated data A3 for the suburban area drive, the ACS is set at a value 2 because the vehicle speed is remarkably increased and therefore the running stability is reduced. In the designated data A4 and A5, the value is further increased to be values of 3 and 4 respectively to make the suspension characteristic harder so as to improve the running stability taking account of the remarkable increase of the vehicle speed. In the designated data A6 for the low friction load drive, the ACS is set at the smallest value of 1 to provide the softest suspension characteristic. In the designated data A7 which is used when the lateral acceleration of the vehicle is greater than a predetermined value such as 0.5, the ACS is set at the largest value of 5 provide the hardest suspension characteristic to improve the running stability.

The designated data A3 is compensated to be the standard data B3 as shown when the driver makes a mild operation.

FIG. 9 shows how the learned control data stored in the section 21 of the IC card 16 are compensated. FIG. 10 shows how the standard control data stored in the section 20 of the IC card 16 are compensated by the programs D1, D3 through D6 and how the learned control data in the section 21 are compensated by the programs D2 and D7 in accordance with the driver's operation through the simulation driving for every unit zone in the specific area.

FIG. 11 shows how the data B1 through B5 in the section 20 of the IC card 16 are compensated by utilizing the compensation program E1 through E6 and the learned data in the section 21 of the IC card 16 are compensated by the program E7.

Compensation based on the driver's operation is made in light of a map in FIGS. 9, 10 and 11. In FIGS. 10 and 11, "large" means that the control data is compensated by a relatively large extent. "Small" means that the control data is compensated by a relatively small extent.

Figure 12:
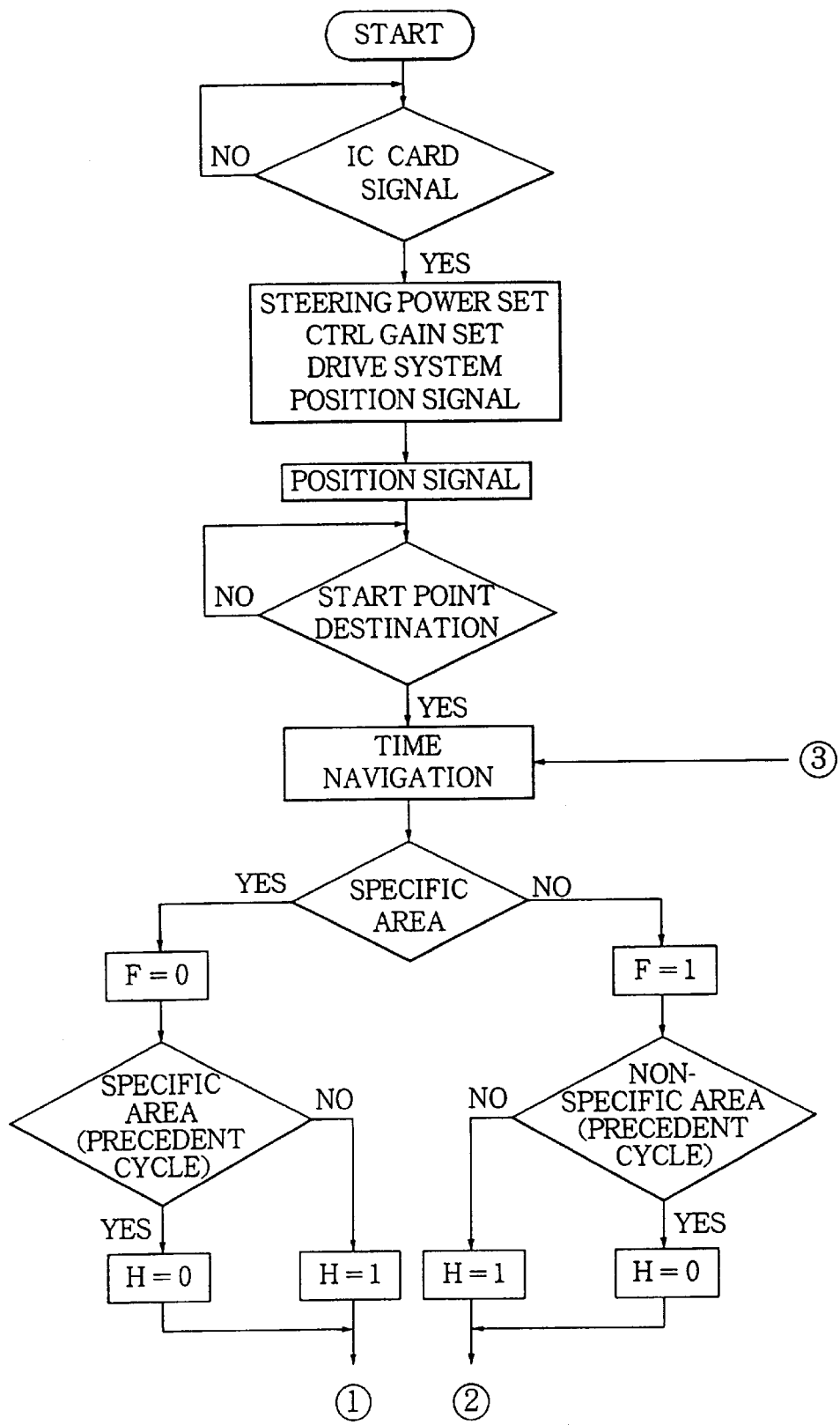
FIGS. 12, and 13 are a flow chart of a basic routine of the learning control for the control gain for controlling the running characteristics of the simulation system.
Figure 13:
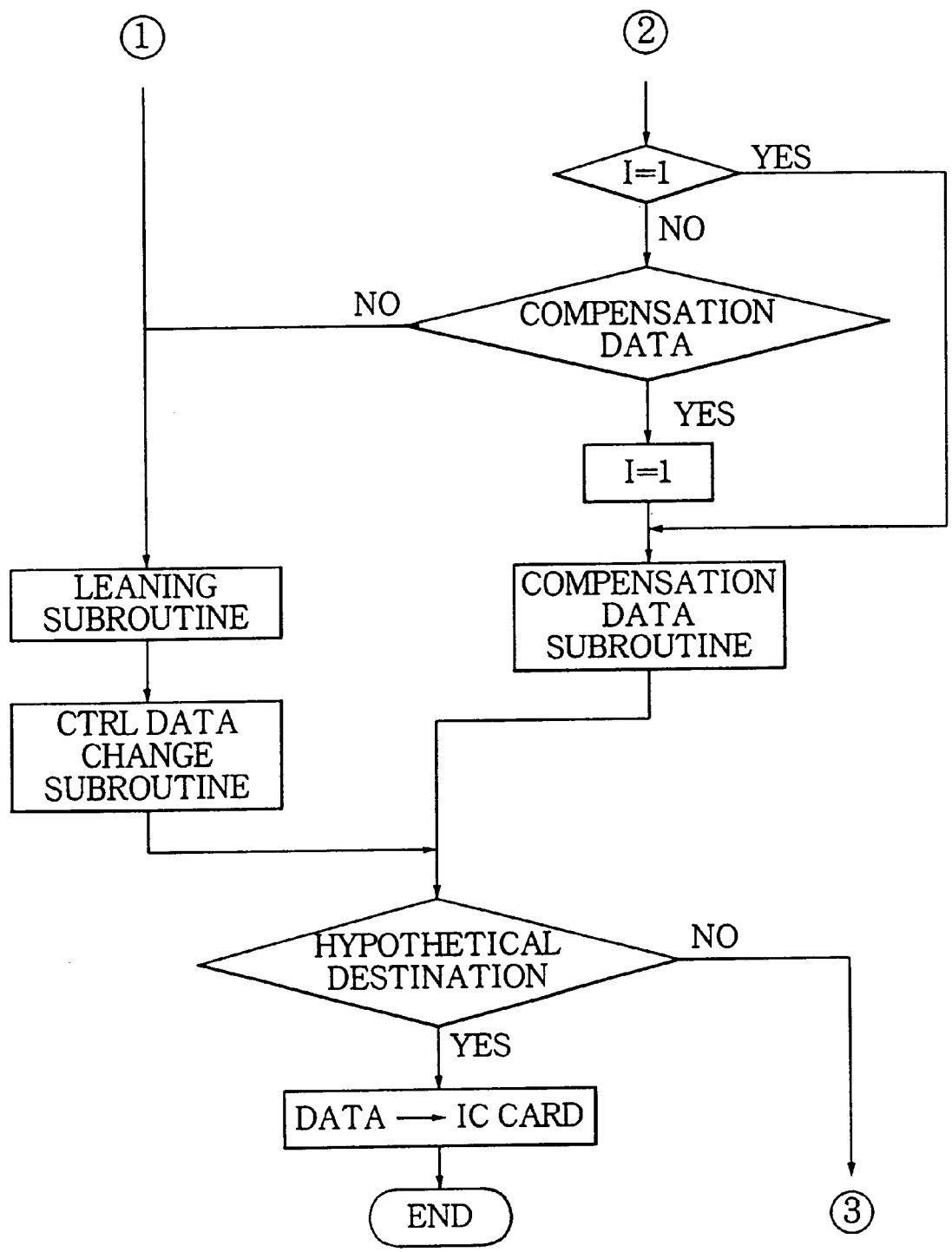
Figure 14:
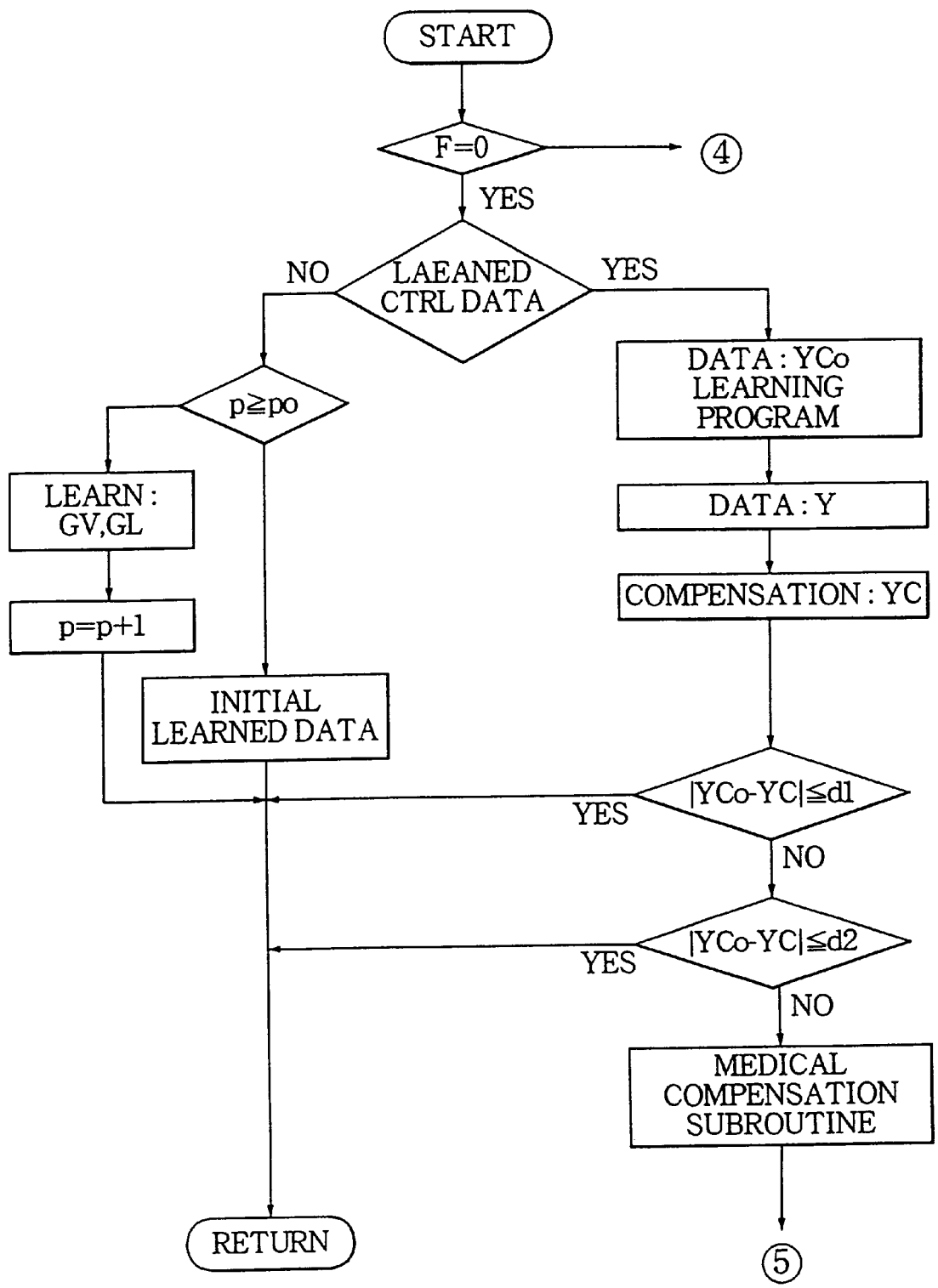
FIGS. 14 through 17 are a flow chart of a learning control of control data.
Figure 15:
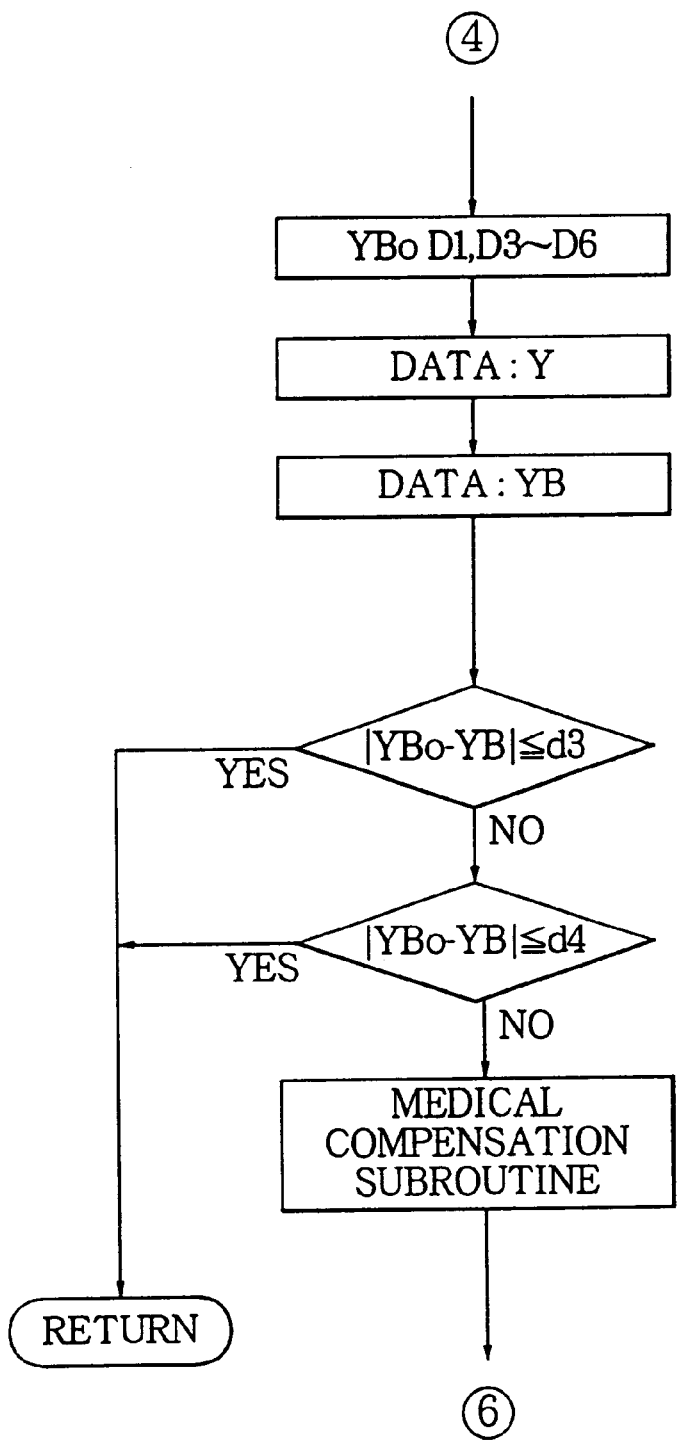
Figure 16:
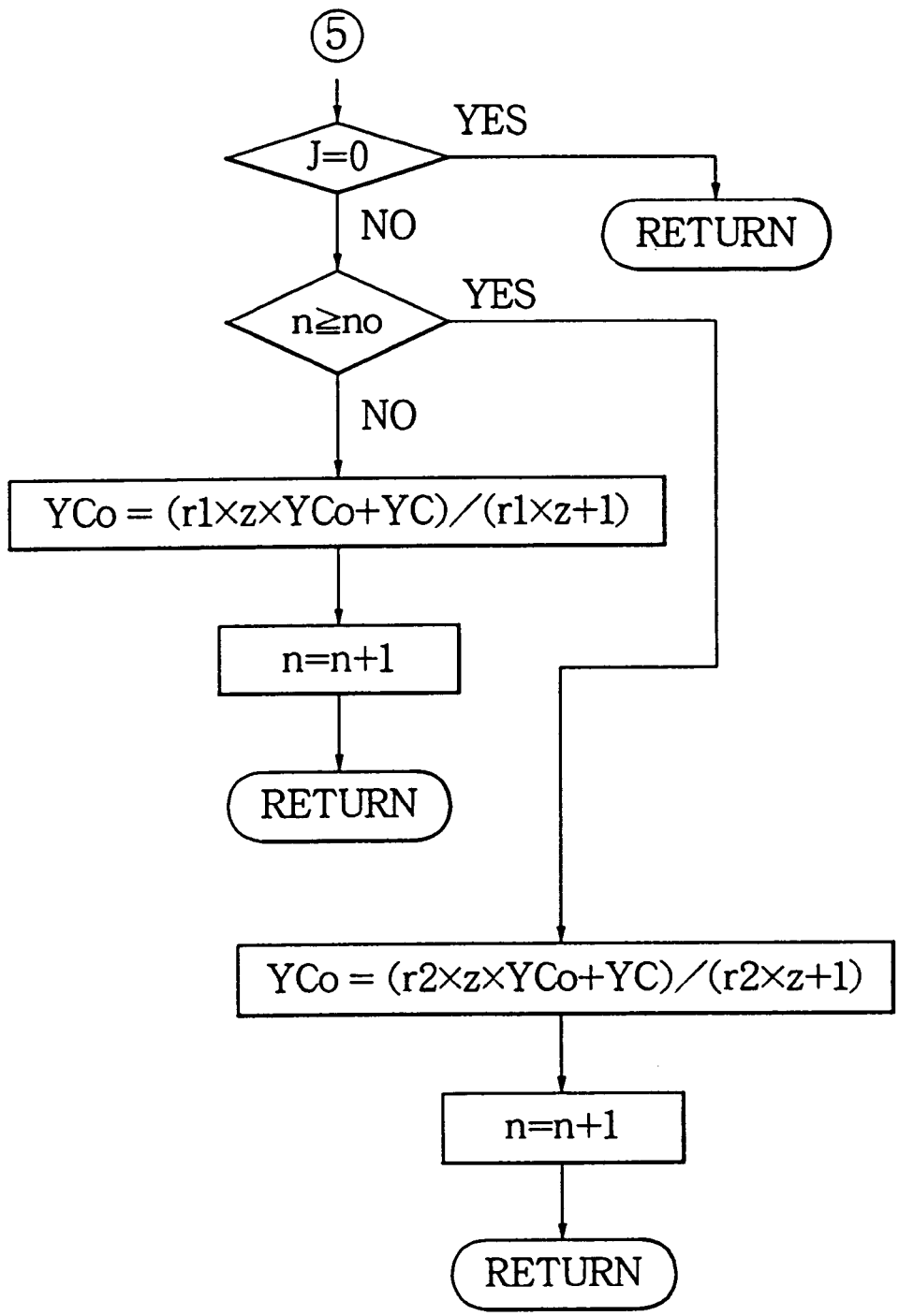
Figure 17:
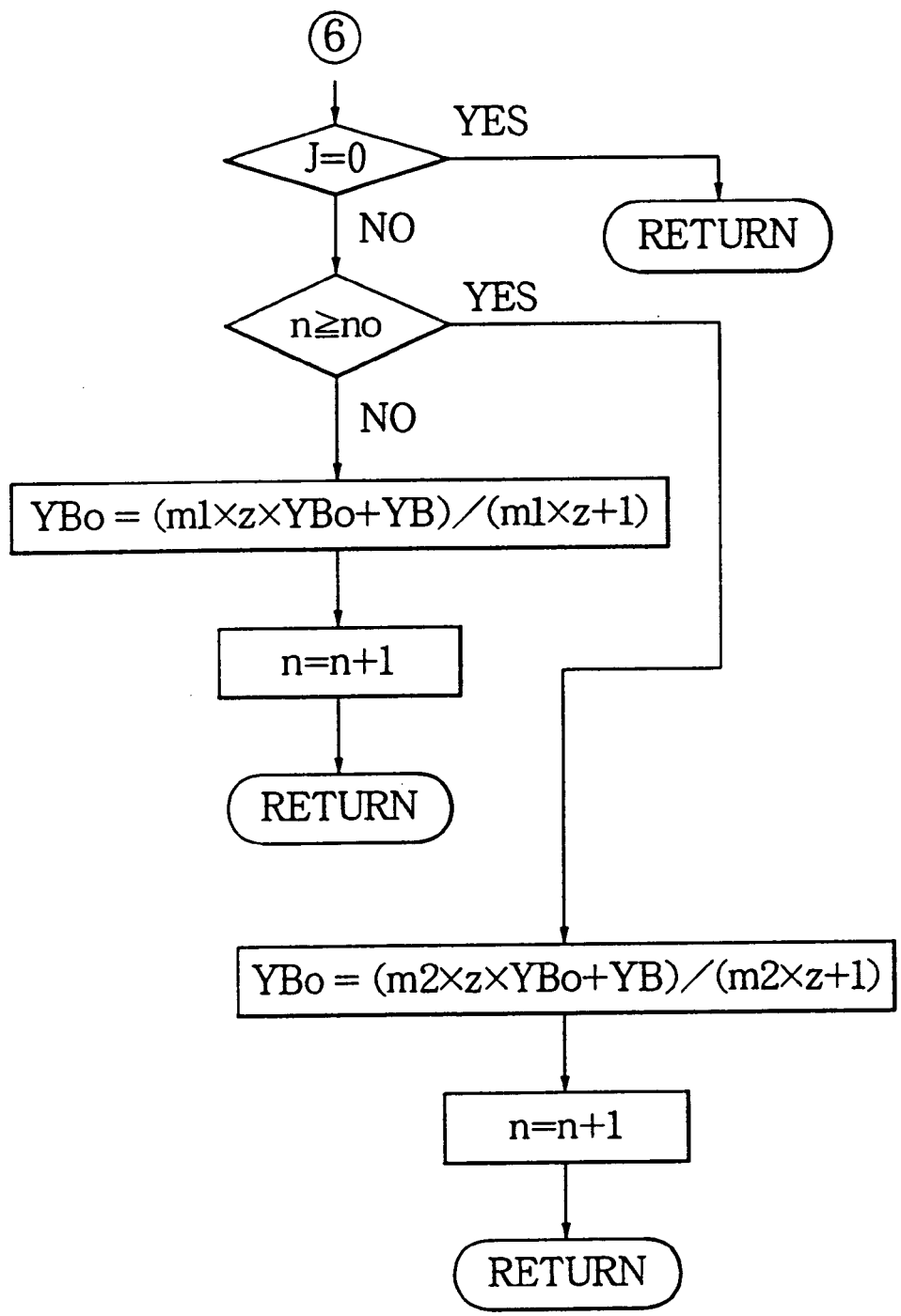

In FIGS. 12 and 13, there are shown flow charts of basic routine of the simulation driving in the main computer 40 of the simulation system 1.

The simulation system 1 is not actuated unless the IC card 16 is inserted and connected with the IC card reader 9. The computer 40 judges whether or not a read in signal is entered from the card reader 9. When the signal is introduced, computer 40 read in various data from the IC card 16 and stores the data in the RAM 42. The main computer unit 80 read out data about the driving system from ROM 41, such as steering characteristic, suspension characteristic, gear ratio, position data of steering wheel 53, acceleration pedal 30, brake pedal 31, clutch pedal 32, shift lever 33 in accordance with the identifying data storage section 18 of IC card 16 to determine the steering force of the steering force control device 46, characteristic information or control gain of the body control mechanism 13 and produce the control signal to the position control device 45 so that the position change mechanism 5 is actuated to adjust the position of the driving system corresponding to the object vehicle 50.

Namely, the computer 40 read out the driving position data stored in the section 19 of the IC card 16 to cause the devices 45 and 44 to adjust the inclination of steering wheel 3, position of the seat 6 and the like.

When the driver enters the start point and destination, the computer read the time for starting the simulation driving from the clock 71.

The computer 40 finds the hypothetical drive area where the simulation is supposed to be made, and produces signal to the image signal receiver 36 so that the receiver 36 receives the pictorial image signal corresponding to the hypothetical drive area.

The computer 40 causes the image control device 43 to produce the pictorial image corresponding to the hypothetical drive area and display the image on the screen 4. Then, the computer 40 judges whether or not the hypothetical drive area is in the specific area.

When the hypothetical drive area is in the specific area, the computer 40 sets Flag F at 0 and judges whether or not the hypothetical drive area is in the specific area in the preceding cycle. If the judgment is Yes or if the hypothetical drive area is in the specific area in the preceding cycle, the computer 40 set a flag H at 0 and if not, the flag H is set at 1. In the above situation, if the hypothetical drive area is not in the specific area, the computer 40 sets the flag F at 1 and then the same judgments are made to determine the value of the flag H.

The computer 40 judges whether or not a flag I is set at 1 when the simulation is being made in an area other than the specific area. The flag I is set at 1 when a subroutine for compensation data forming program is about to be carried out and set at 0 when the program is finished.

In the above judgment, if the flag I is not 1, the computer 40 judges whether or not the compensation data is to be formed. If the compensation data is to be formed, the computer sets the flag I at 1 and carries out the compensation data subroutine program.

If the compensation data is not to be formed, the computer 40 carries out the learning program of the standard control data and control data change subroutine. Then, the computer 40 reads in the time and continues similar procedure until the simulation drive reaches the hypothetical destination. If the simulation drive reaches the destination, the data stored in the RAM 42 of the simulation system 1 is stored in the IC card 16 to finish the simulation drive.

Referring to FIGS. 14, 15, 16 and 17, there are shown a flow chart of learning control subroutine.

The computer 40 first judges whether or not the value of the flag F is 0 or whether or not the simulation drive is being made in the specific area. If the simulation drive is being made in the specific area, the computer 40 judges whether or not the learned control data is read from the IC card 16 and stored in the RAM 42 corresponding to the unit zone for the same time band where the simulation drive is being made. If the judgment is No and the learned data is not stored in the RAM yet, the computer unit 40 learns the vertical and lateral accelerations GV and GL and driver's operation in the unit zone for the simulation drive and increase the renewal number p to store in the RAM 42. When the simulation drive is made on the hypothetical drive area by a predetermined times, such as 10, or 50, the computer 40 forms initial learned control data based on a mean value of the data stored in the RAM 42. When the simulation drive is finished, the computer 40 reads out the data and stores them in the learned control data storage section. If the renewal number p does not reach the predetermined value po and the simulation drive is finished, the computer 40 stores the number p of RAN 42 in the storage section 25 of the IC card. If the learned data is read out from the RAM 42 and stored in the IC 16, the computer 42 reads out the learning programs C1 and C2 and Dl and D7.

Namely, the computer 40 reads out the learned data YCo for engine control device 52, gear control device 56, power steering control device 58, active suspension control device 61, anti-lock braking control device 63, traction control device 64 and four wheel steering control device 66.

The computer 40 reads hypothetical drive data Y and compensates the learned control data YCo based on the drive data Y in accordance with the learning programs C1, C2 and D1 through D7 to get the compensated control data YC. Then, the computer 40 judges whether or not difference between the learned control data YCo and the compensated control data YC is not greater than a predetermined value d1 for each of the control devices.

If the difference is not greater than the predetermined value d1, the computer 40 does not learn the compensated control data YC because it is not necessary to compensate the learned control data YCo. If the difference is greater than the value d1, the computer 40 judges whether or not a predetermined value d2 (d2>d1). In this case, the computer 40 does not learn the compensated data YC either because the driver's operation is not consistent.

If the difference takes a value between the values d1 and d2, the computer then carries out the mental compensation subroutine to determine how to learn the compensated control data YC.

Figure 18:
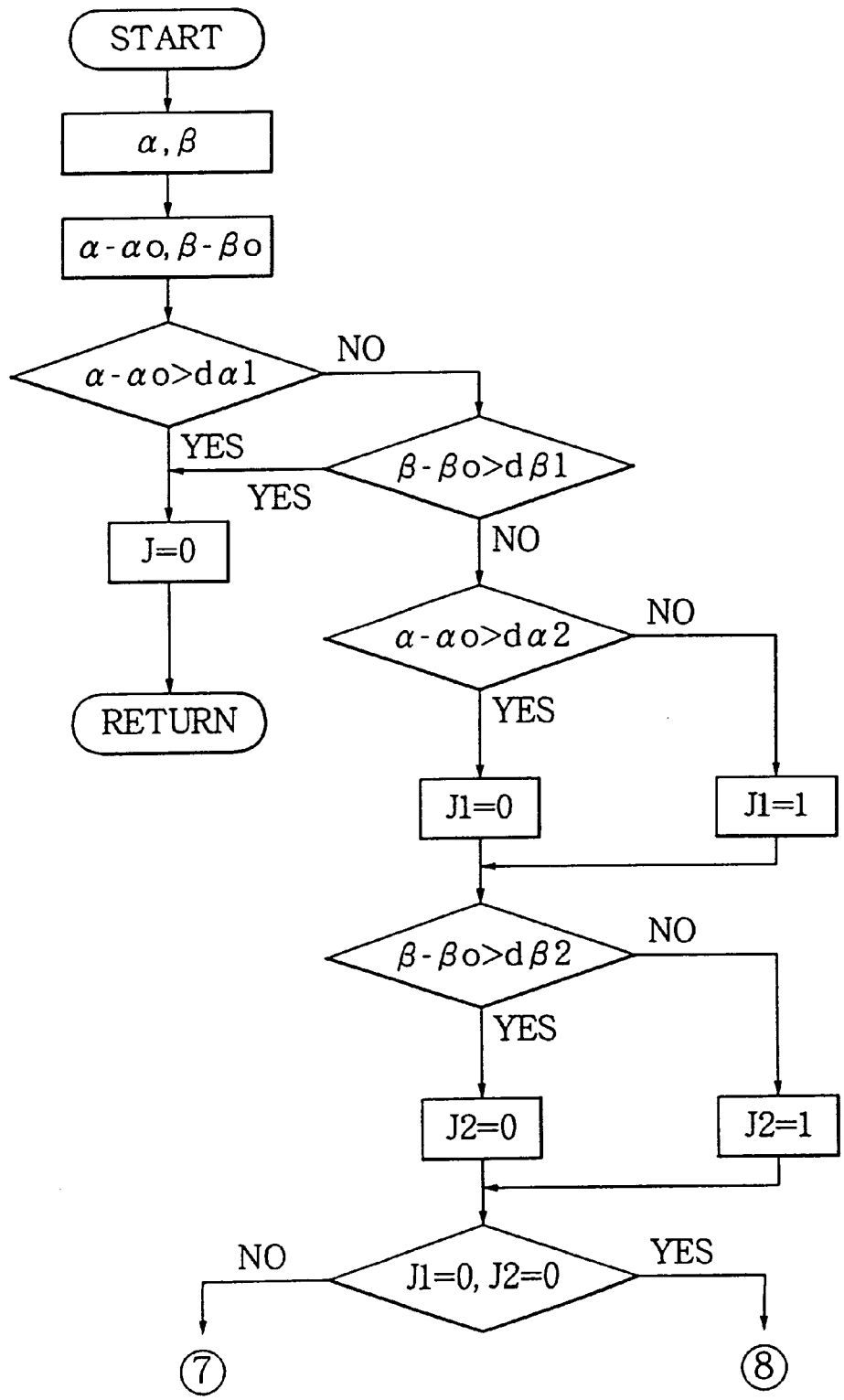
FIGS. 18 and 19 are a flow chart of medical compensation control.
Figure 19:
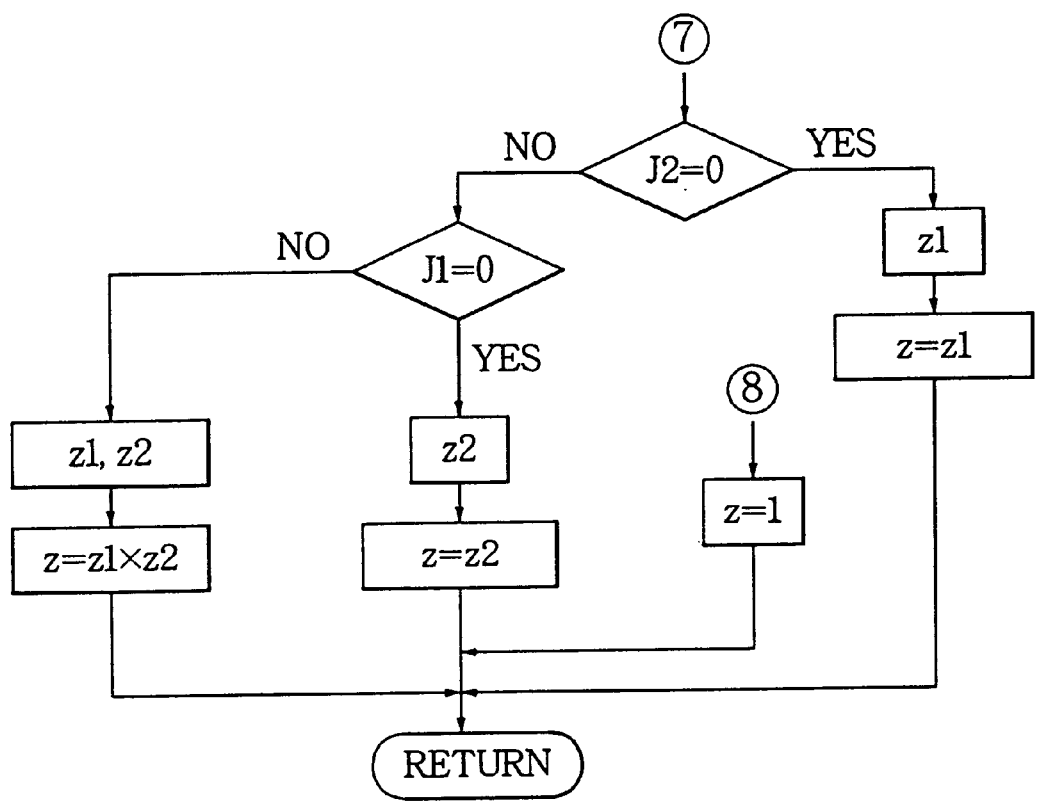

Referring to FIGS. 18, 19 show flow charts of the subroutine for the mental compensation.

The computer 40 reads heart beat a, pulse $\beta$ among the data detected by the detecting device 8, such as blood pressure, sweating condition, brain wave, and grip force of the steering wheel 3 and calculates the difference from the standard heartbeat $\alpha$o and pulse $\beta$o stored in the standard medical data storage section 27 of the IC card 16. The standard values $\alpha$o, $\beta$o are provided in a manner that the maximum values measured prior to the simulation drive are multiplied by a coefficient greater than 1. This compensation is based on the fact that the heart beat and pulse are usually increased when the driver sits on the seat.

The computer 40 judges whether or not the difference between the detected heartbeat a and the reference value ?$\alpha$o is greater than a predetermined value d$\alpha$1. If the judgment is Yes, the computer 40 sets a flag J at 0 and stops the routine. If No, or if the difference is not greater than the value d$\alpha$1, the computer 40 further judges whether or not the difference between the reference pulse ?$\beta$o and the detected pulse $\beta$ is greater than a predetermined value d$\beta$o. If this judgment is Yes, or the difference is greater than the value duo, the computer 40, likewise, sets a flag J at 0 and stops the subroutine. If the difference of the heartbeat is not greater than the value d$\alpha$1, the computer 40 further judges whether or not the difference between the value a and $\alpha$o is not greater than a predetermined value d$\alpha$2 (d$\alpha$2<d$\alpha$1).

If the judgment is Yes, the computer 40 sets the flag J1 at 0, and if No, the computer 40 set the flag J1 at 1.

Figure 20:
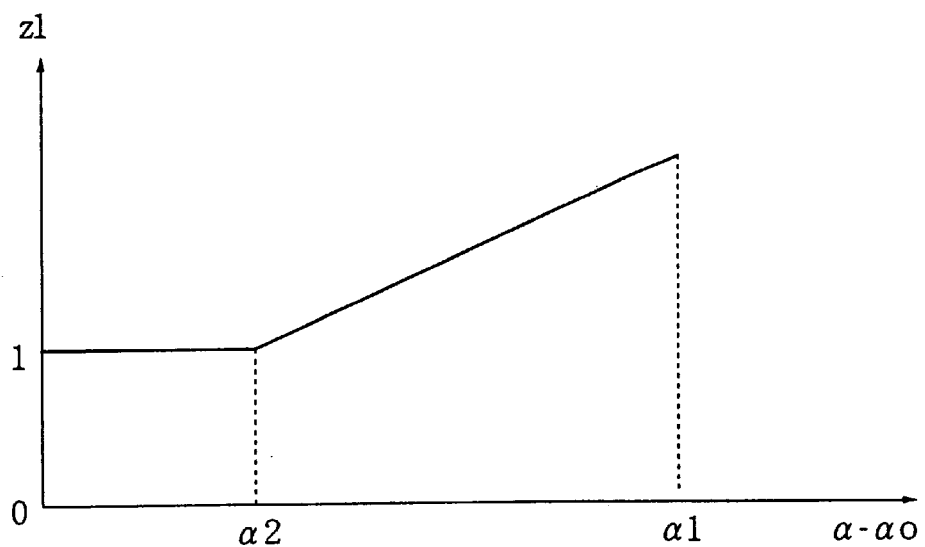
FIGS. 20 and 21 are maps for determining compensation parameter.
Figure 21:
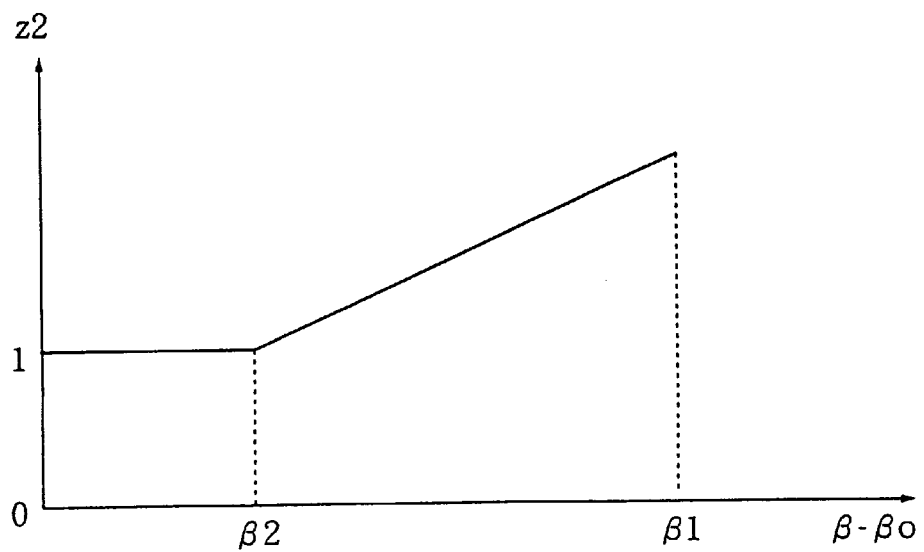

The computer 40, next, judges whether or not the difference between the detected pulse $\beta$ and reference pulse $\beta$o is not greater than a value d$\beta$2 (d$\beta$2<d$\beta$1). If the judgment is Yes, the computer 40 sets a flag J2 at 0 and if NO, the computer 40 sets the flag J2 at 1. If both flag J1 and J2 are 0, it is considered that the mental condition of the driver is stable. Thus, the computer 40 sets a compensation parameter z at 1 and ends the subroutine for the mental compensation and thereafter carries out the learning control subroutine. If the flag J1 is 1 but flag J2 is 0, the computer 40 reads the parameter z1 from a map shown in FIG. 20 and sets the parameter z at z1 to finish the mental compensation subroutine. The value of z1 increases gradually from 1 as the difference increases from d$\alpha$2 to d$\alpha$1. If the flag J1 is 0 and flag J2 is 1, the computer 40 sets the parameter z at z2 based on a map shown in FIG. 21 to finish the subroutine. The value z2 gradually increases from 1 as the difference increases from d$\beta$2 to $\beta$1. If both flags J1 and J2 are 1, computer determined the values z1 and z2 based on the maps shown in FIG. 20 and 21 and ends the mental compensation subroutine.

Then the computer 40 returns to the main routine shown FIGS. 14 through 17 and judges whether or not the flag J is 0. If the flag J is 0, the computer 40 ends the learning control routine. If the flag J is not 0, the computer 40 judges whether or not the renewal number n reaches a predetermined number no. If the renewal number n does not reach the no, the computer learns the compensated data YC in accordance with the following formula;

$$YCo=(r1*z*YCo+YC)/(r1*z+1)$$

Wherein r1 is constant, such as 100. As the value z increases, the compensation of the learned data YCo reduces. Thus, the driver's mental condition is not stable, the compensation by means of the learning reduces.

Thereafter, the computer 40 increases the renewal number n by 1 and store in the RAM. If the number n is greater than the value no, the computer 40 learns the learned control value YCo by the following formula;

$$YCo=(r2*z*YCo+YC)/(r2*z+1)$$

Wherein r2 is a constant, such as 150 (r2>r1).

When the hypothetical drive area is an area other than the specific area, the computer 40 read out the standard control data YBo and reads in hypothetical drive data Y and compensates the data YBo in accordance with the learning programs D1, D3 through D6 to obtain the compensated data YB. This procedure is similar to that for the compensated data YC so that the detailed explanation is omitted.

Figure 22:
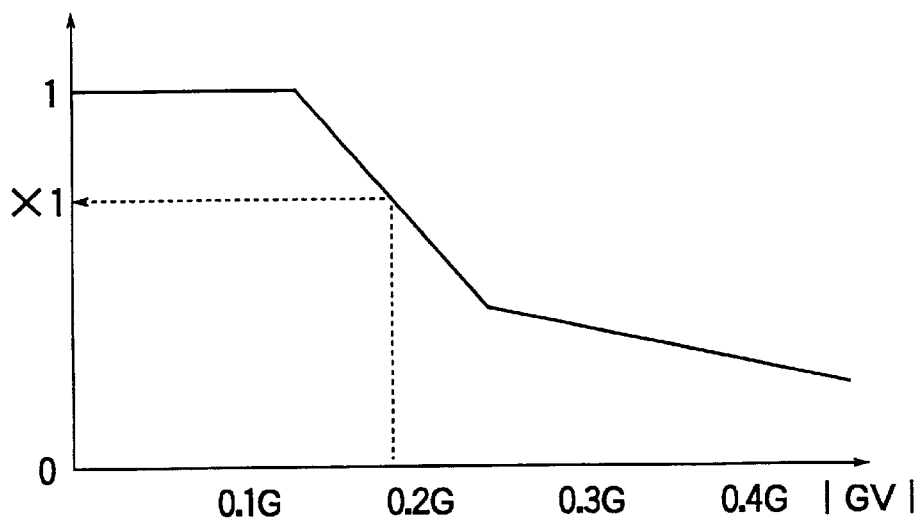
FIGS. 22 and 23 are maps for determining compensation coefficients.
Figure 23:
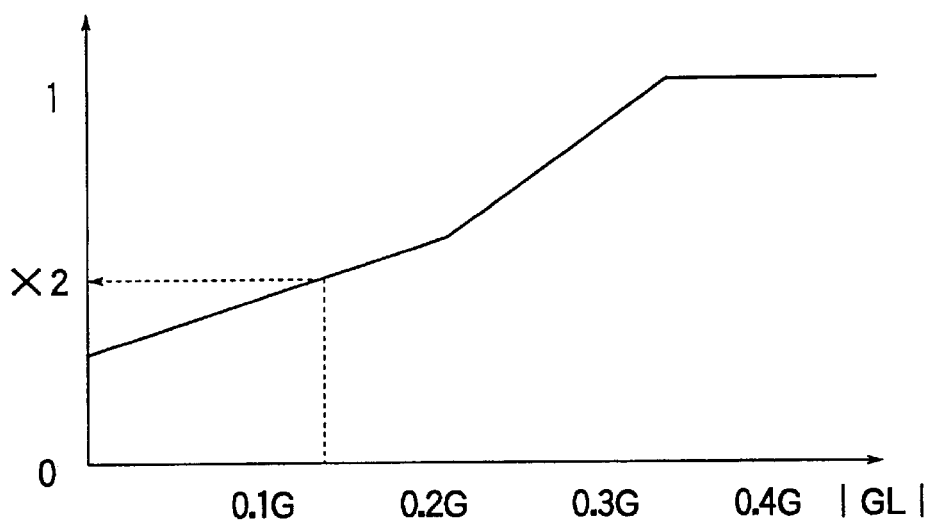

FIGS. 22 and 23 shows maps which are used when compensating the control data for ACS in accordance with the learning programs C1 through C2 for learning terrain condition.

FIG. 22 is a map showing a relationship between the vertical acceleration GV and compensation data. FIG. 23 is a map showing a relationship between the lateral acceleration GL and the compensation data which are stored in ROM 41 of the simulation system 1. The compensation data x1 for the program C1 is obtained based on a signal from the vertical acceleration sensor 37 in light of a map shown in FIG. 22. The value 1 corresponds to the hardest suspension characteristic. The value 0 corresponds to the softest suspension characteristic.

The compensation data x2 for the learning program C2 is calculated based on a signal from the lateral acceleration GL in light of the map as shown in FIG. 23.

Compensation data Xc for the programs C1 through C3 is calculated based on the data x1 and x2.

$$Xc=(x1+x2)/2$$

Similarly, the compensation data Xd for the learning programs D1 through D7 is calculated in light of a map (not shown) stored in ROM 41.

The compensation control data YC is obtained through the following formula based on the data Xc and Xd.

$$YC=(K1*Xc+K2*Xd)/(K1+K2)$$

K1, K2 are weight coefficients (K1<K2). As aforementioned, the computer 40 compares the data YCo which have been obtained in the preceding cycle with the data YC obtained by the above procedure so as to determine whether the learning control should be made.

The computer 40 determine whether or not the learning of the compensated data YC based on the difference between YCo and YC.

Likewise, the compensation data YB are obtained based on the standard data B1 through B5 in accordance with the compensation programs D1 through D7.

Figure 24:
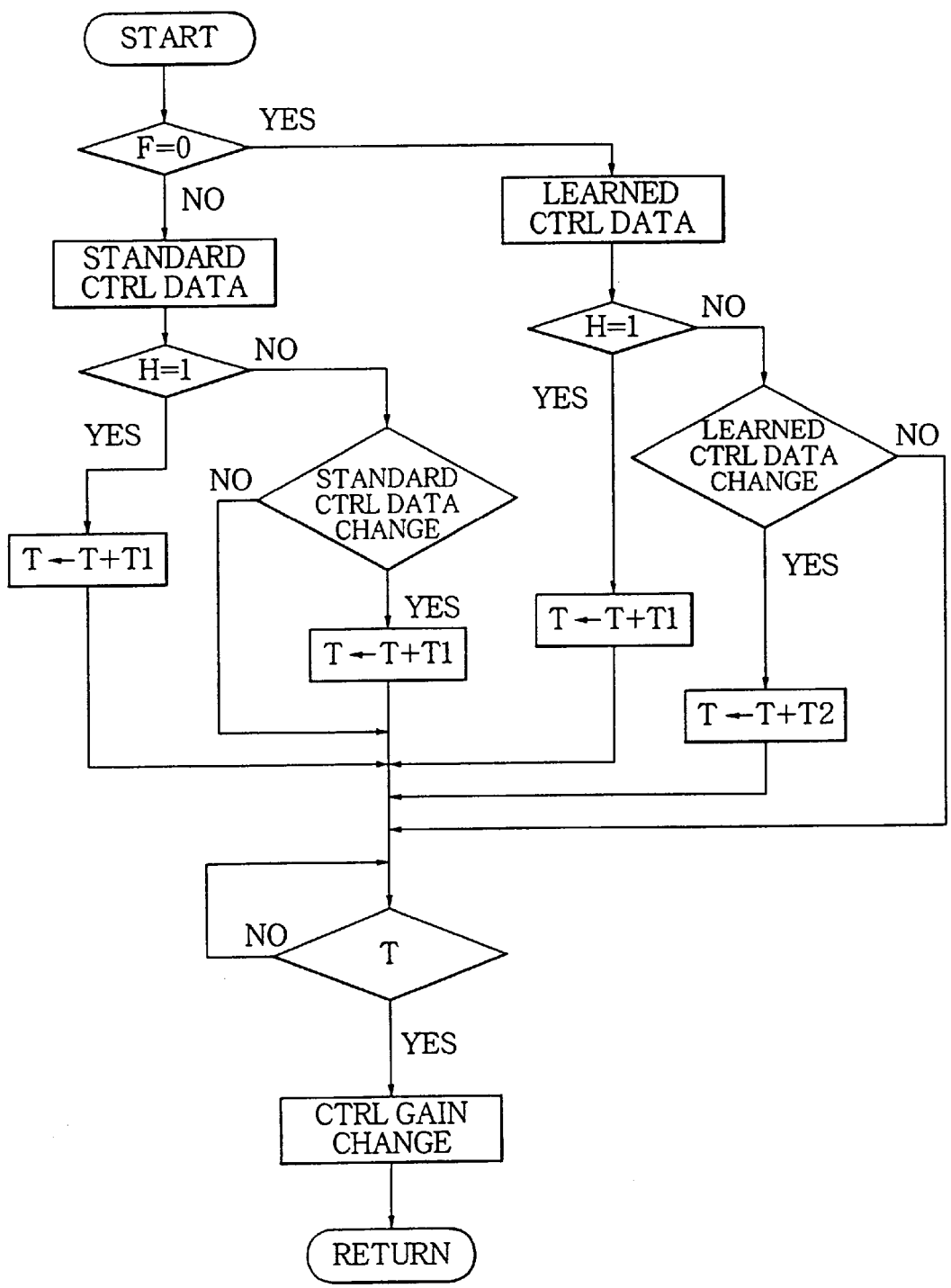
FIGS. 24 through 29 are a flow chart for producing the compensation coefficients.
Figure 25:
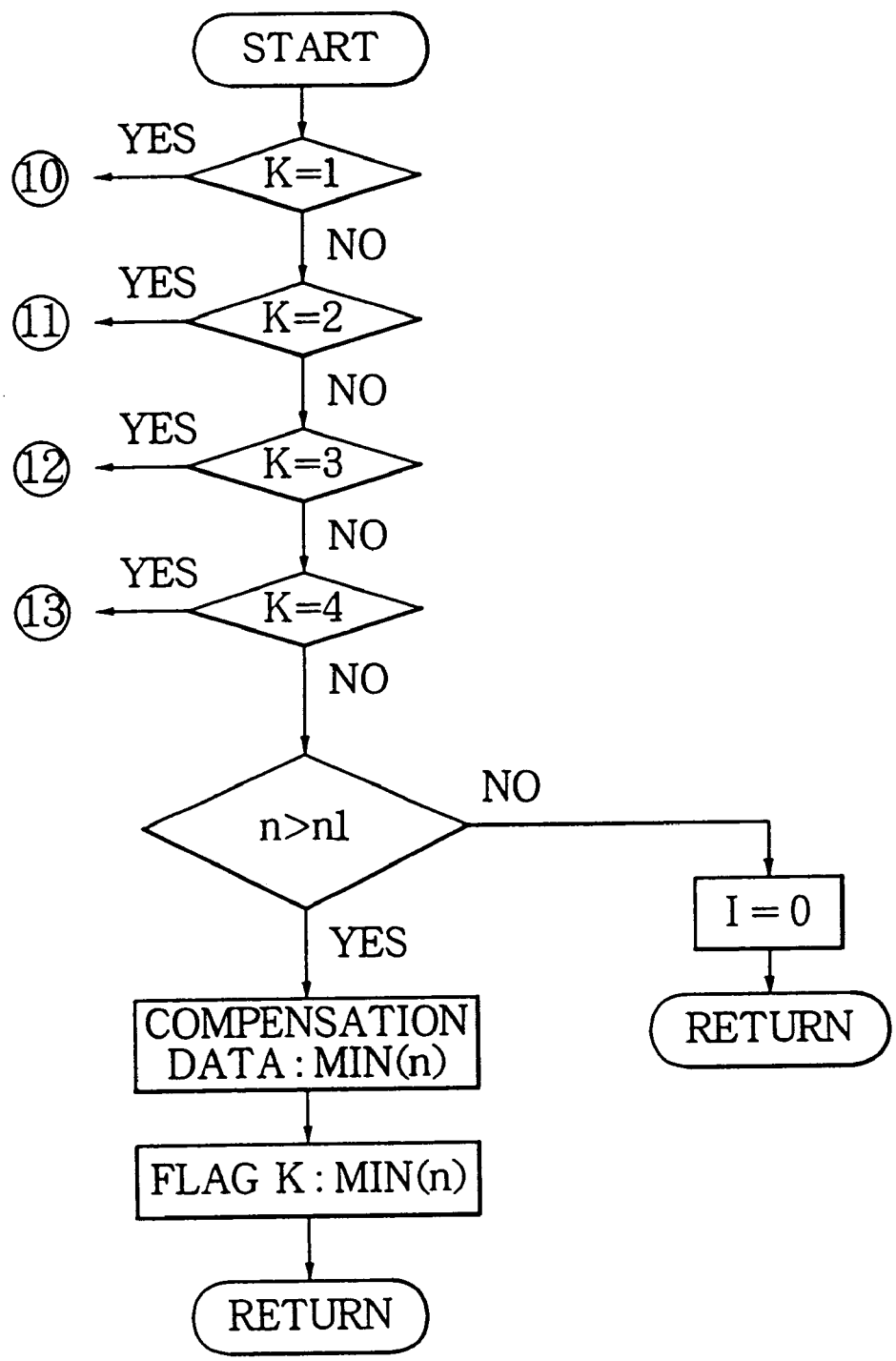
Figure 26:
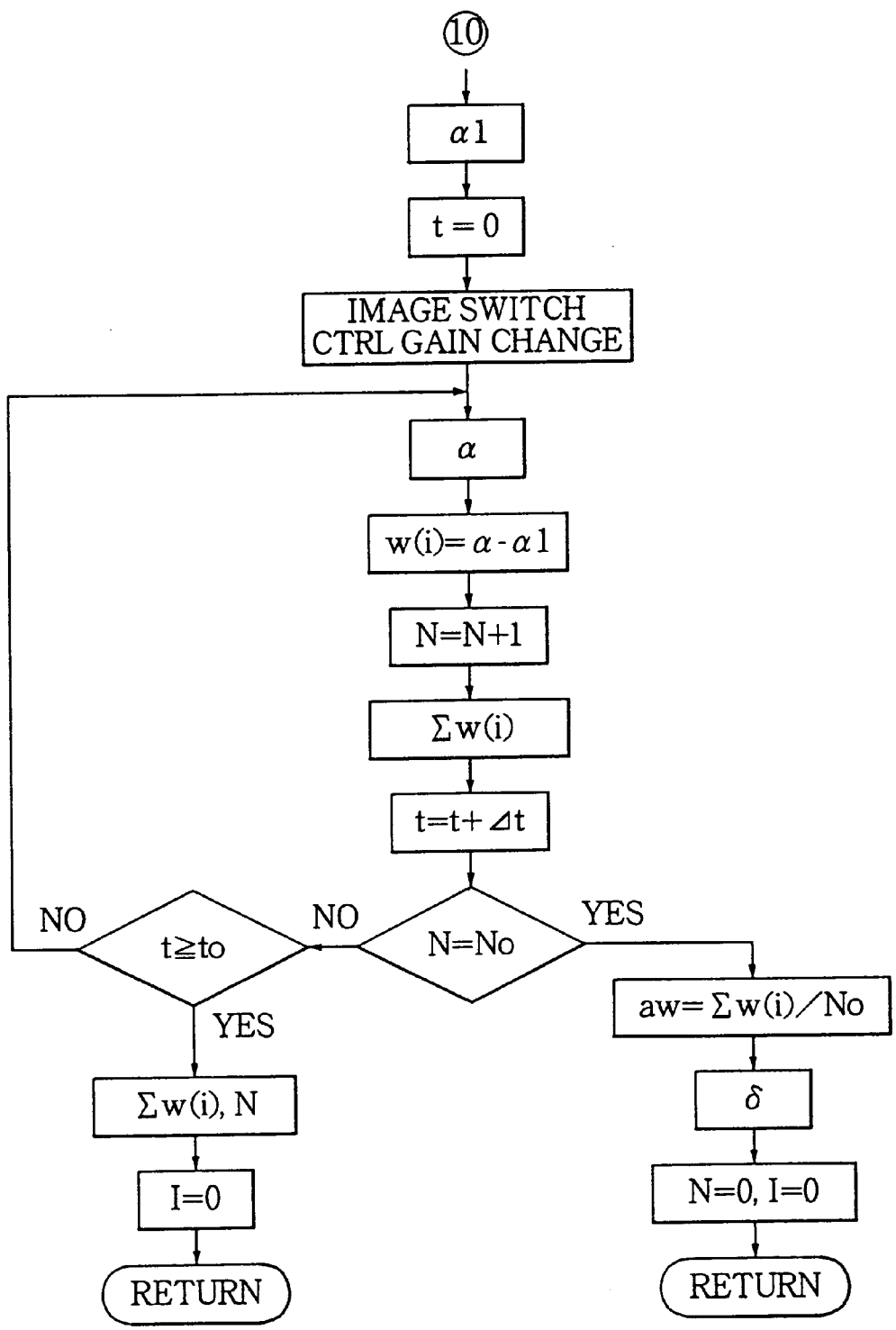
Figure 27:
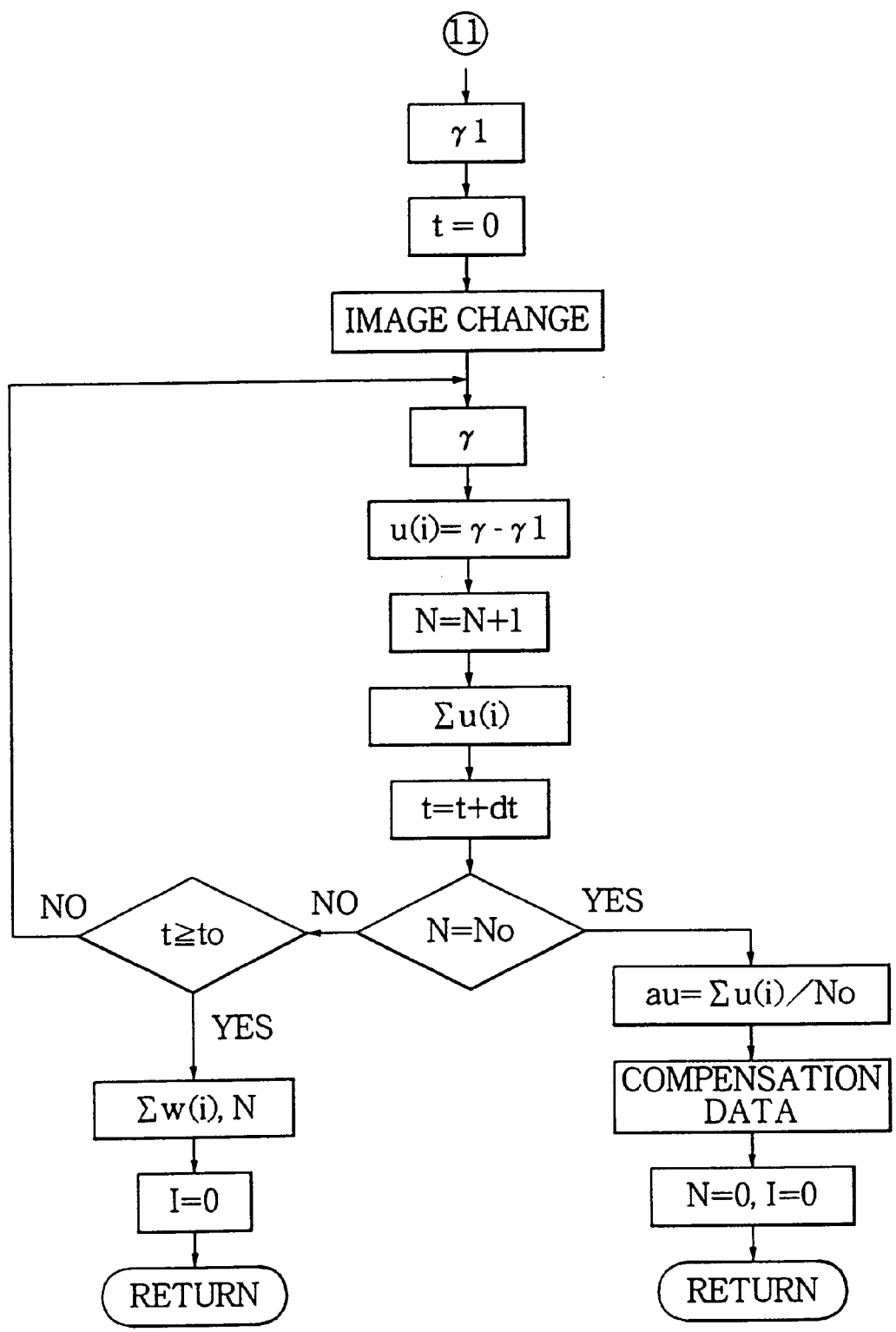
Figure 28:
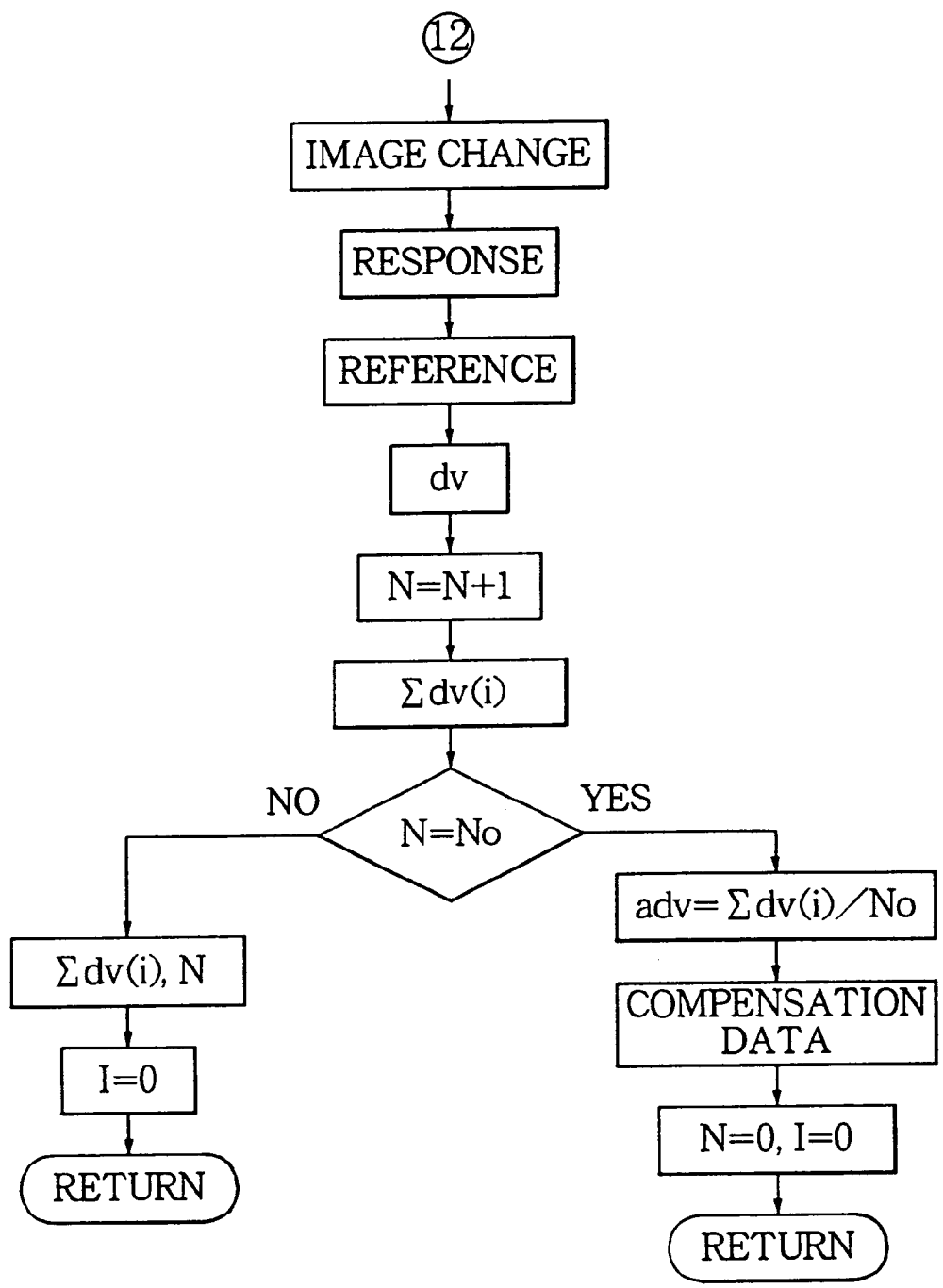
Figure 29:
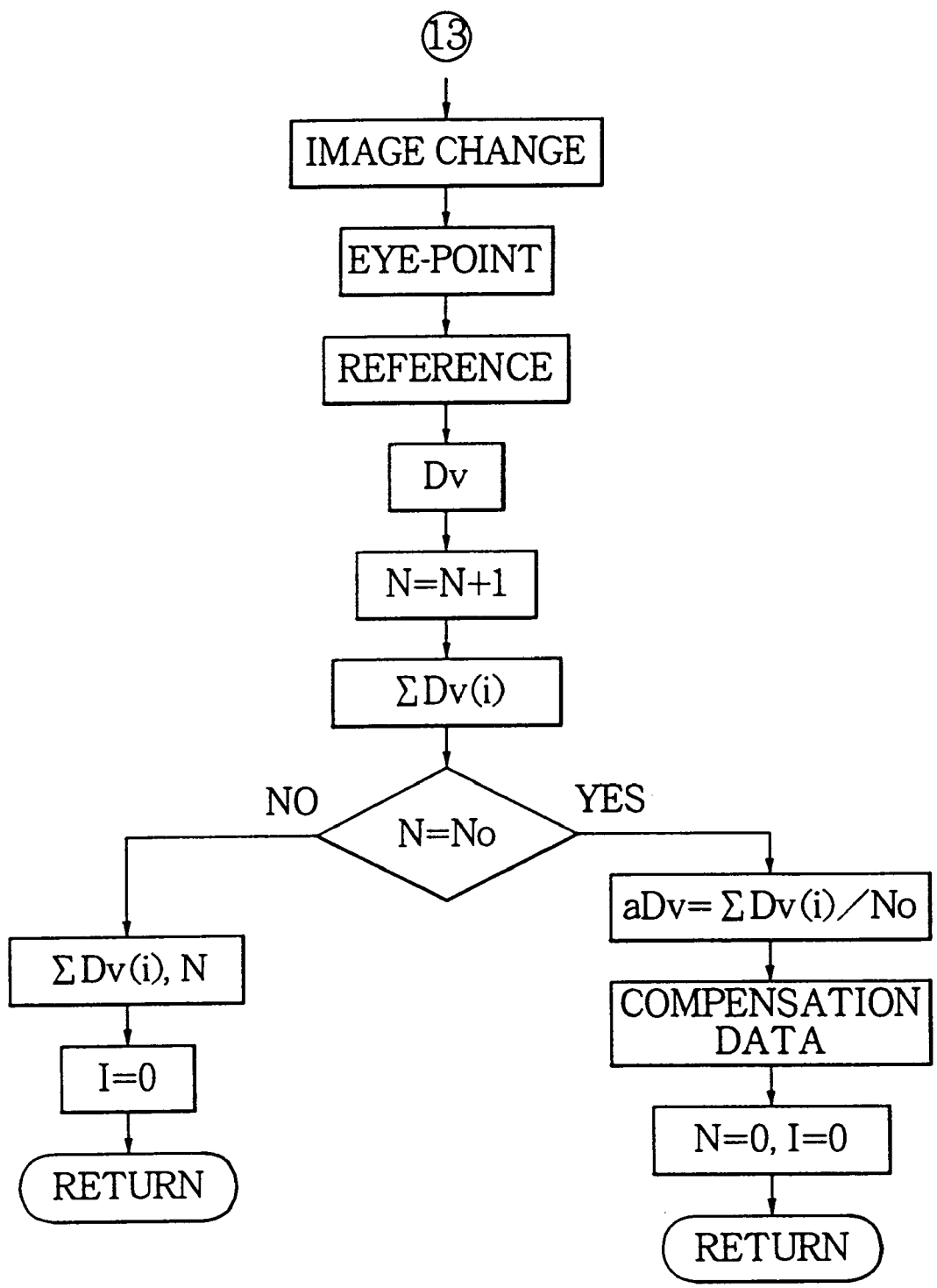

Next, the computer 40 carries out control data change subroutine shown in FIG. 24.

Referring FIG. 24, the computer 40 judges whether or not the flag F is 0. If not, the hypothetical drive area is an area other than the specific area. In this case, the computer 40 reads out the standard data stored in the RAM 42 corresponding to the area. Next, the computer 40 judges whether or not the flag H is 1. If the flag H is 1, this means the hypothetical drive area is moved out of the specific area in this cycle to switch the learned control data to the standard control data. In order to avoid an abrupt change of the control data, the computer 40 adds the time T1 to the control time T stored in the timer 38.

If the flag H is not 1 in the above step, the computer 40 judges whether or not the standard control has been changed. If changed, the computer 40 adds the time T2 to the control time T2 so as to prevent abrupt change of the characteristics of the simulation system 1. After the time T set in the timer 38, the computer 40 determines the characteristics of the body control mechanism 13, image control device 43 and steering force control device 46 are gradually changed. If the hypothetical drive is made in the specific area, the computer 40 reads out the learned control data. Thereafter, the computer 40 carries out the similar steps to determine the characteristics of the mechanism 13, devices 43 and 45.

Then, the computer 40 judges whether or not the simulation drive reaches the destination. If the judgment is Yes, the computer 40 reads and stores the learned data and the standard data in the storage sections 20 and 21 of IC card 16 and ends the simulation drive.

FIGS. 25, 26, 27, 28 and 29 is a subroutine for forming compensation data. The compensation data are used for compensating the learning programs which changes the standard and learned control data. In the routines of FIGS. 12, 13, when it is judged that the compensation data should be formed, the compensation data forming subroutine is carried out. Compensation data based on weather is formed after the simulation is carried out in which the pictorial image of the road is overlapped with a pictorial image corresponding to a weather condition, such as, rain, snow. Likewise, Compensation data based on the bad traffic are formed taking account of the bad traffic condition in the simulation system 1. Obstacle compensation data are formed taking account of obstacles emerged on the road for the simulation drive. With regard to eye-point compensation data, a pictorial image of a side road is overlapped with that of the hypothetical drive area to form the compensation data.

In Figures, 25 through 29, the computer 40 judges whether or not the compensation data should be formed in accordance with the value K. If the value K is 0, the computer 40 does not form the compensation data. The computer 40 judges whether or not the renewal number n is greater than a predetermined value n1. The computer 40 forms the compensation data for compensating the standard control data only when the renewal number n exceeds the value n1. Thus, if the renewal number n of the standard control data is less than the value n1, the computer 40 ends the subroutine for forming the compensation data.

If the renewal number n is greater than the value n1, the computer 40 finds minimum value of the renewal number n among the weather compensation data, bad traffic compensation data, obstacle compensation data and eye-point compensation data. The computer 40 renews the compensation data having the minimum value of the renewal number. The computer 40 provides the value K in accordance with the compensation data having the minimum value of the renewal number.

Then the computer 40 judges whether or not the hypothetical drive is made in the specific area. If the simulation drive is made in the specific area, the computer carries out the learning program and the control data change subroutine and stores the data in RAM 42 to finish the simulation drive. The computer sets the flag I at 1 when the compensation data forming subroutine is executed. When the flag K is 1 which means the renewal number of the weather compensation data is minimum and the weather compensation data should be renewed, the computer 40 reads the heartbeat value $\alpha1$ and set the time t at 0 of the timer 39. Then, the image of the hypothetical drive area is overlapped with that of a specific weather condition. Next, the computer 40 reads the heartbeat value a detected by the medical data detecting device 8. The computer 40 calculates the difference $w(1)$ between the value al and value $\alpha(1)$. The difference w reveals the change of the medical condition of the driver as the weather changes. The difference $w(i)$ is calculated and stored in the RAM 42 for each cycle. The summation of the difference w and the calculation number N thereof are stored in RAM.

Figure 30:
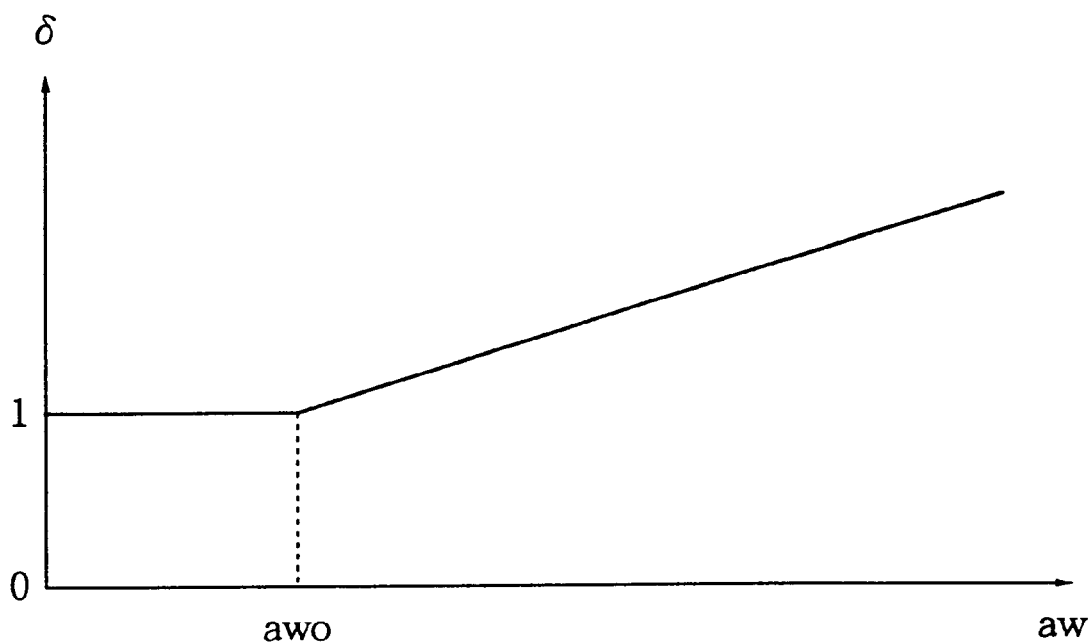
FIG. 30 is a map for obtaining a weather compensation coefficient.

This procedure continues for a predetermined time period to, for example, 10 minutes. When the time t of the timer 39 reaches the value $t_o$, the summation of w and the number N are entered in the storage sections 24 and 25 respectively. Then, the computer 40 sets the flag I at 0 and ends the compensation data forming subroutine. This value w and N are read out from the IC card 16 when the weather compensation data are formed again. If the number N reaches a predetermined value No, the computer 40 calculates a mean value of summation $w(i)/N_0$. Then, the computer 40 obtains a compensation coefficient δ to store in the RAM 42 and sets the flag I at 0 a map shown in FIG. 30. Thus, the compensation coefficient δ is entered in the IC card 16 as the weather compensation data when the simulation drive is finished. The compensation coefficient δ is used for the compensation control program E3. As shown in FIG. 30, where the mean value aw is smaller than a predetermined value $aw_0$, the compensation coefficient δ is 1 and increases linearly as the value aw increases.

Likewise, the compensation data for the bad traffic, obstacle, eye-point corresponding to the values 2, 3, and 4 of the flag K are provided respectively.

Hereinafter, a characteristic or gain change control will be explained.

Figure 31:
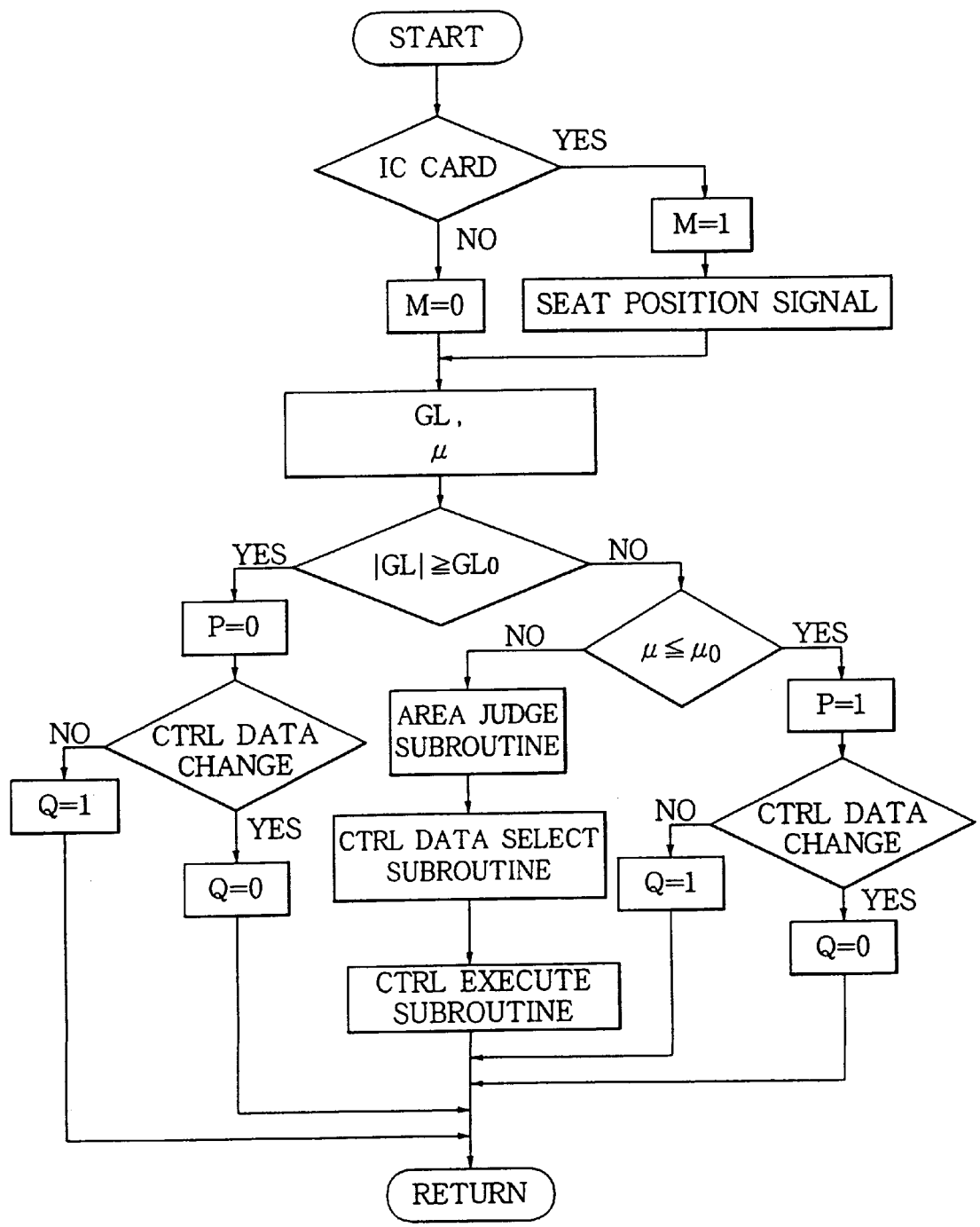
FIG. 31 is a flow chart of a characteristic change control executed in the object vehicle.

FIG. 31 shows a flow chart of a basic control routine of the gain change control embodied by the computer unit 80 of the object vehicle 50.

The computer unit 80 judges whether or not the IC card is inserted in the IC card reader 75 of the object vehicle 50. When the IC card is inserted into the reader 75 and the data therein are read by the RAM 82, the computer unit 80 sets the flag M at 1. Then, the computer unit 80 reads the driving position data from the data storage section 19 of the IC card 16 to produce the control signal to thereby adjust the seat position. If not, the computer unit 80 sets the flag M at 0. To the computer unit 80 are introduced the lateral acceleration GL from the lateral acceleration sensor 74, a presumed value of friction coefficient μ of the road surface from the anti-lock braking control system 14.

The main computer unit 80 judges whether or not the absolute value of the lateral acceleration GL is greater than a predetermined value $GL_0$, such as 0.5 G. If the judgment is Yes or if the lateral acceleration GL is greater than the predetermined value $GL_0$, it is considered that the control should be carried out in accordance with the designated data A7 in ROM 81 so as to improve the running stability. In this case, the computer unit 80 sets flag P at a value of 0 and judges whether or not data to be used is changed in the preceding cycle. The flag P is provided for judging whether or not the object vehicle 50 running on a low friction road. If the judgment is Yes or if the data to be used has been changed, the computer unit 80 sets flag Q at a value of 0. If not, the computer unit 80 sets flag Q at a value of 1. The flag Q is provided for judging whether or not the data to be used have been changed between the preceding cycle and the current cycle.

If the lateral acceleration GL is not greater than the predetermined value $GL_0$, the computer unit 80 judges whether or not the frictional coefficient μ is not greater than a predetermined value $μ_0$. If the judgment is Yes or if the frictional coefficient μ is not greater than the predetermined value, it is considered that the vehicle 1 is running on a low friction road and that the control should be made taking account of the running stability in accordance with the designated data A6. In this case, the computer unit 80 sets the flag P at a value 1. Then, the computer unit 80 judges whether or not the data to be used is changed in the preceding cycle. If the judgment is Yes or if the data to be used have been changed, the computer unit 80 sets the flag Q at a value 0. If not, the flag Q is set at a value 1.

Figure 32:
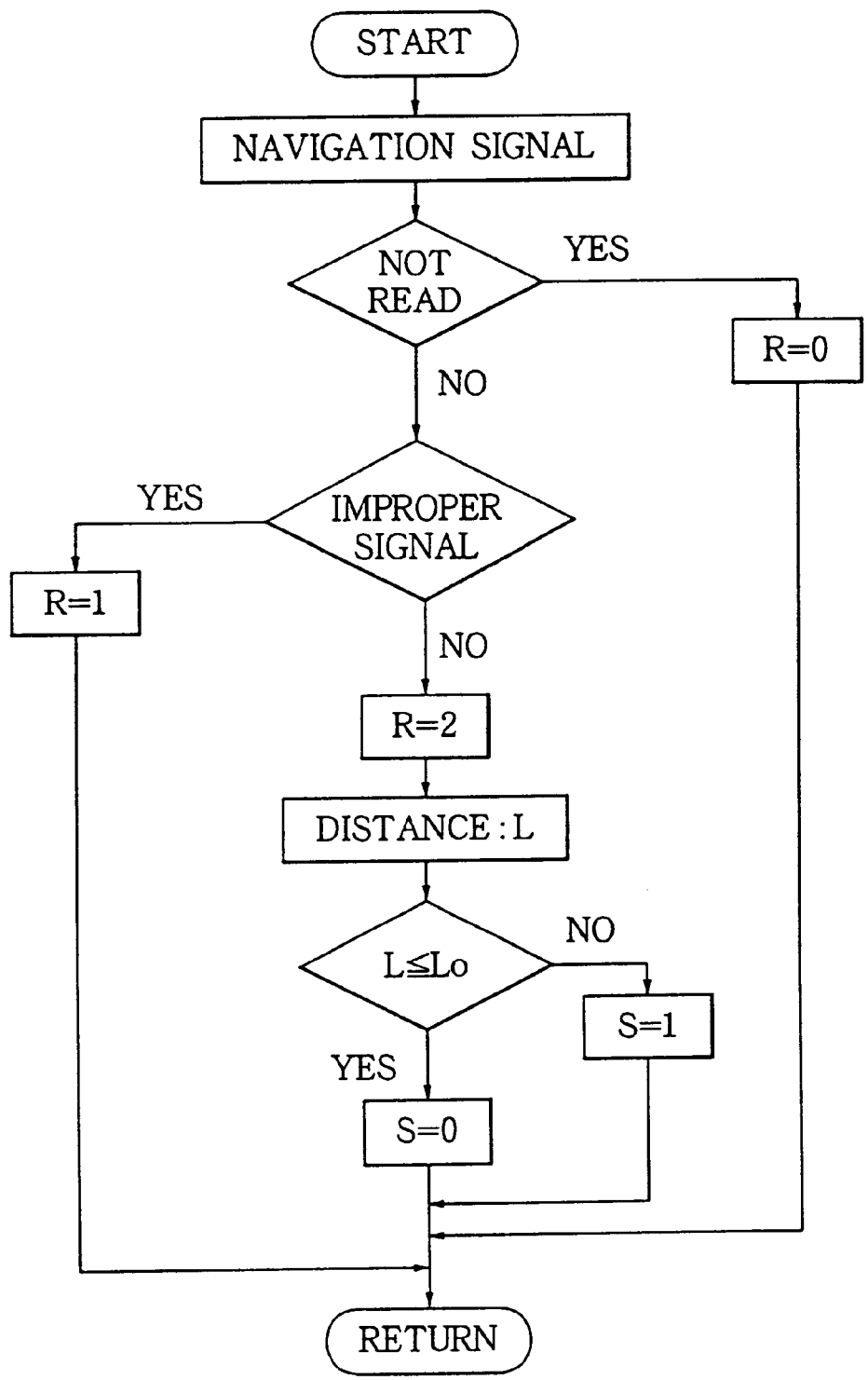
FIG. 32 is a flow chart of an area judging subroutine.

If the frictional coefficient μ is greater than the predetermined value $μ_0$, the computer unit 80 reads executes area identifying subroutine as shown in FIG. 32.

The computer unit 80 reads a navigation signal which is produced by the location detecting computer 83 based on the location detecting sensor 67. If the computer unit 80 cannot read the navigation signal, flag R is set at a value of 0 and proceedings is returned to the beginning. The flag R is provided for judging whether or not the navigation signal can be utilized for the running characteristic control properly.

If the navigation signal is not proper even when the computer unit 80 can read the navigation signal so that the location of the vehicle cannot be identified properly, the flag R is set at a value 1 and the proceedings is returned to the beginning.

If the location of the vehicle can be detected based on the navigation signal, the flag R is set at a value of 2. In this case, the computer unit 80 judges whether or not the object vehicle 50 is running within the specific area where the distance L from the owner's house or dealer's office is smaller than a predetermined value LO such as the 20 km. If the object vehicle 50 is judged to be in the specific area, the computer unit 80 sets flag S at a value of 0. If not, the flag S is set at a value of 1. The flag S is provided for judging whether or not the object vehicle 50 is running within the specific area.

Figure 33:
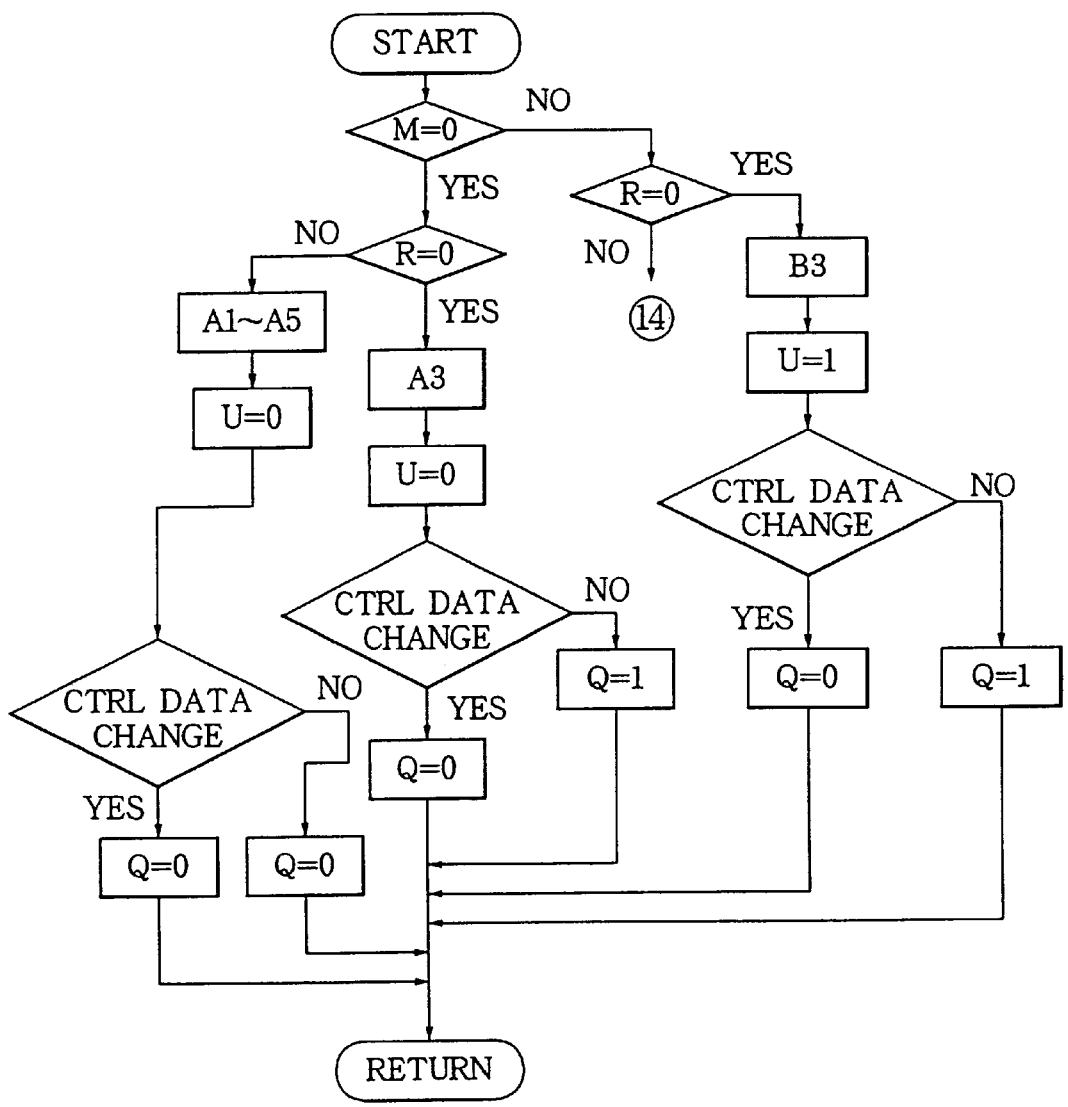
FIGS. 33 through 35 are a flow chart of a control data select subroutine.
Figure 34:
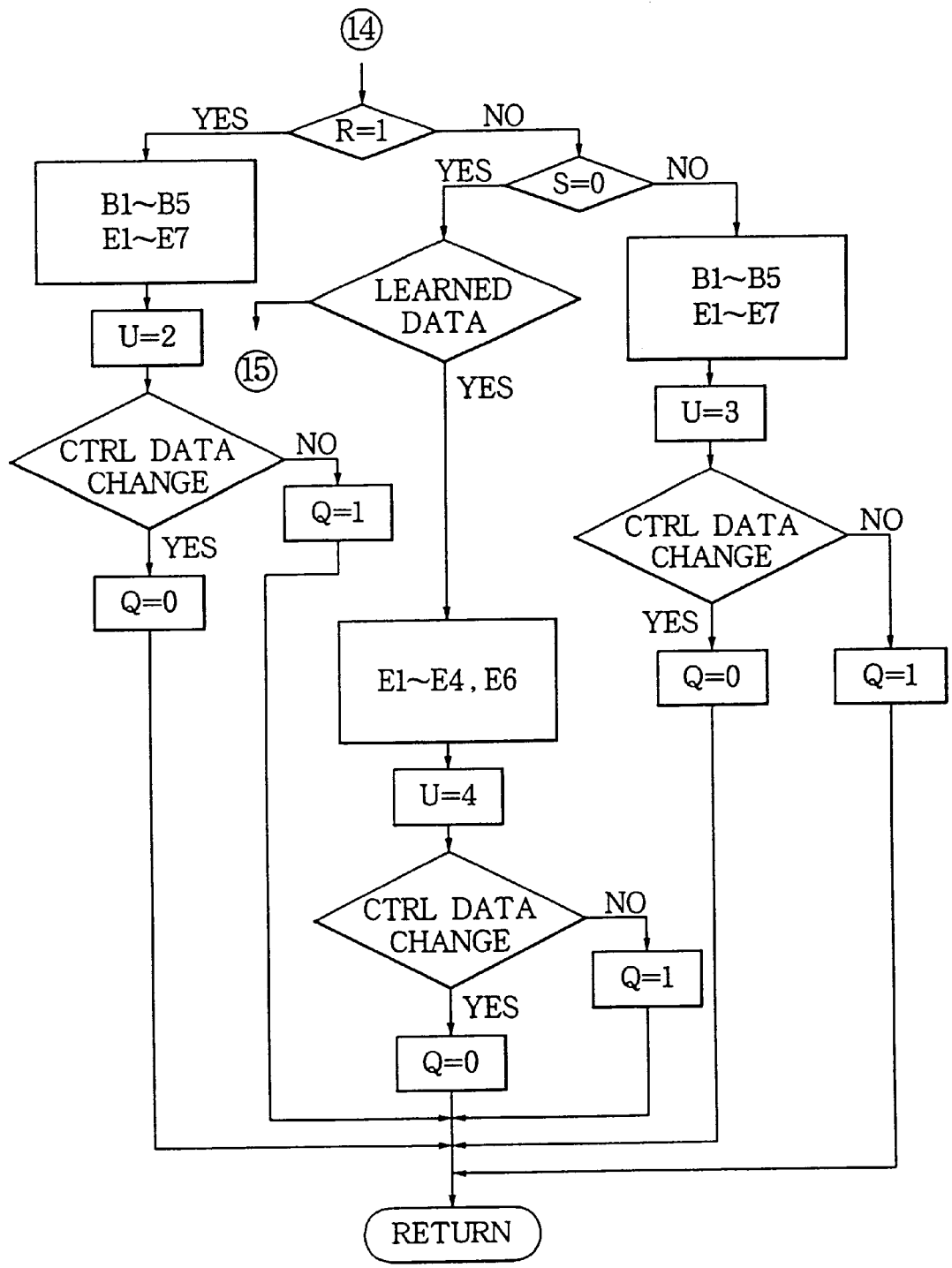
Figure 35:
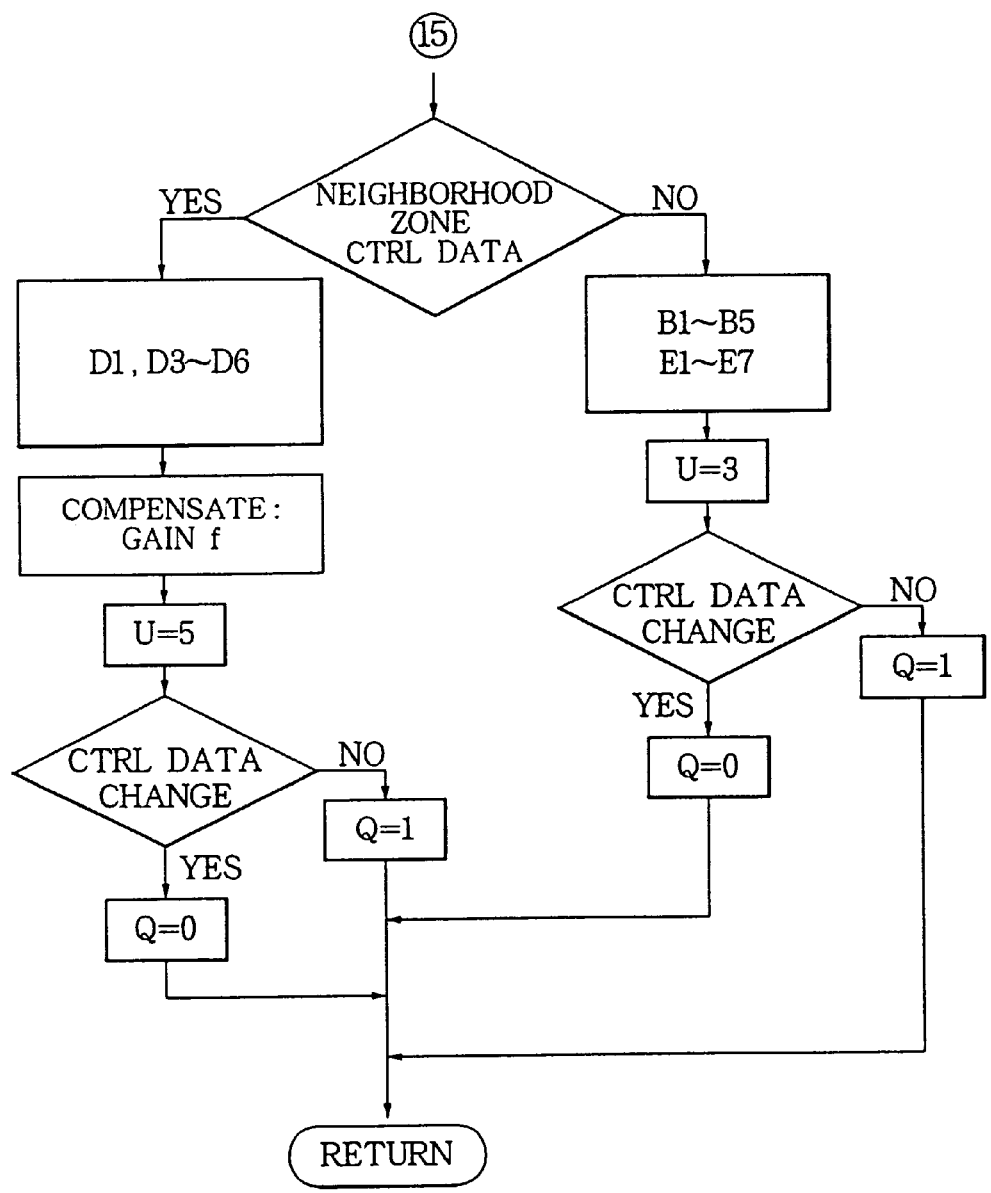
Figure 36:
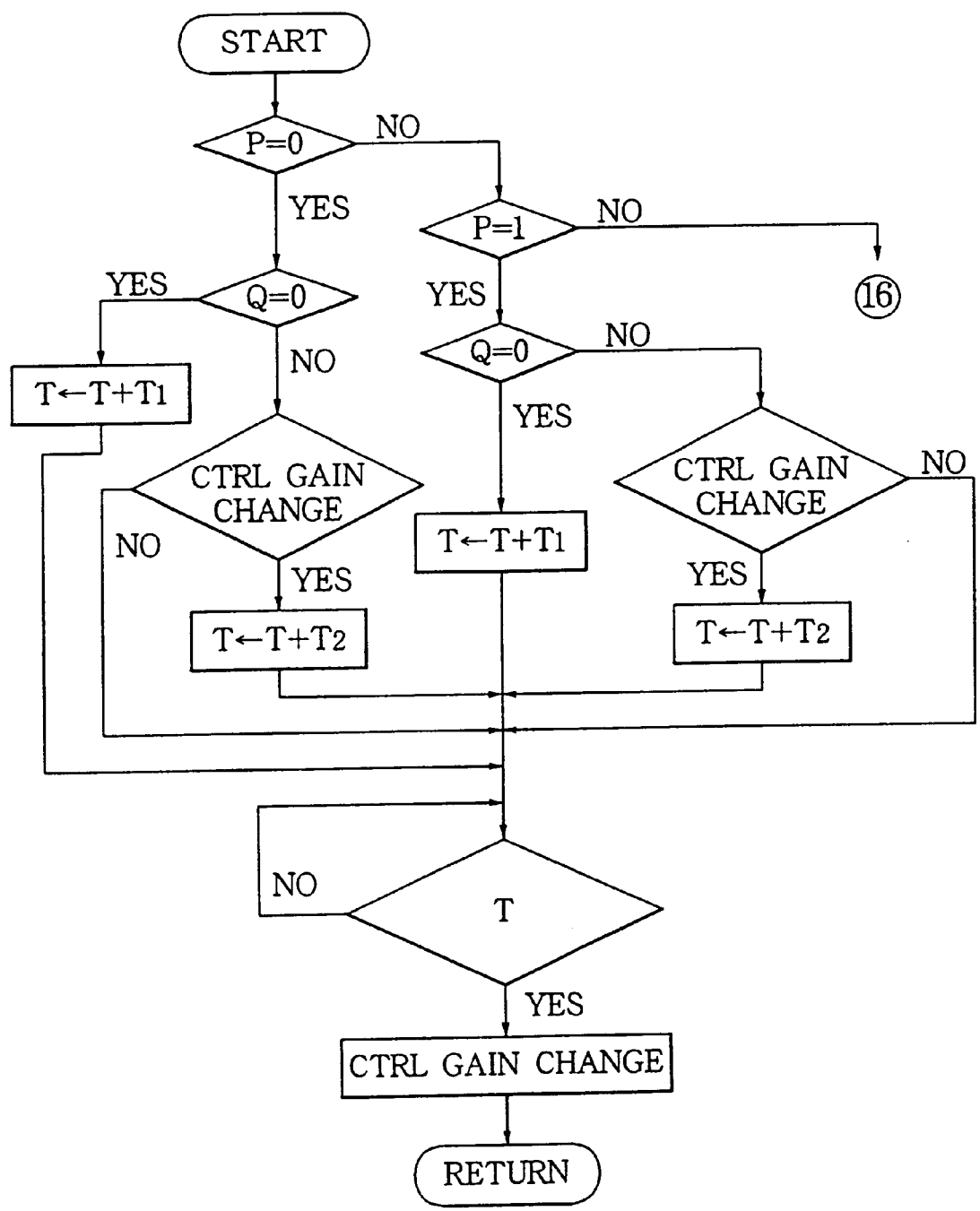
FIGS. 36 through 39 are a flow chart of a control execution program executed in the object vehicle.
Figure 37:
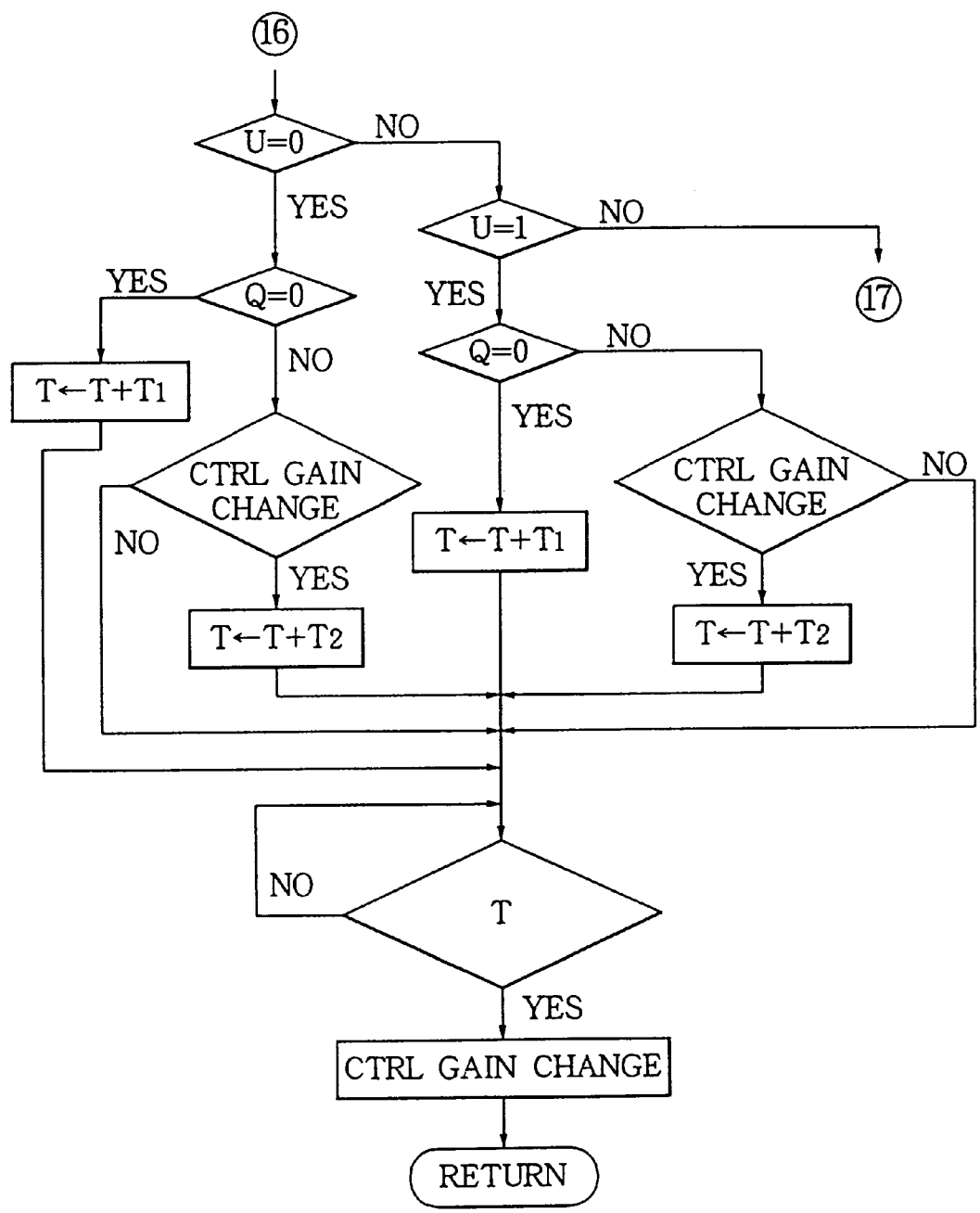
Figure 38:
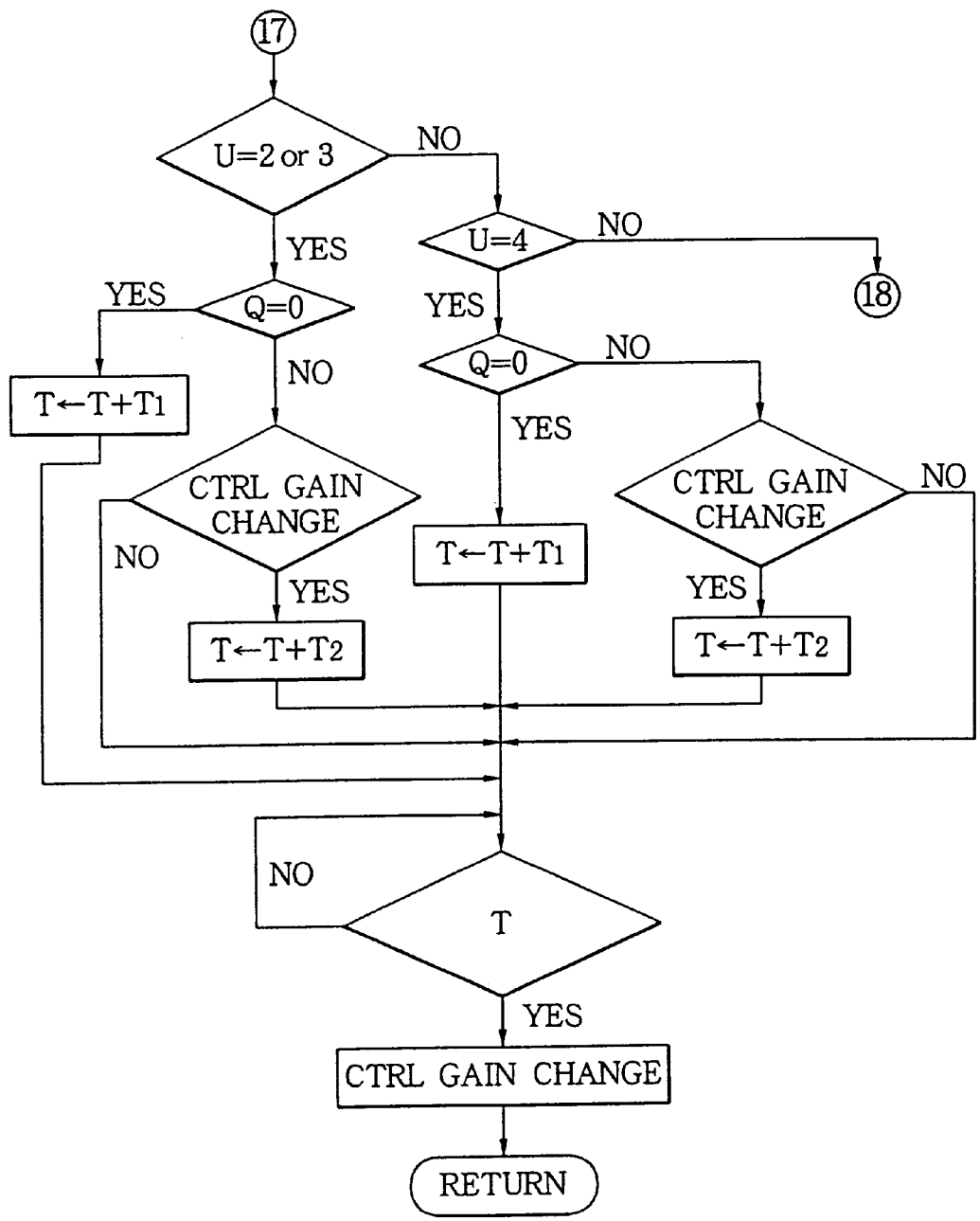
Figure 39:
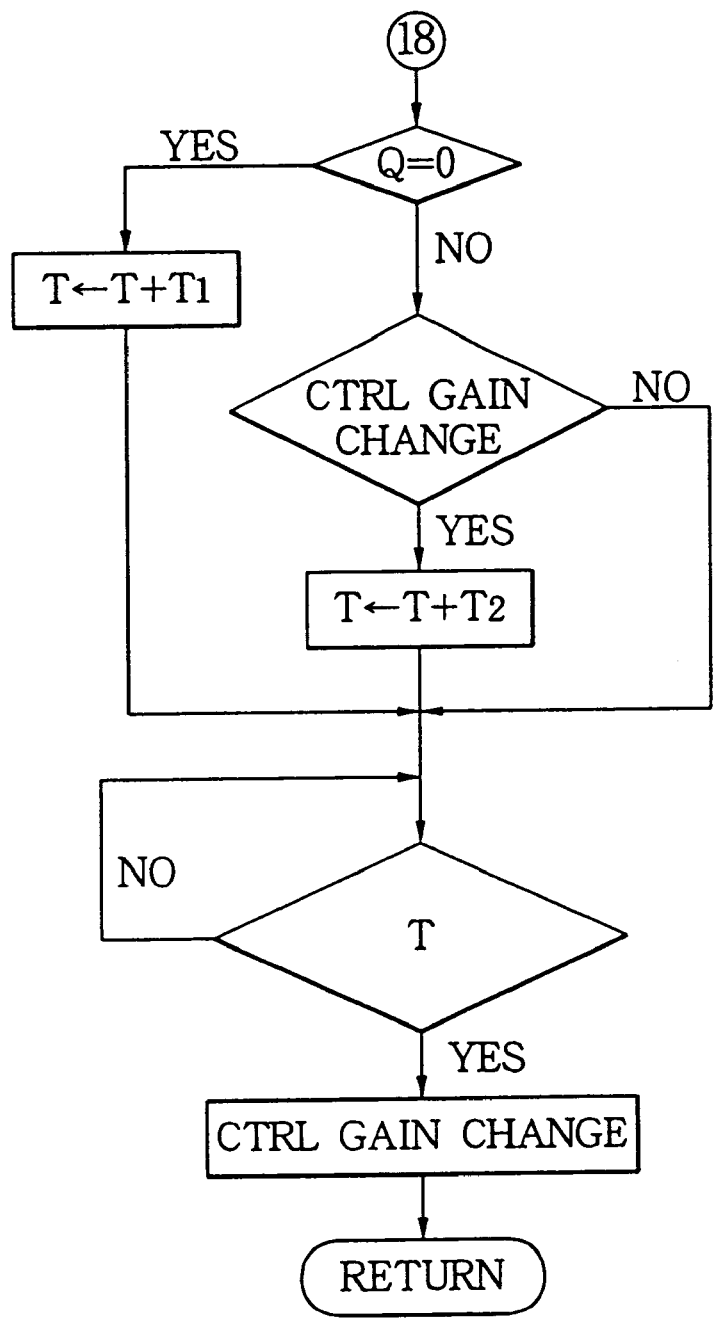

Next, the computer unit 80 executes control data select subroutines shown in FIGS. 33, 34 and 35.

In the subroutines, the computer unit 80 judges whether or not the flag M is 0.

If the judgment is Yes, it is found that the IC card 16 is not read and thus the characteristics of the object vehicle 50 cannot be changed based on the data in the IC card. In this case, the computer unit 80, next, judges whether or not the flag R is 0. If Yes, this means that the navigation signal cannot be read and thus the computer unit 80 cannot know where the object vehicle 50 drives. In this case, the computer 80 reads out the designated data A3 stored in the ROM of the object vehicle 50. Then, the computer unit 80 sets the flag U at 0. If the data is changed from the preceding cycle, the computer unit 80 sets the flag Q at 0. If Not, the computer unit 80 sets the flag Q at 1 and returns to the basic routine.

If the flag R is not 0 in the above step, the computer unit 80 selects one of the designated data A1 through A5. Then, the proceeding returns to the basic routine after the same procedure about the flag U and Q.

In the first judgment in FIG. 33, if the flag M is 1, the computer unit 80 further judges the value of the flag R. If the flag R is 0, the computer unit 80 cannot find where the object vehicle 50 drives. In this case, the computer unit 80 reads the standard data B3 among the data B1 through B5 stored in the RAM 82 of the object vehicle. If the flag R is 1, the computer 80 can find the object vehicle drives in the city area, urban area, suburban area, mountain road or highway. However, the computer unit 80 cannot specify the exact location of the object vehicle 50. In this case, the computer unit 80 reads out one of the standard data B1 through B5 and the compensation control programs E1 through E7. Then, the computer unit 80 sets the flag U at 2 and thereafter makes the same procedure of the flag Q as mentioned above with regard to the data B3. If the flag R is not 1 and S is not 0, the computer unit 80 sets the flag U at 3 and returns to the basic routine after executing the same steps as the case when the flag R is 1.

If the flag S is 0 and the object vehicle 50 drives in the specific area, the computer unit 80 judges whether or not the learned control data are read from the IC card 16. If the judgment is Yes, the computer unit 80 reads the learned data and the compensation programs E1 through E4 and E6. If the learned data are not formed, the computer unit 80 further judges whether or not the control data have been learned and stored in RAM 82 with regard to a neighborhood unit zone which is located within a predetermined distance $l_0$, such as 20 m from the intended unit zone in the same time band. If the judgment is No or if the control data of the neighborhood unit zone have not been learned and not been stored in RAM 82, the computer unit 80 holds that the control cannot be made in accordance with the learning control programs and accesses to the data B1 through B5 and compensation programs E1 through E7.

If the control data for the neighborhood unit zone have been learned and stored in RAM 82, the computer unit 80 accesses to the control data of the neighborhood unit zone by a gain f to improve the running stability of the object vehicle 50. Then, the computer unit 80 sets the flag U at a value of 5. This is because the control data of the neighborhood unit zone are considered to be similar to those of the intended unit zone.

FIGS. 36 through 39 show flow charts of control executing subroutine programs for making the control of the object vehicle 50.

The computer unit 80 judges whether or not the flag P is zero.

If the judgment is Yes or if the flag P takes a value of 0, it is considered to provide a running stability due to a large value of the lateral acceleration acting on the vehicle 50. In this case, the characteristics of the vehicle 50 is to be determined in accordance with the designated data A7 stored in the ROM 81. However, the characteristics should not be changed abruptly. In view of this, computer unit 80 increases the timer T by certain times T1 and T2 so that the control gain for the control devices are gradually change in the period T set by the timer respectively. Likewise, if the object vehicle 50 runs on a low friction road and the characteristics should be provided in accordance with the designated data A6, the computer unit 80 makes the similar control. out the learning control for the running characteristic of the object vehicle 50. Where the data A1 through A5 should be used in view of the driver's operation, the computer unit 80 provides the vehicle 50 with the control gain based on the same consideration.

If the flag U is 1, 2 or 3, the computer unit 80 uses the standard control data B. In this case, the same procedure as that for the data A is made in determining the control gain. If the flag Q is 1, the computer unit 80 compensate the control gains determined based on the standard data B1 through B5 in accordance with the compensation programs E1 through E4 as shown in FIG. 11 uniformly.

If the flag U is 4, the computer unit 80 uses the learned data in determining the control gain or characteristics of the object vehicle 50. Similar compensation is made for the control gains for the control devices based on the compensation programs E1 through E4 in accordance with the similar procedure to that of the data A or B, if necessary.

If the flag U is neither 0 through 4, the computer unit 80 uses the learned control data of the neighborhood unit zone and sets the flag U at 5. According to the above control, all the data for determining the characteristics of the object vehicle 50 are formed in the simulation system 1 through the simulation drive and transferred to the object vehicle 50 through the IC card 16. Thus, the capacity of the computer unit 80 of the object vehicle 50 can be remarkably reduced and save the manufacturing cost of the object vehicle 50.

Hereinafter, there will be described another embodiment of the control for changing the characteristics of the object vehicle 50.

Figure 40:
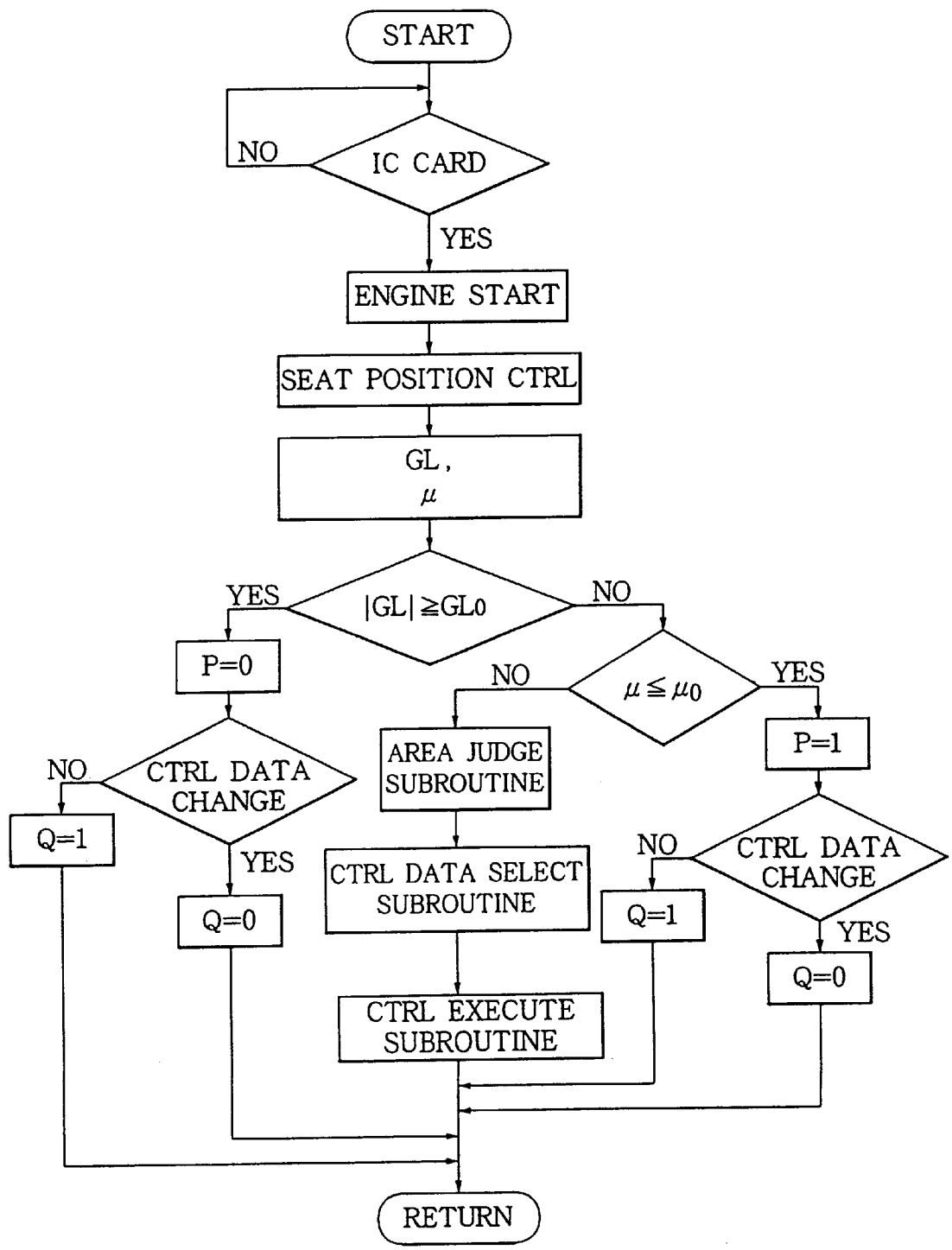
FIG. 40 is a basic routine of characteristic change control executed in the object vehicle.
Figure 41:
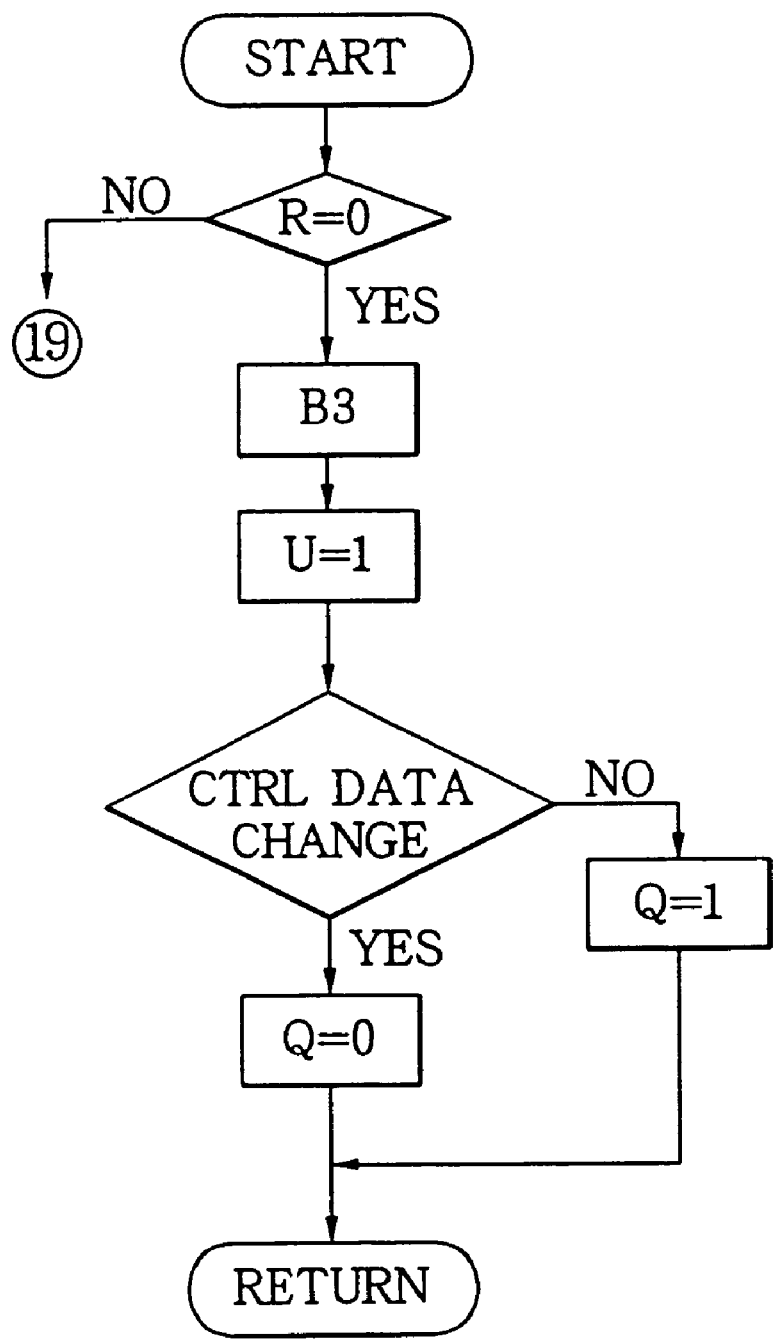
FIGS. 41 through 43 are a flow chart of a control data select subroutine.
Figure 42:
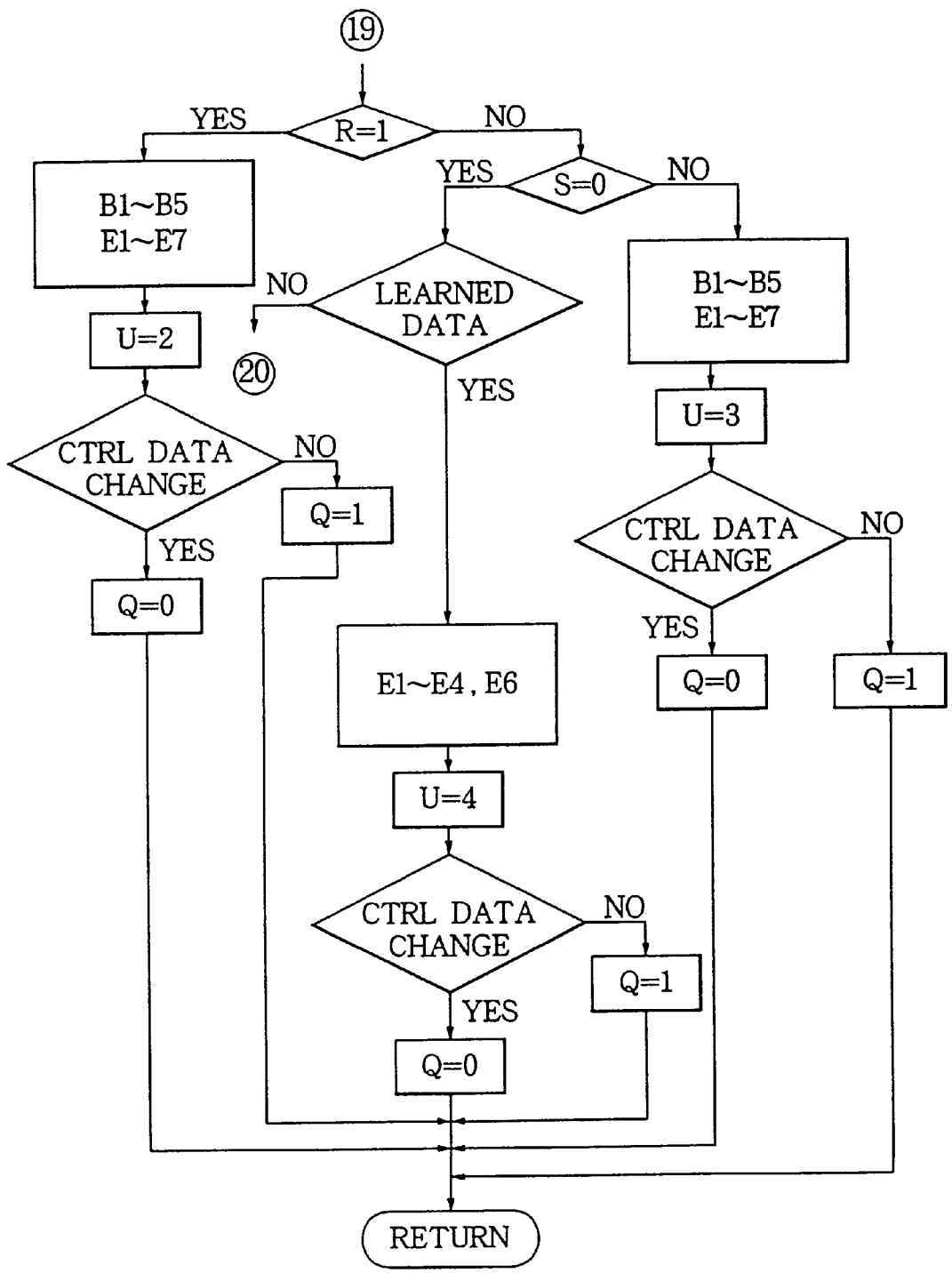
Figure 43:
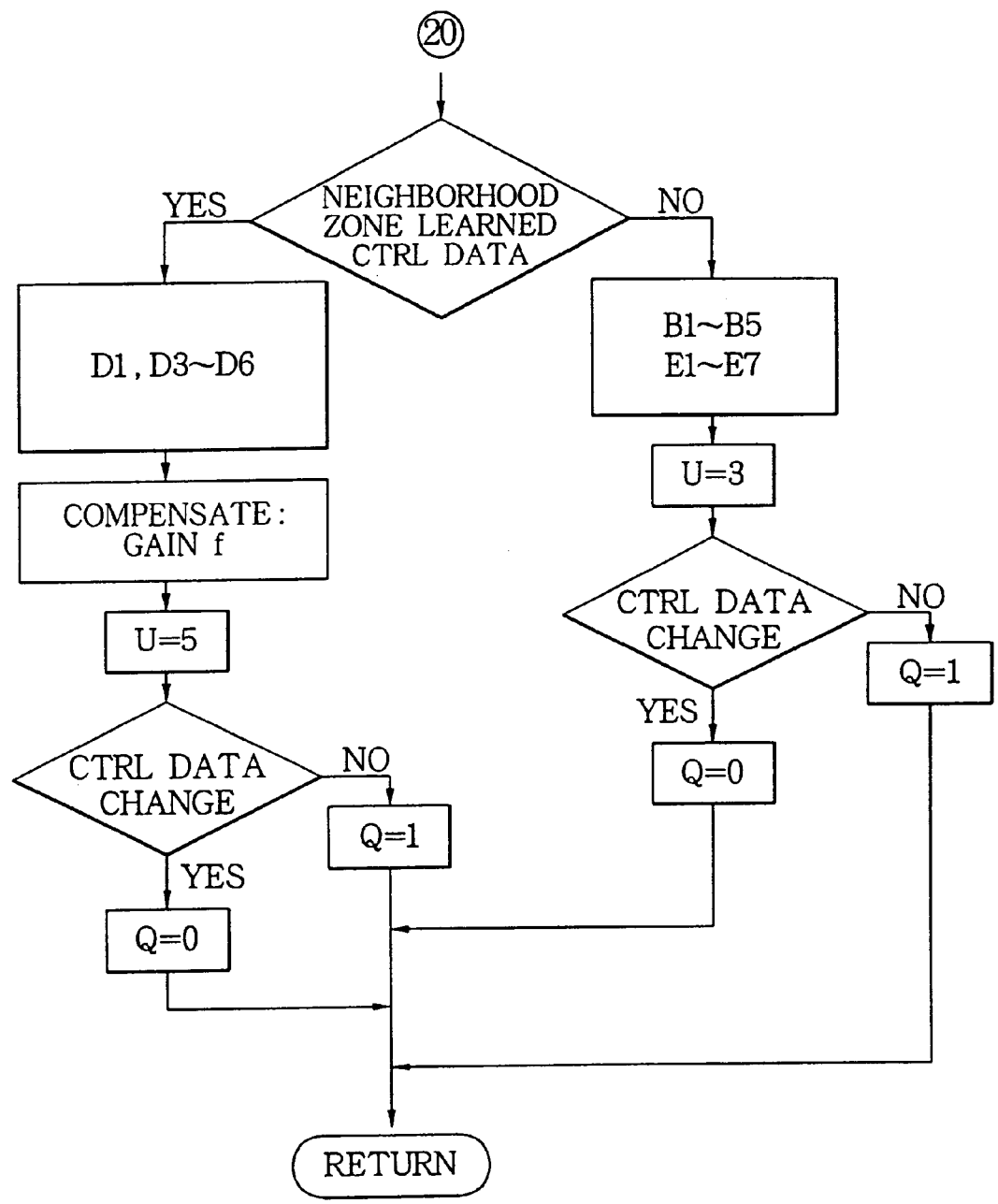
Figure 44:
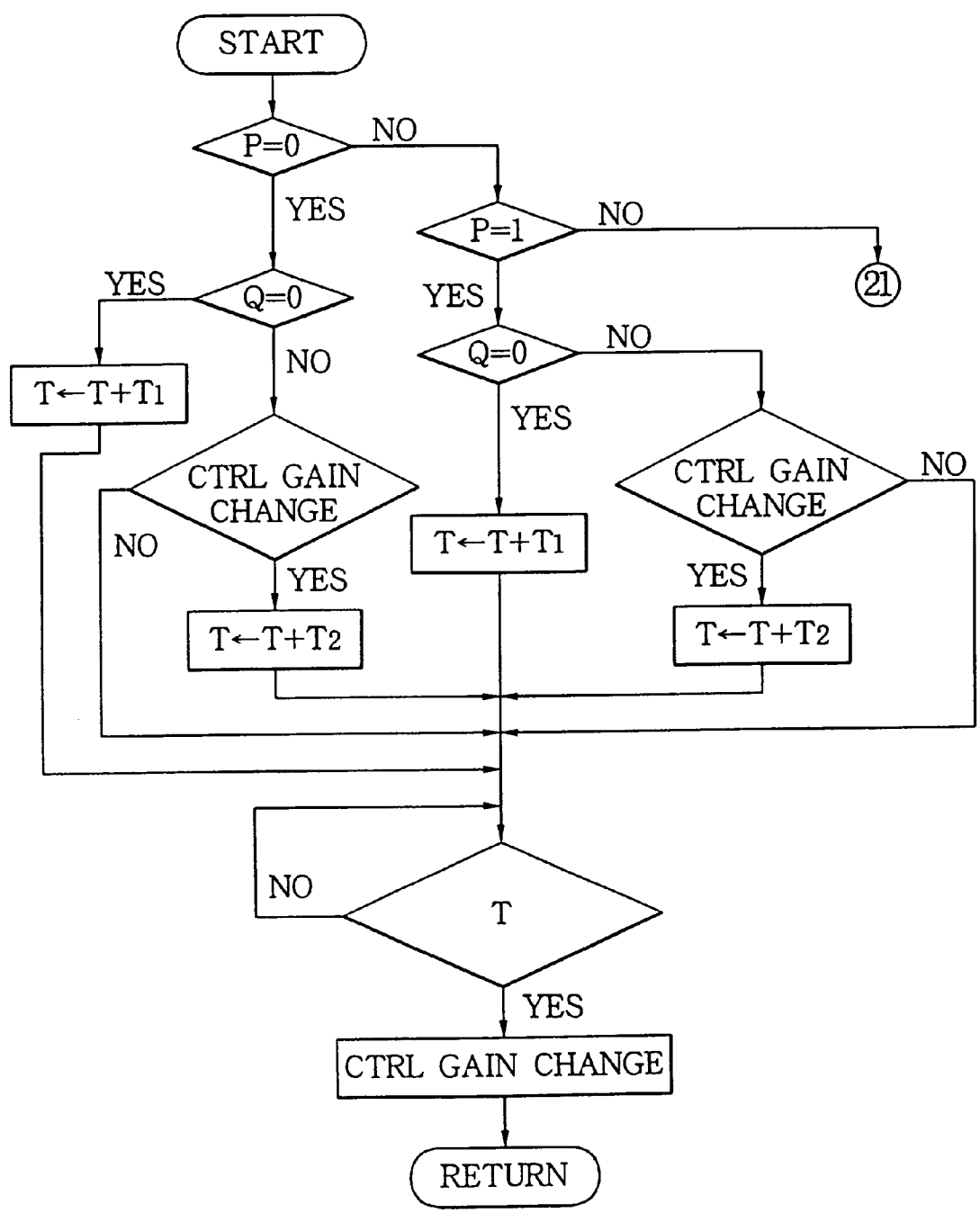
FIGS. 44 through 47 are a flow chart of a control execution subroutine executed in the object vehicle.
Figure 45:
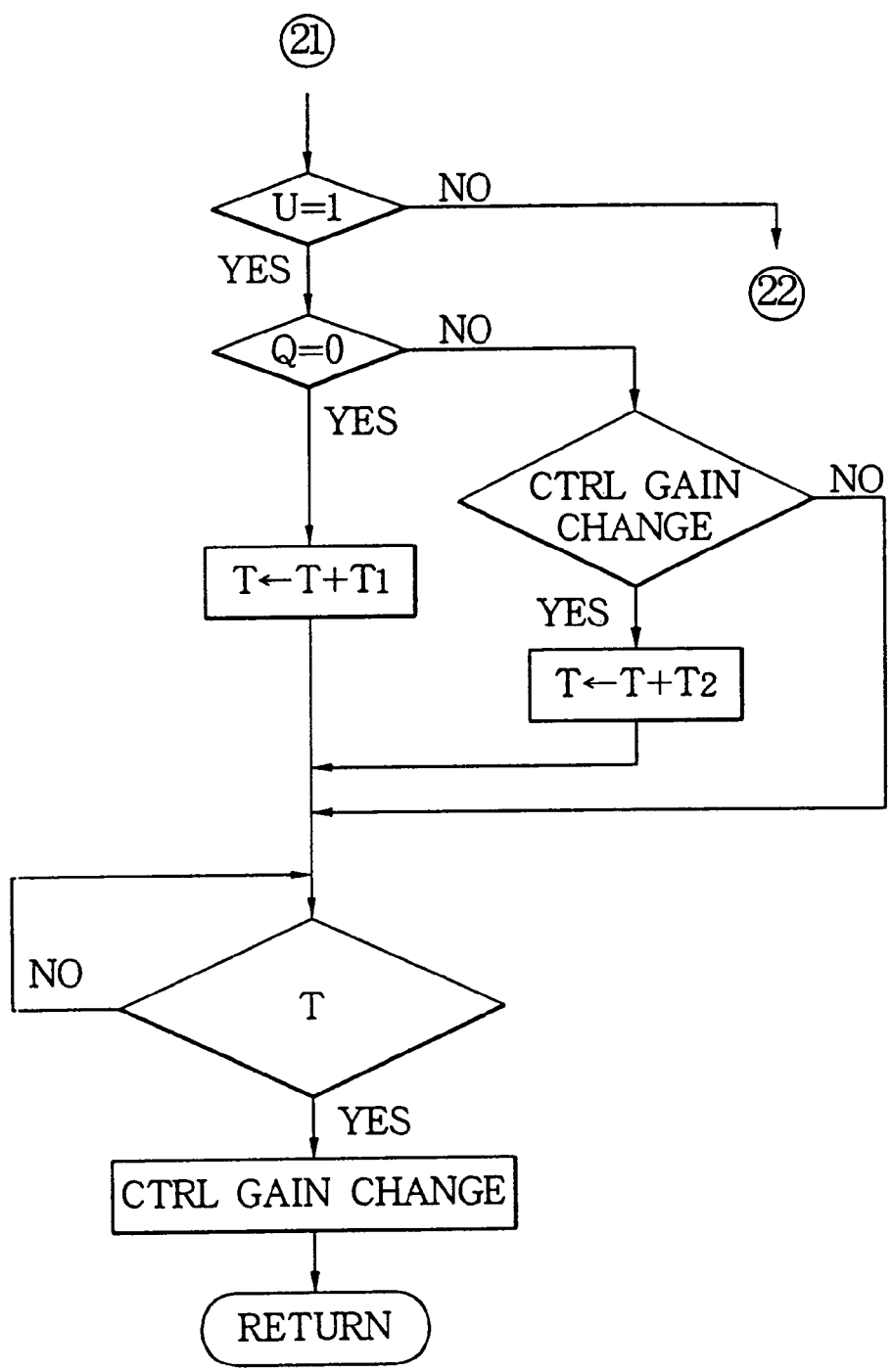
Figure 46:
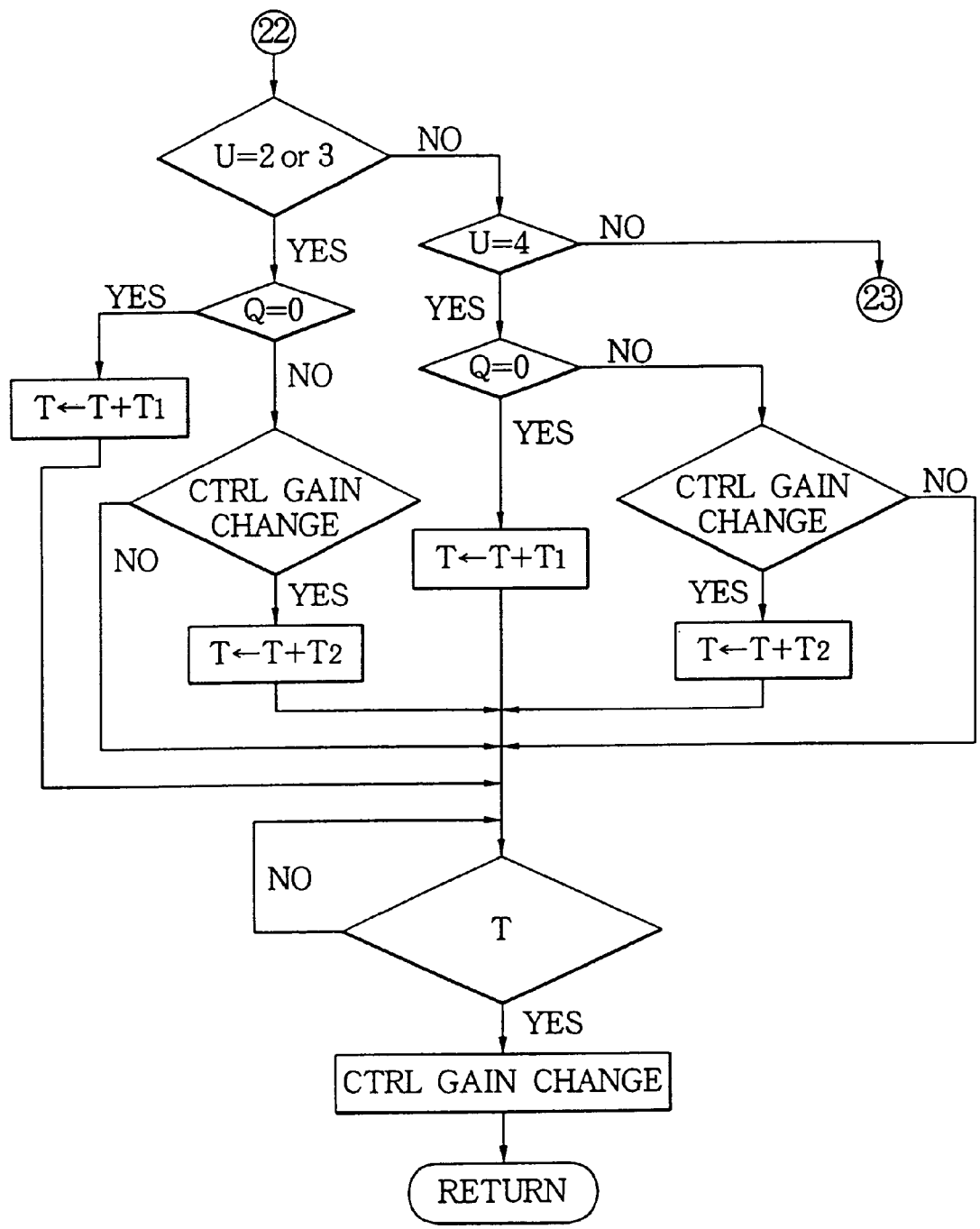
Figure 47:
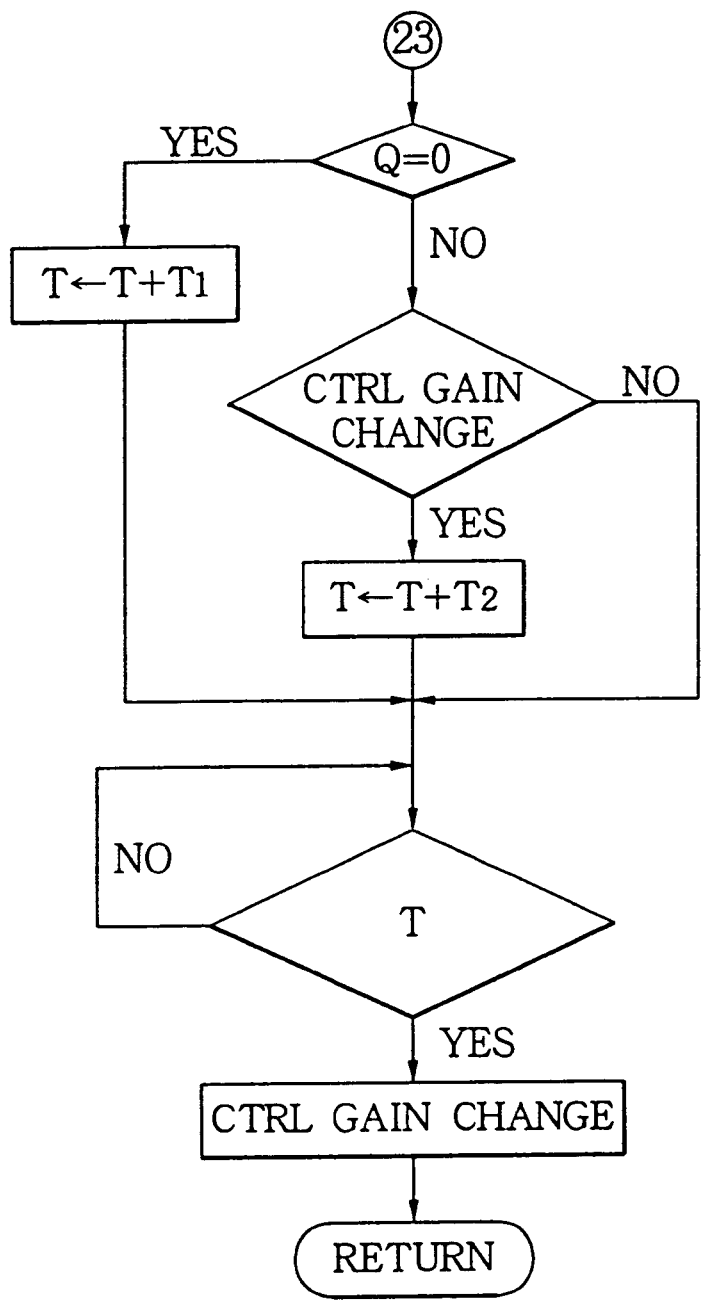
Figure 48:
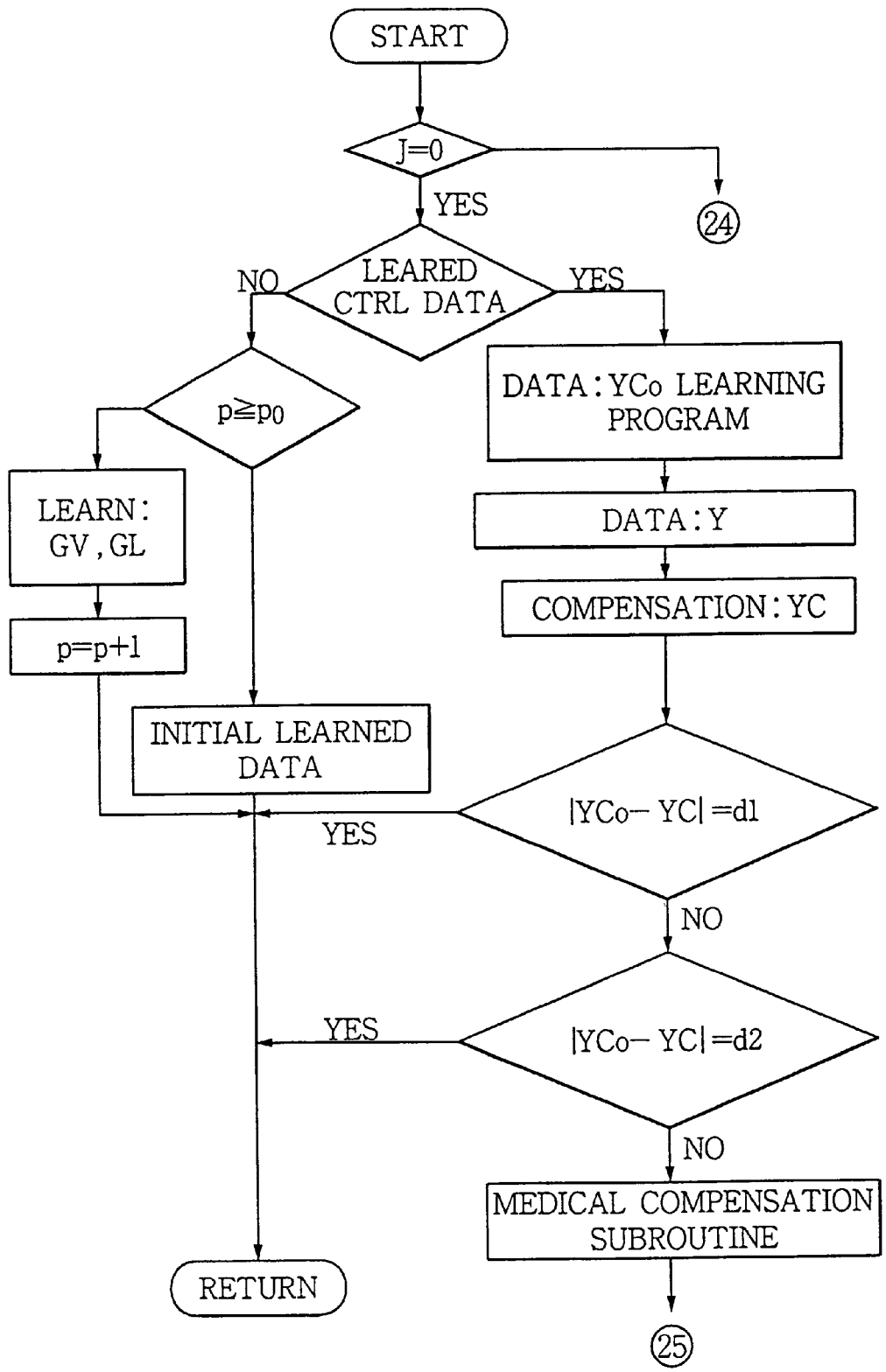
FIGS. 48 through 51 are a flow chart of a learning control executed in the simulation system in accordance with another embodiment of the present invention.
Figure 49:
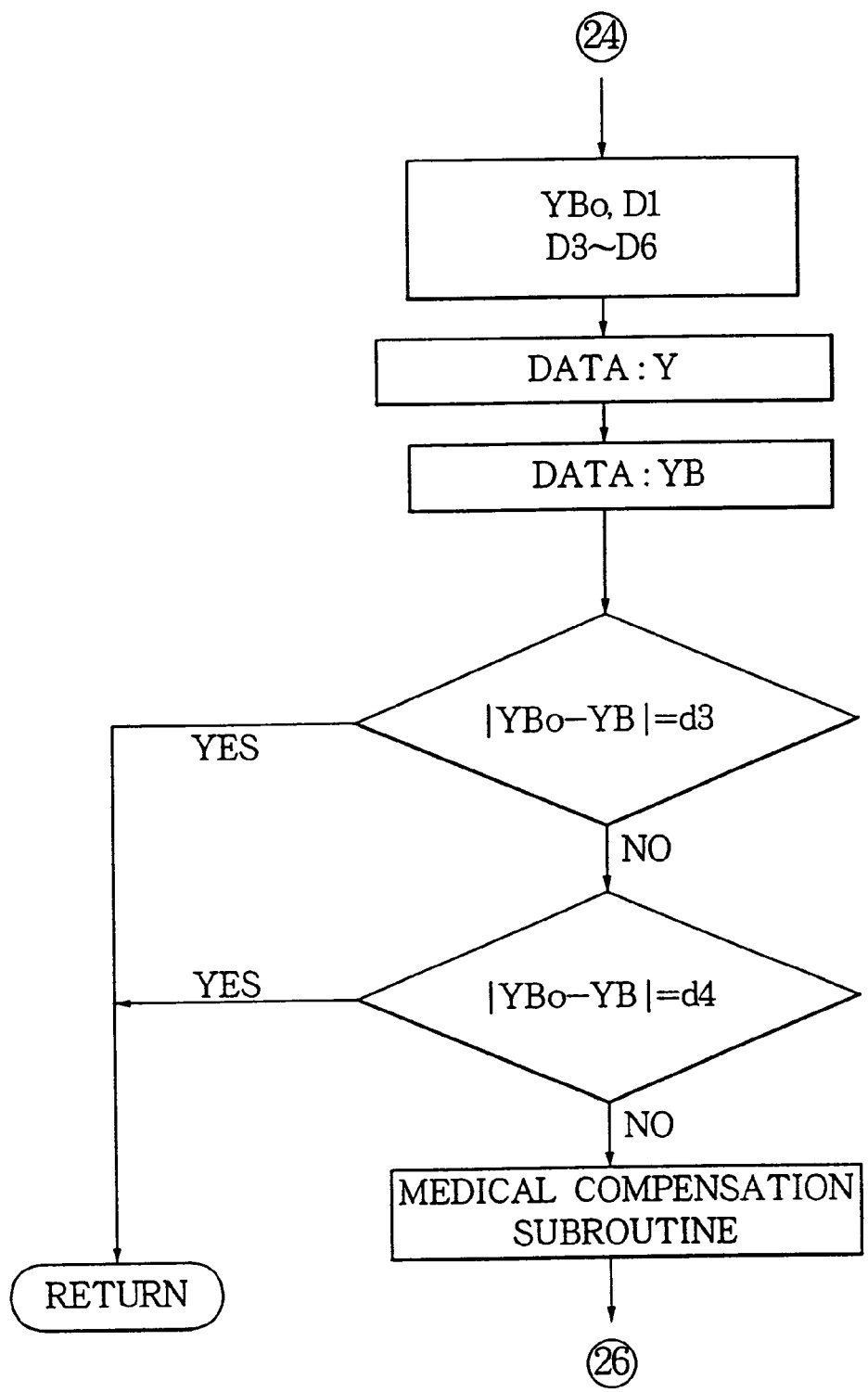
Figure 50:
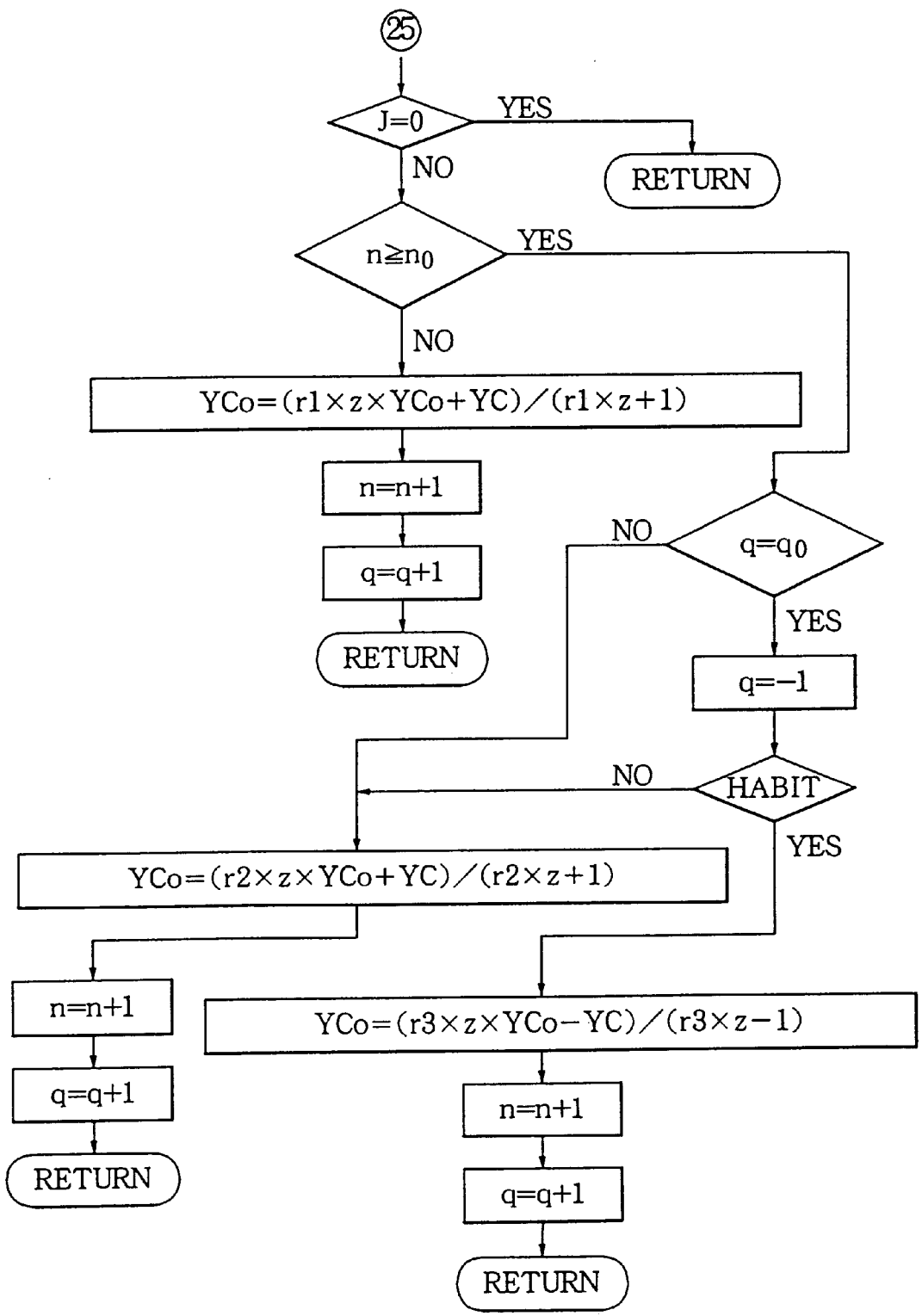
Figure 51:
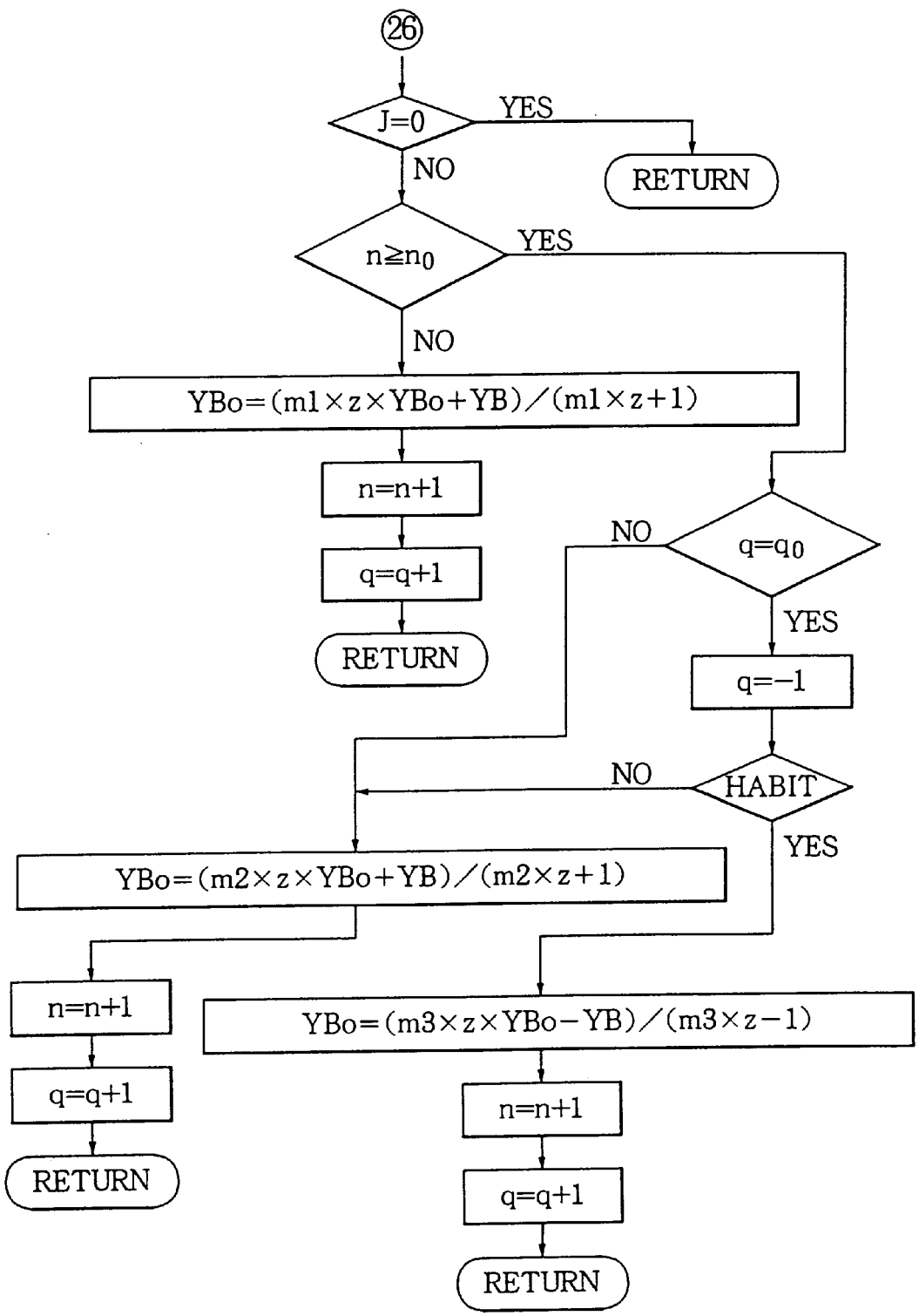

According to the illustrated control, the IC card 16 functions as not only the data medium but also an ignition key. Therefore, unless the IC card is inserted and read by the reader 75, the engine 51 does not start. FIG. 40 of the basic routine of the control corresponds to FIG. 31. In this embodiment, there is no case where the flag M is set at 0. The area identifying subroutine is the same as FIG. 32. FIGS. 41 through 44 showing the control data selecting subroutines correspond to FIGS. 33 through 35 of former embodiment. In this case, the difference from the former embodiment is that there is no event where the flag U is set at 0 because the engine does not start unless the IC card is read by the reader 75 of the object vehicle 50. The control executing subroutines shown in FIGS. 44 through 47 are the same as FIGS. 36 through 39 except that there is no case where the flag U is set at 0.

Referring to FIGS. 48 through 51, there is shown another control for forming the learned data utilizing the simulation system 1. FIGS. 48 through 51 are the same as the FIGS. 14 through 16 except that another counter q is introduced for counting the renewal times of the compensated data, a judgment is made as to whether or not there is a habitual operation of the driver based on the difference between the learned data stored in the RAM 42 and the compensated data after the renewal times exceeds a certain value, and a compensation is made due to the driver's habitual operation, if necessary.

The computer unit 80 judges whether or not the difference between the control data $YB_0$ in RAM 42 and the compensated data YB is getting small as a result of the learning control. If Yes, the computer unit 80 holds that the learning control for the control data of the running characteristic of the vehicle is well matched with the driver's operation of the vehicle and that the specific driver has no habitual driving operation to be compensated.

On the other hand, if the difference between the control data $YC_0$, $YB_0$ and the compensated data YC or YB is not reduced in spite of the learning control in which the control data have been changed as many as $q_0$ times (see FIG. 50, 51), the computer holds that this result comes out of the specific habitual driving operation. In this case, the computer unit 80 resets the number of renewal q at −1. Then, the computer unit 80 compensates the control data in accordance with the following formula:

$$YC_0 = (r3*z*YC_0 - YC)/(r3*z-1)$$

$$YB_0 = (m3*z*YB_0 - YB)/(m3*z-1)$$

In this case, the characteristics of the vehicle 50 is compensated to improve the running stability thereof.

Figure 52:
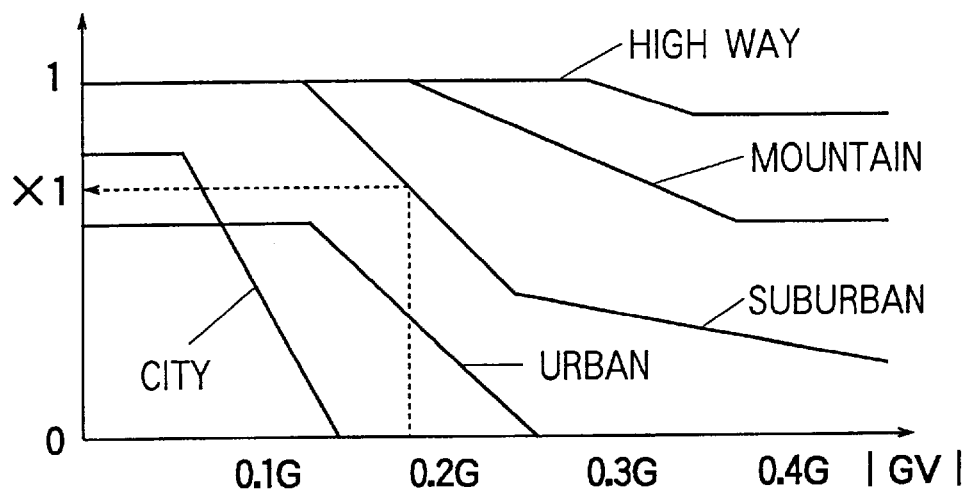
FIG. 52 is a graphical representation showing a relationship between the compensation data and the vertical acceleration.
Figure 53:
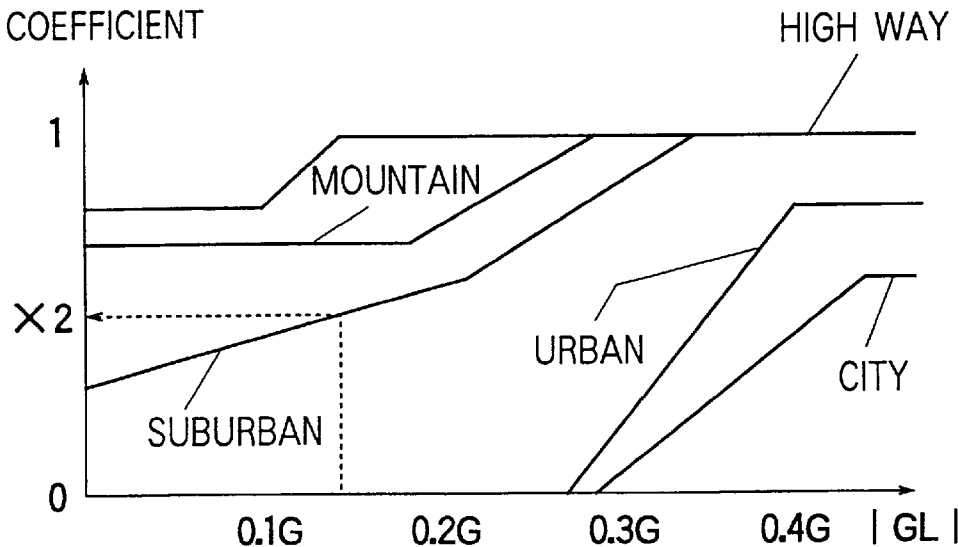
FIG. 53 is a graphical representation showing a relationship between the compensation data and the lateral acceleration.

In the preferred embodiment, the compensation coefficient x1 and x2 are able to obtained through maps as shown in FIGS. 52 and 53 in which the compensation coefficients x1 and x2 are determined characteristics provided for respective drive areas, such as city area, urban area, suburban area, mountain road and highway unlike FIGS. 22 and 23. Likewise, compensation coefficient for other control devices, such as, ABS, VGR, 4WS, TRC, EGC and PSC.

Hereinafter, there is described another characteristic change system of the object vehicle.

Figure 54:
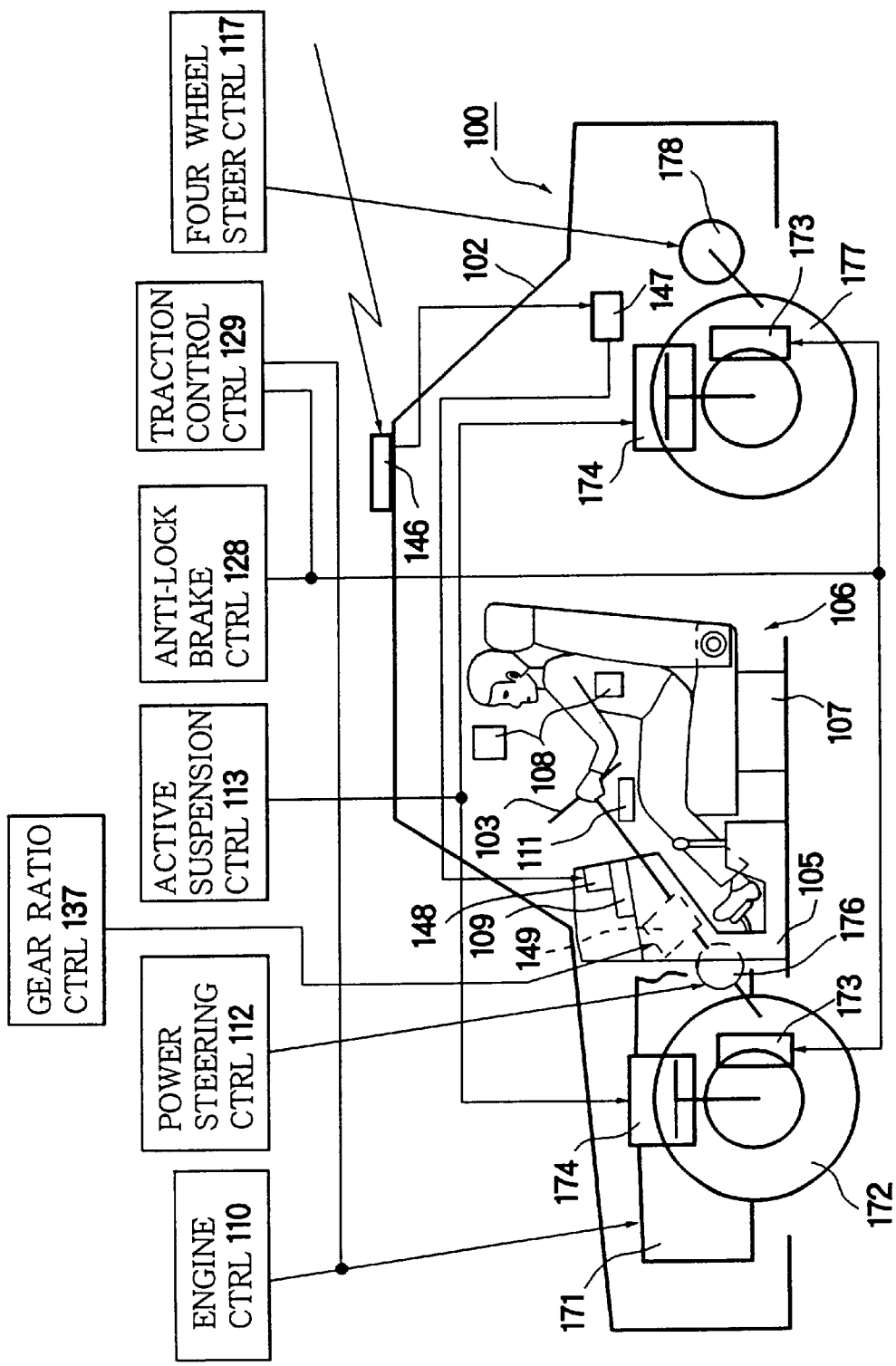
FIG. 54 is a block diagram of a characteristic information forming vehicle.
Figure 55:
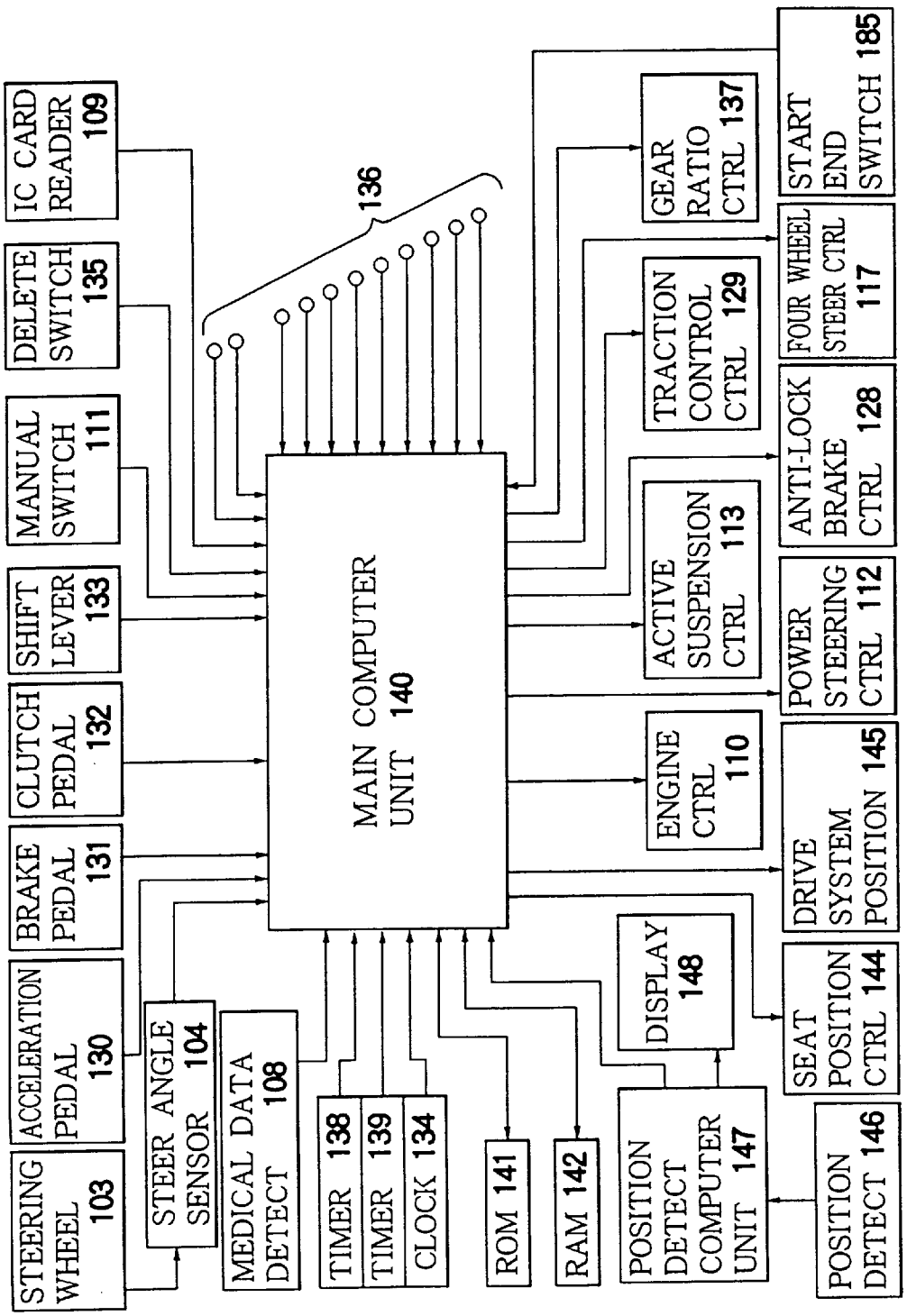
FIG. 55 is a block diagram of a driving system and detecting system of the characteristic information forming vehicle.

Referring to FIG. 54, there is shown a schematic diagram of a characteristic information forming vehicle 100 which forms a characteristic information for an object vehicle through an actual drive by a driver who is supposed to drive the object vehicle in the future. The vehicle 100 is usually owned by a dealer who sell the object vehicle of which characteristics are subjected to be changed. The characteristic information forming vehicle 100 is specially arranged in accordance with special instructions aiming the formation of the characteristic information to be implanted to the object vehicle.

Unlike the simulation system1, the characteristic information forming vehicle 100 is not equipped with the screen and the boy control system for making a hypothetical driving condition, such as driving area entry device, oscillating device, vehicle attitude control device. However, the vehicle 100 is provided with the same equipment as a normal vehicle such as engine, engine control system, transmission so as to make an actual drive. Thus, the vehicle 100 is provided with the same vehicle control system as the object vehicle as well as the characteristic information forming system.

The characteristic information forming vehicle 100 includes a vehicle driving system, such as steering wheel 103, acceleration pedal 130, brake pedal 131, clutch pedal 132, shift lever 133, manual switch 111 for manually changing the control gains of vehicle control systems and cancel switch 135 for canceling data stored in the IC card 16 and start and end switches 185 for directing the start and end of the learning drive.

The detecting system of the characteristic information forming vehicle 100 includes steering angle sensor 104, engine speed sensor, vertical acceleration sensor, lateral acceleration sensor, wheel speed sensor for sensing each of the four wheels of the vehicle, brake pressure sensor for sensing a braking hydraulic pressure of four brake cylinders, steering ratio sensor 36 for sensing the steering ratio of the rear wheels 177 to the front wheels and the like. The system also includes medical data detecting device 108 for detecting the driver's medical data, IC card reader 109 for reading various data storing the IC card 16, location detecting sensor, computer unit 147 for detecting the location of the vehicle 100, and display 148 and the like. The computer unit 147 also stores map information. Further, the detecting system of the vehicle 100 includes timer 138 for changing the characteristic information at a predetermined timing, timer 139 used for forming the compensated data and clock 134.

Control system of the vehicle 100 includes engine control device 110, power steering control device 112, active suspension control device 113, anti-lock braking device 128, traction control device 129, four wheel steering control device 117, gear ratio control device 137, and other control devices, and main computer unit 140 for controlling those devices.

In this embodiment, the characteristic information forming system is the same as that of the simulation system 1 of the former embodiment. The object vehicle of the former embodiment is able to be commonly utilized in the illustrated embodiment.

The procedure of the transfer of the characteristic information is the same as the former embodiment. Thus, detailed explanation is omitted.

The same effect as the former embodiment can be obtained.

Hereinafter, there is described further embodiment of the present invention. In this embodiment, the characteristic information is formed in a separate device and transferred to the object vehicle. According to this embodiment, when a driver bought a new vehicle (object vehicle), the driver receives a characteristic information forming device 240, instruction book 261, data entry item list 262 and IC card 260 for writing therein the data from the characteristic information forming device 240. The driver enters characteristic information relating to driver (sex, age, driving experience and the like), vehicle performance (drivability, riding comfort, fuel consumption efficiency ), use condition (use circumstances and the like) in accordance with data list 262. Then, the characteristic information is transferred to the IC card 260.

After the delivery of the new vehicle, the driver inserts the IC card 260 including the characteristic information into IC card connector 224 of the object vehicle. Data from the IC card 260 are entered to the main control unit 221 and processed by characteristic change program to obtain four characteristic compensation coefficients. The characteristic change signals based on the compensation coefficients are introduced to control device such as engine control device, power steering control device, active suspension control device and the four wheel steering device to change the control gain or characteristics thereof.

According to the illustrated embodiment, the driving, operation, steering and suspension characteristics are able to readily change the characteristics of the object vehicle.

Figure 56:
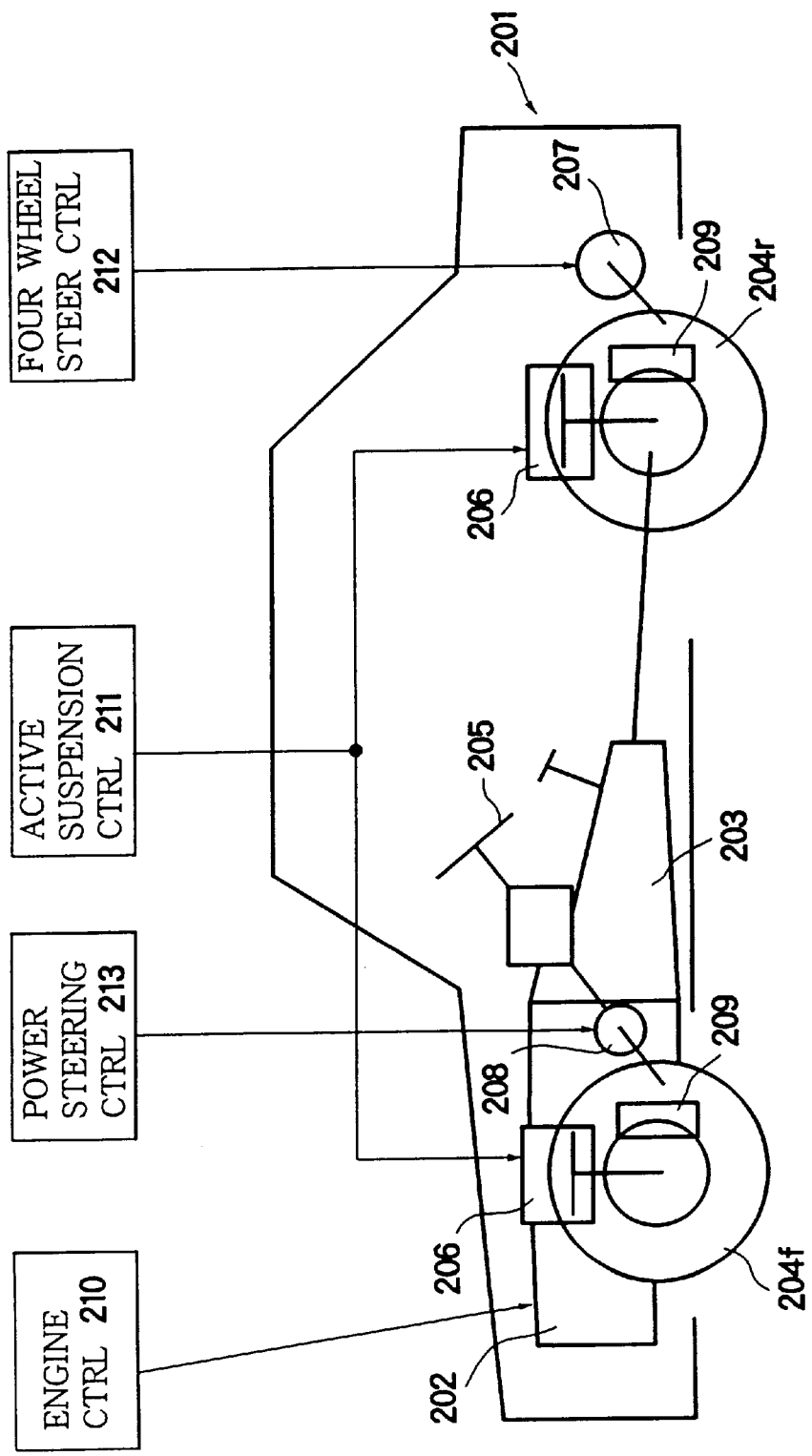
FIG. 56 is a block diagram of the object vehicle in accordance with further embodiment of the present invention.

Referring to FIG. 56, the object vehicle 201 includes engine 202, automatic transmission 203, front wheels 204$f$ and rear wheels 204$r$, steering wheel 205, active suspension 206, rear wheel steering device 207, power steering device 208, braking device 209, air conditioner 219 and the like.

Further, the object vehicle 201 includes as control devices, engine control device 210 (EGI), active suspension control device 211 (ACS) for controlling the active suspension system 206 of the front and rear wheels 204 with a predetermined characteristics , four wheel steering control device 212 (4WS) for controlling the rear wheel steering device 207, power steering control device 213 (P/S) for controlling the power steering device 208, and other control devices (214 through 218). General explanation for the control of those devices are omitted.

Figure 57:
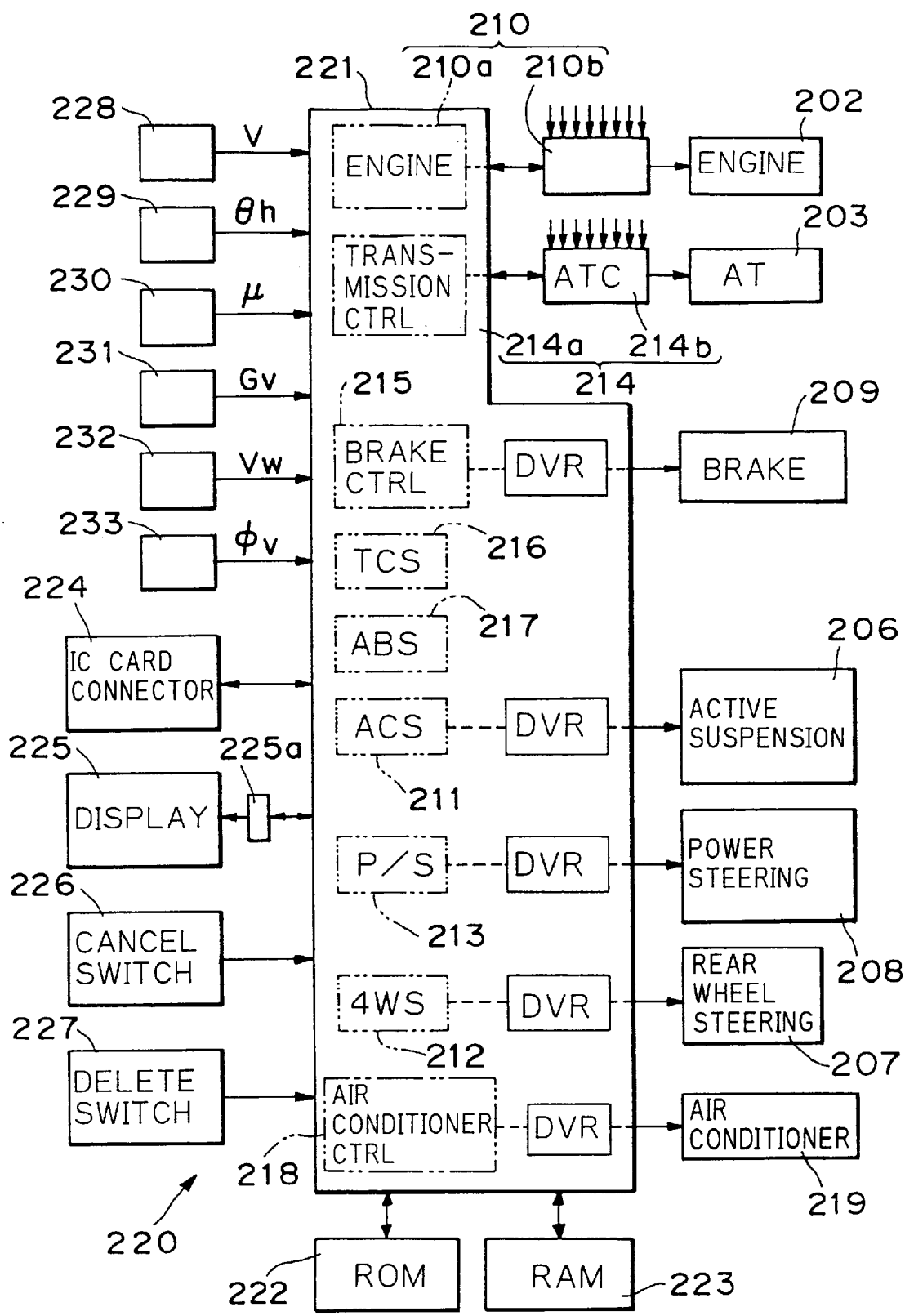
FIG. 57 is a control system of the object vehicle shown in FIG. 56.

Hereinafter, the characteristic change system 220 is described taking reference with FIGS. 57 and 58.

The characteristic change system 220 includes characteristic information forming device 240 separated from the vehicle 201, IC card 260 for storing the characteristic information which is able to be connected with both the object vehicle 201 and the characteristic information forming device 240 to transfer the characteristic information, and IC card connector 224 built in an instrument panel of the object vehicle 201, control unit 221, ROM 222, RAM 223, display 225 and display controller 225$a$, sensors 228 through 233, cancel switch and delete switch 227, which are provided in the object vehicle 201.

The control unit 221 includes two micro computer having CPU, ROM and RAM, input and output interface, plurality of drive circuit DVR. ROM of the micro computer stores a plurality of control programs, RAM of the computer includes various memories(buffer, memory, flag counter, register). The input and output interface includes converter circuit, wave shaping circuit for making A/D conversion of signals from the sensors.

The control sections include engine control section 210$a$, transmission control section 214$a$, brake control section 215, traction control section 216 for controlling the engine output 202 and making a slip control for brake system 209, ABS control section 217 for making the anti-lock braking control for the brake system 209, active suspension control section (ACS211), power steering control section (P/S213) for controlling the power steering device, rear wheel steering control section (4WS212) for controlling rear steering device 207, and air conditioning control section 218 for controlling air conditioner 219.

The engine control device 210 includes engine control section 210a, engine control unit 210b for receiving the signals from the sensors to control the engine 202. The transmission control device 214 includes transmission control section 214a and control unit 214b for controlling the transmission receiving the signals from sensors to control the transmission.

ROM 222 stores control programs for making the characteristic change and display of the change and RAM 223 includes various memories which are necessary to make a characteristic change control and display control.

The control unit 221 includes the vehicle speed sensor 228 for sensing the vehicle speed V of the object vehicle, the steering angle sensor for sensing the steering angle θh, friction sensor 230 for sensing the frictional coefficient $\mu$, vertical acceleration sensor 231 for sensing the vertical acceleration acting on the vehicle body, four wheel speed sensors Vw for sensing rotation speed of four wheels respectively, yaw rate sensor 233 for sensing the yaw rate $\phi v$ of the vehicle body.

The cancel switch 226 cancels the data introduced from IC card 260. The delete switch 227 deletes the data in RAM 223.

Figure 58:
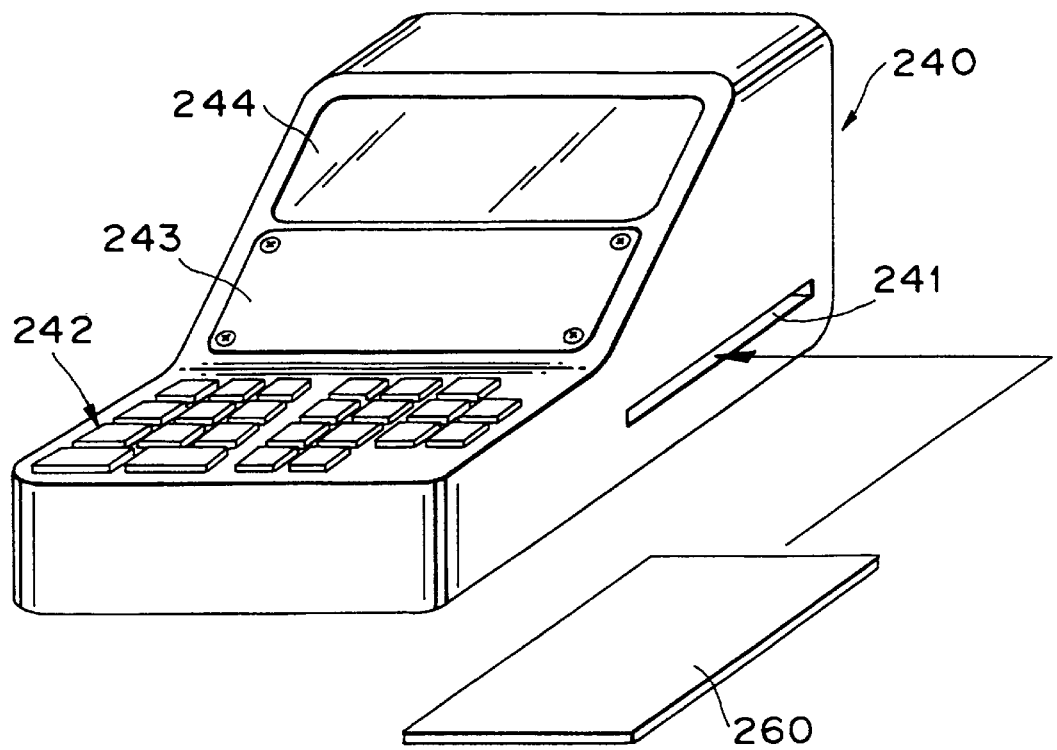
FIG. 58 is a perspective view of a characteristic information forming device and IC card in accordance with the embodiment of FIG. 56.
Figure 59:
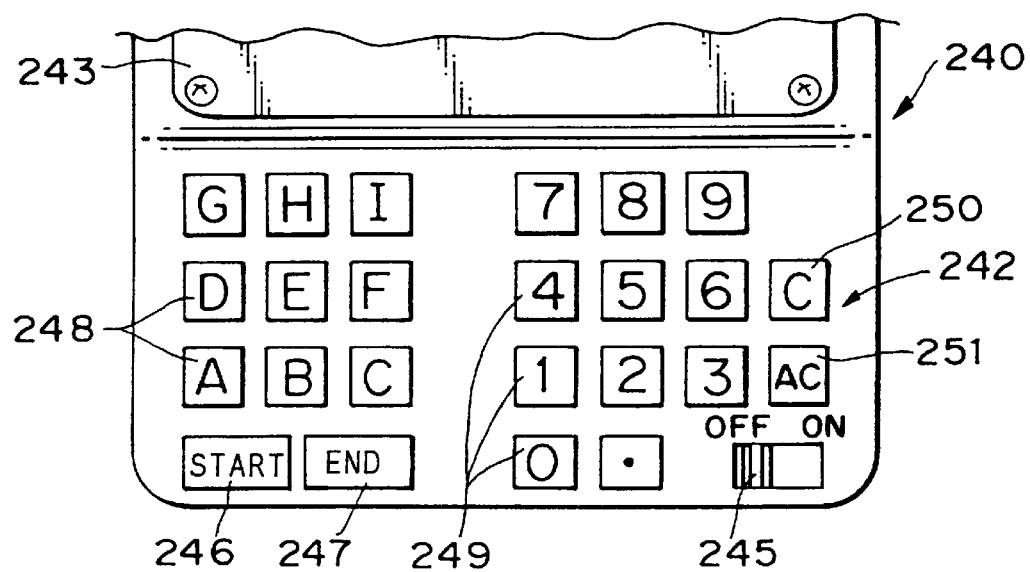
FIG. 59 is a plan view of a key board of the characteristic information device in accordance with the embodiment of FIG. 56.
Figure 60:
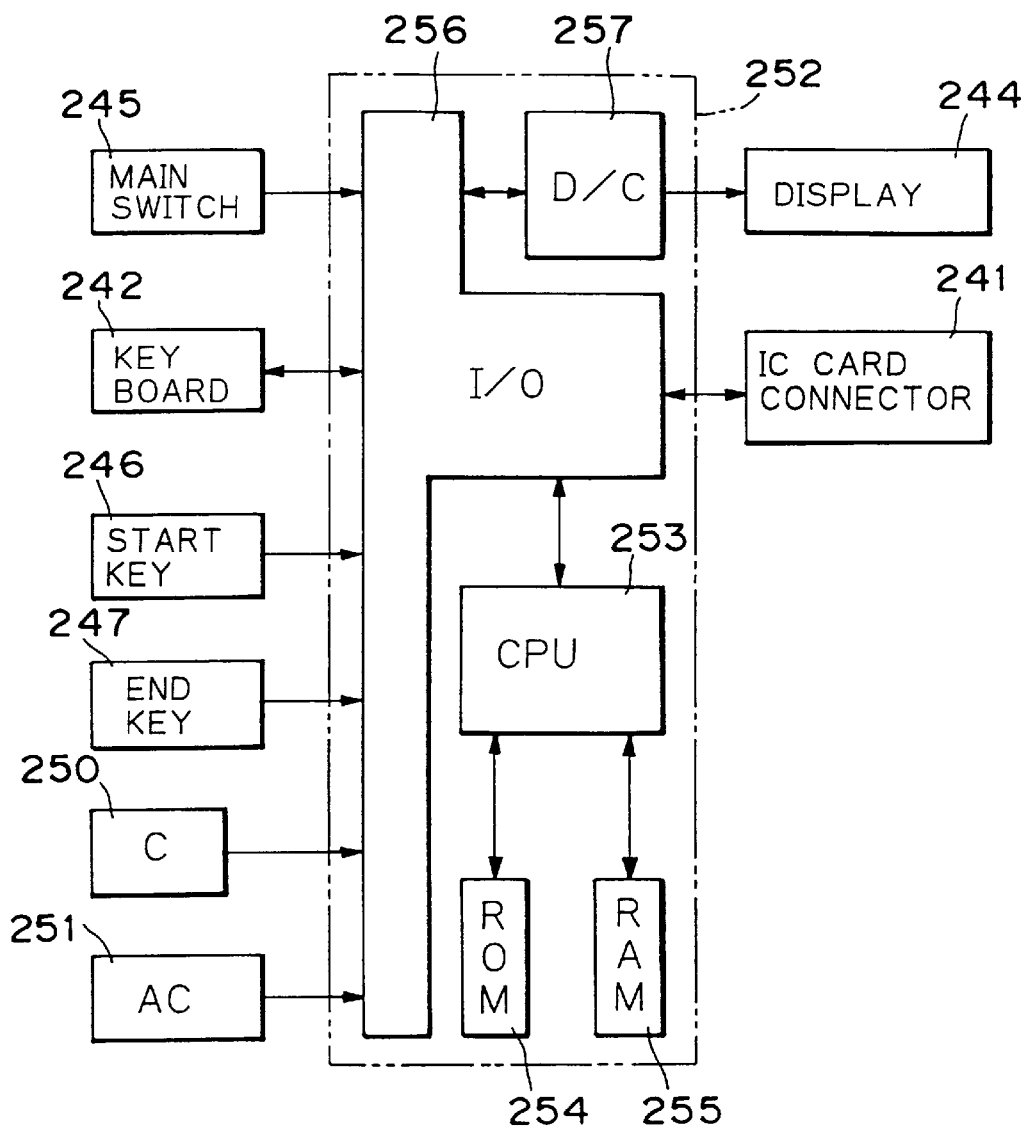
FIG. 60 is a block diagram of the characteristic information forming device in accordance with the embodiment of FIG. 56.

Referring to FIGS. 58 through 60, the characteristic information forming device 240 is provided at lower portion thereof with IC card connector 241 to which the IC card 260 is removably inserted. The device 240 is also provided with specification plate 243 on which body number, manufacture date, owner diver and maker are shown, and liquid crystal display 244. The characteristic information forming device 240 displays a calendar and time when the IC card 260 is not inserted therein.

IC card includes RAM in which digital information is stored so as to be written and read, and memories for storing data formed in the characteristic information forming device 240. As shown in FIG. 59, key board 242 of the information forming device 240 includes main switch 245, start key 246, end key 247, A-I alphabetical character key 248, figure key 249, point key, clear key (C key), all clear key (AC) key.

Referring to FIG. 60, the control unit 252 of the characteristic information forming device 240 includes a micro computer having CPU 253, ROM 254 and RAM 255, input and output interface 256, display controller 257 for controlling the display device 244. The above switches and IC card connector 241, display controller 257 are connected with the interface 256. In ROM 254 are stored display control program for controlling data entry control and display control of the input data, control program for processing and displaying the information of the calender and time display. RAM 255 includes memories necessary to the above control.

Figure 61:
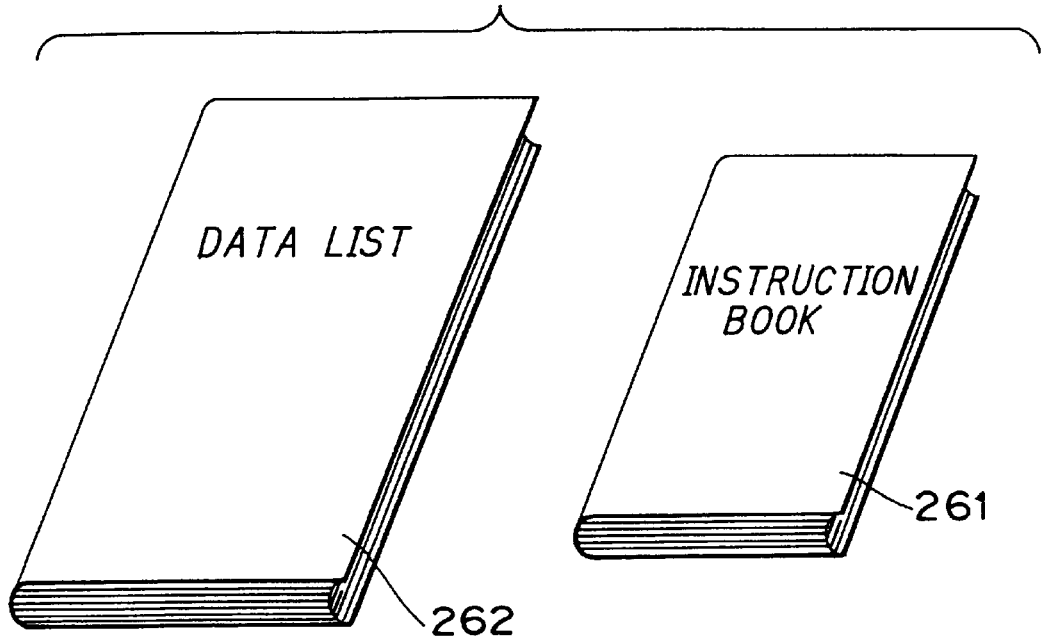
FIG. 61 is an illustrative view of a data list and instruction book for the characteristic information forming device in accordance with the embodiment of FIG. 56.

Referring to FIGS. 61 and 62, instruction book 261 and data list 262 are provided to the driver. The data list 262 includes plural data input patterns, for example, shown in FIG. 62 as a first input pattern 262a. The first input pattern 262a includes question, answer and data input form with regard to A item having 5 items concerning the driver (sex, age, driving experience, the number of vehicle owned by the driver, use condition of the vehicle), B item having 3 items concerning the circumstances (temperature, area, altitude), C item having 2 items concerning use condition (main use object, main fellow passenger) and D item having 3 items concerning (drivability, riding comfort, fuel consumption efficiency).

Referring to FIG. 63, characteristic compensation coefficients of A item are shown. In FIG. 64, characteristic compensation coefficients of B, C and D items are shown. The data of FIGS. 63 and 64 are stored in ROM 222 as a table attached to the characteristic change program stored in ROM 222 of the control unit 221 of the object vehicle as well as in the ROM 254 of the characteristic information forming device 240.

In order to prevent a big charge of the characteristic of the vehicle, the compensation coefficients is set within a range of 0.8–1.2 in the illustrated embodiment. With regard to the characteristic of the EGI 210, characteristic "small" means a fewer fuel consumption and characteristic "large" means a power-up. In ACS211, "small" and "large" provide soft and hard characteristics respectively. In 4WS212, "small" means control for increasing gain for steering rear wheel opposite direction to the front wheel (increase of opposite phase gain). "large" means control for increasing gain for steering the rear wheel to the same direction as the front wheel (increase of same phase gain). With regard to P/S213, the steering power assistance is increased in "small" and is decreased in "large".

The compensation coefficients of A item are commonly determined for EGI 210, ACS 211 and 4WS and P/S213. On the other hand, the compensation coefficients of B, C and D items are determined separately for the EGI210, ACS211, 4WS212 and P/S213.

In the compensation coefficients of FIG. 63, the compensation coefficient "small" means a reduction of the value so that the characteristic goes to the base characteristic. If the driver is a woman, the young, the old, the one of short term driving experience, or the like, the compensation coefficient is set at a small value. This is because they are not considered skilled driver in many case.

If the driver has a long driving experience, for example more than 5 years, or if the driver's age is ranged from 21 to 30 or the like, they are considered skilled driver so that the compensation coefficients are set at a large value. If the number of vehicle owned is one, the coefficient is set at a small value. In this situation, the vehicle 201 is possibly driven by plural persons.

The determination of compensation coefficients shown in FIG. 64 takes into account of low friction coefficient of road in the cold area, reduction of viscosity of oil. In addition, if the vehicle is mainly used for commuting, the compensation coefficient is determined taking account of the riding comfort. If the vehicle is mainly used for leisure, the steering stability is improved to enable an active driving. If the vehicle is mainly used for shopping, and business, the compensation coefficients of the vehicle are determined to improve fuel consumption efficiency, and steering property. In this case, the value a1 through a5, b1, d1 through d3 can be determined directly by entering 0 or 1. With regard to the compensation coefficients having an order, a weight is determined in accordance with the order wherein the weight of the first, second, third and fourth places are 40, 30, 20 and 10%.

For instance, if the order is city area (first place), suburban (second place), rural area (third place), mountain area (fourth place), the compensation coefficient b2 of second portion of B item can be obtained as follows;

$$b2=0.4*b21+0.3*b22+0.2*b23+0.1*b24$$

This calculation is made with regard to EGI210, ACS211, 4WS212 and P/S213 respectively. Likewise, the compensation coefficients b3, c1, c2, and c21 through c24 are calculated.

Figure 65:
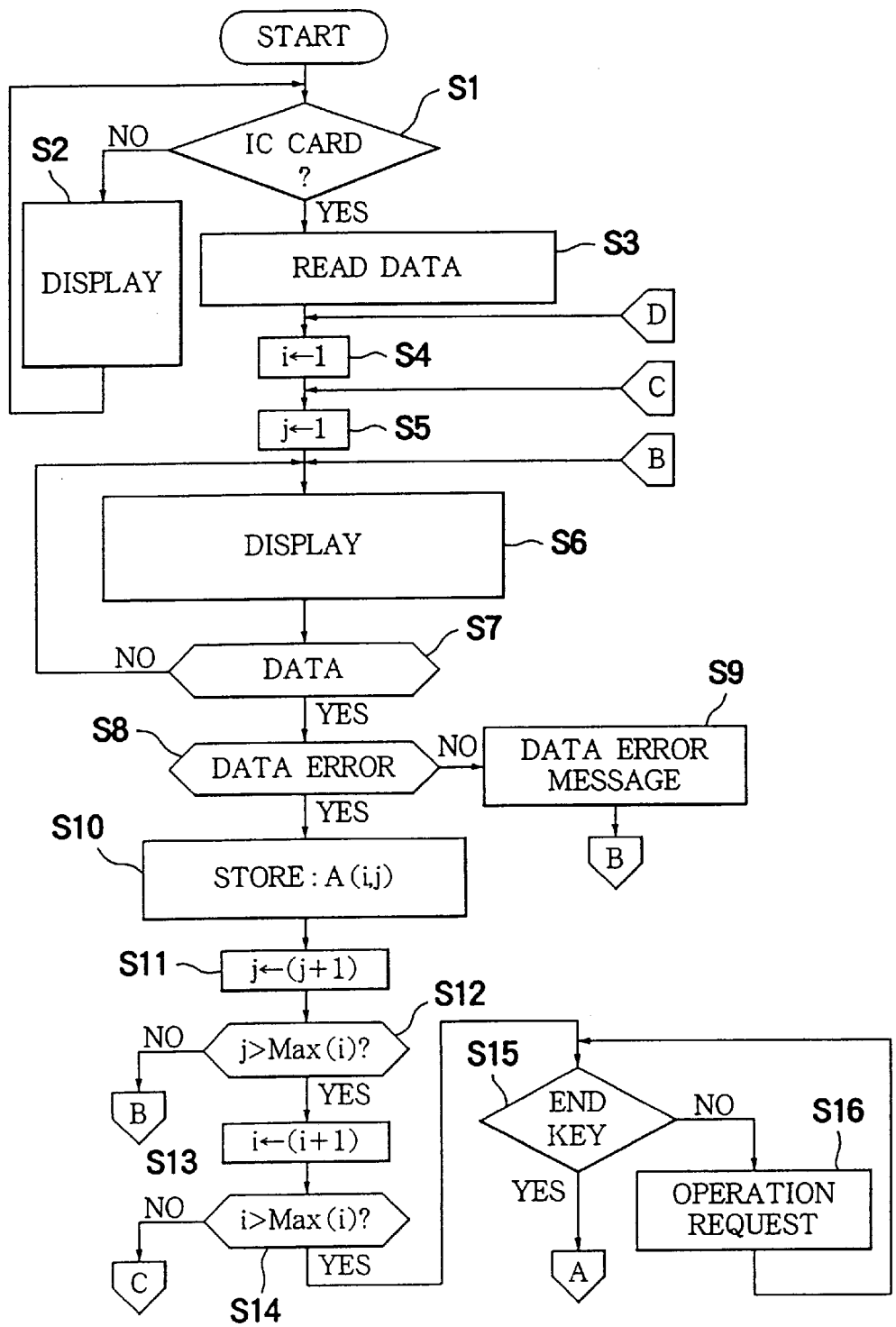
FIGS. 65 and 66 are a flow chart of a data entry control in accordance with the embodiment of FIG. 56.

Referring to FIG. 65, there is shown a flow chart of data entry control utilizing the control unit 252 of the characteristic information forming device 240.

The control unit 252 judges whether or not IC card 260 is inserted to the connector 241 (S1). If not, the control unit 252 displays the date and time and message to indicate the insertion of the IC card 260 (S2). If the IC card 260 is inserted therein, the control unit 252 reads out the data from the IC card 260 and stores the data in the RAM 55. The data relating to the base characteristics of the control devices 210 through 218 can be stored.

Next, an input item number i (i=A, B, C and D) is set at 1 corresponding to A (S4). The small item number j (j=1 through 5 (max)) is set at 1 corresponding to (1) (S5). In step S6, the input item numbers i and j are shown in the display 44. In step S7, it is judged whether or not the data are entered. If Yes, it is judged whether or not data there is data error. If there is an error, the error message is displayed. If there is no error, the data is stored in the RAM 255 by pointing the address by means of address pointer A(i,j). Next, the small item number j is incremented (S11). It is judged whether or not the small item number is greater than Maximum value of the input item number (such as 5 in item A, 3 in Item B and the like) (S12). Thus, the steps S6 through S12 is repeated.

The data introduced into item A is as follows; A, 1, 1, 0, 2, 0, 0, 1, 0, 3, 0, 1, 0, 4, 1, 0, 5, 1, and 0. In step 12, if the small input item number j is greater than the maximum value in the input item number i. The control unit 252 is incremented in the order of B, C, D in step S13. In step S14, the input item number i is judged whether it is greater than the maximum value corresponding to item D. The steps S5 through S12 is repeated to enter all the data in the list 262a. Then, it is judged whether or not the end key 247 is operated. If not, the display is made to indicate the operation of the end key 247. The operation of the clear key 250 cancels the latest data entered therein.

In step S17, all the data entered to the device 240 are shown on the display 244 so that all the data are checked out. If there is mistake in entering the data or if it is desired to change the data, all the data stored in the RAM 255 can be canceled and the procedure go to step S4. If the all clear key 251 is not operated, all the data in the RAM are stored in the IC card 260 in step S20. In step S21, the compensation coefficients b2e, b2a, b2w, b2p, b3e, b3a, b3w, b3p, c1e, c1a, c1w, c1p for EGI210, ACS211, 4WS212, P/S213 are obtained respectively after weighting as mentioned above. Suffix e, a, w, p means EGI, ACS, 4WS and P/S. Thus, all the compensation coefficients in FIG. 64 are determined in accordance with the calculation of step S21. In step S22, combined characteristic information compensation coefficients Ke, Ka, Kw, Kp are calculated as follows;

$$Ke=b1e*b2e*b3e*c1e*c2e*d1e*d2e*d3e$$

$$Ka=b1a*b2a*b3a*c1a*c2a*d1a*d2a*d3a$$

$$Kw—b1w*b2w*b3w*c1w*c2w*d1w*d2w*d3w$$

$$Kp=b1p*b2p*b3p*c1p*c2p*d1p*d2p*d3p$$

In step S23, final characteristic compensation coefficients FKe, FKa, FKw, FKp for EGI210, ACS211, 4WS212, P/S213 can be obtained by multiplying the compensation coefficient a1 through a5 in FIG. 63 as follows;

$$FKe=1.0+(Ke-1.0)*a1*a2*a3*a4*a5$$

$$FKa=1.0+(Ka-1.0)*a1*a2*a3*a4*a5$$

$$FKw=1.0+(Kw-1.0)*a1*a2*a3*a4*a5$$

$$FKp=1.0+(Kp-1.0)*a1*a2*a3*a4*a5$$

Figure 67:
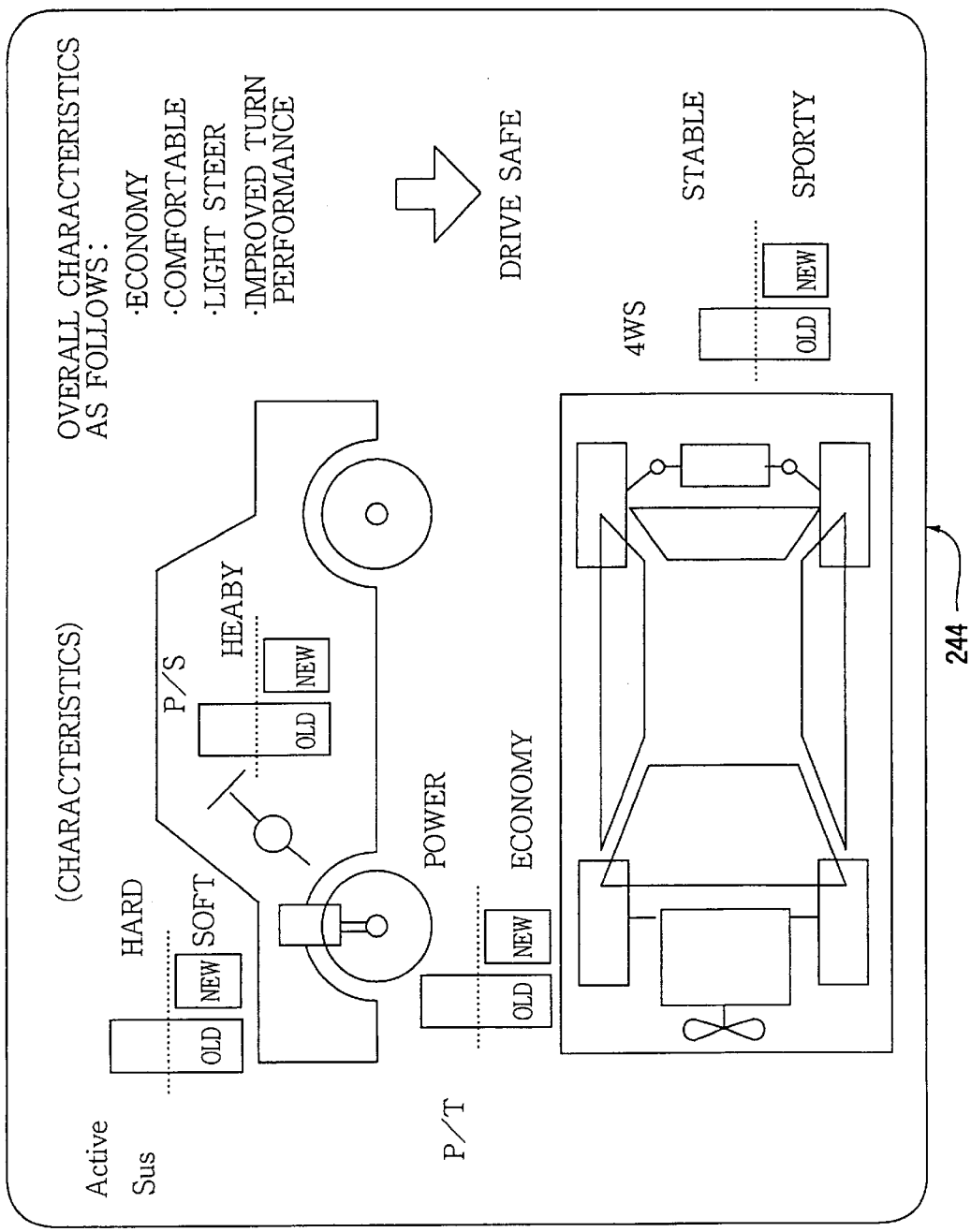
FIG. 67 is an illustrative view displaying vehicle characteristics in accordance with the embodiment of FIG. 56.

In step S24, coefficients FKe, FKa, FKw, FKp are stored in the RAM 55. If there is previous values of FKe, FKa, FKw, FKp, the previous and present values of FKe, FKa, FKw, FKp are shown on the display 244 as shown in FIG. 67. RAM includes the previous data storage section and present data storage section. The display 244 shows, in the form of bar graph, both characteristic compensation coefficients before and after the characteristic change in parallel so that the gap or difference between two compensation coefficients can be seen. In addition, the compensation coefficients 1.0 of the base characteristic of is shown by a broken line and total characteristic assessment. A word of "old" and "new" are indicated to the previous and present coefficients. As the assessment message, low fuel consumption, normal, power with regard to EGI210, improved riding comfort, normal, improved steering stability, improved cornering characteristic, normal, improved steering stability, light steering force, normal, heavy steering force and the like are displayed. These messages are stored in ROM 254 together with the display control programs.

Figure 68:
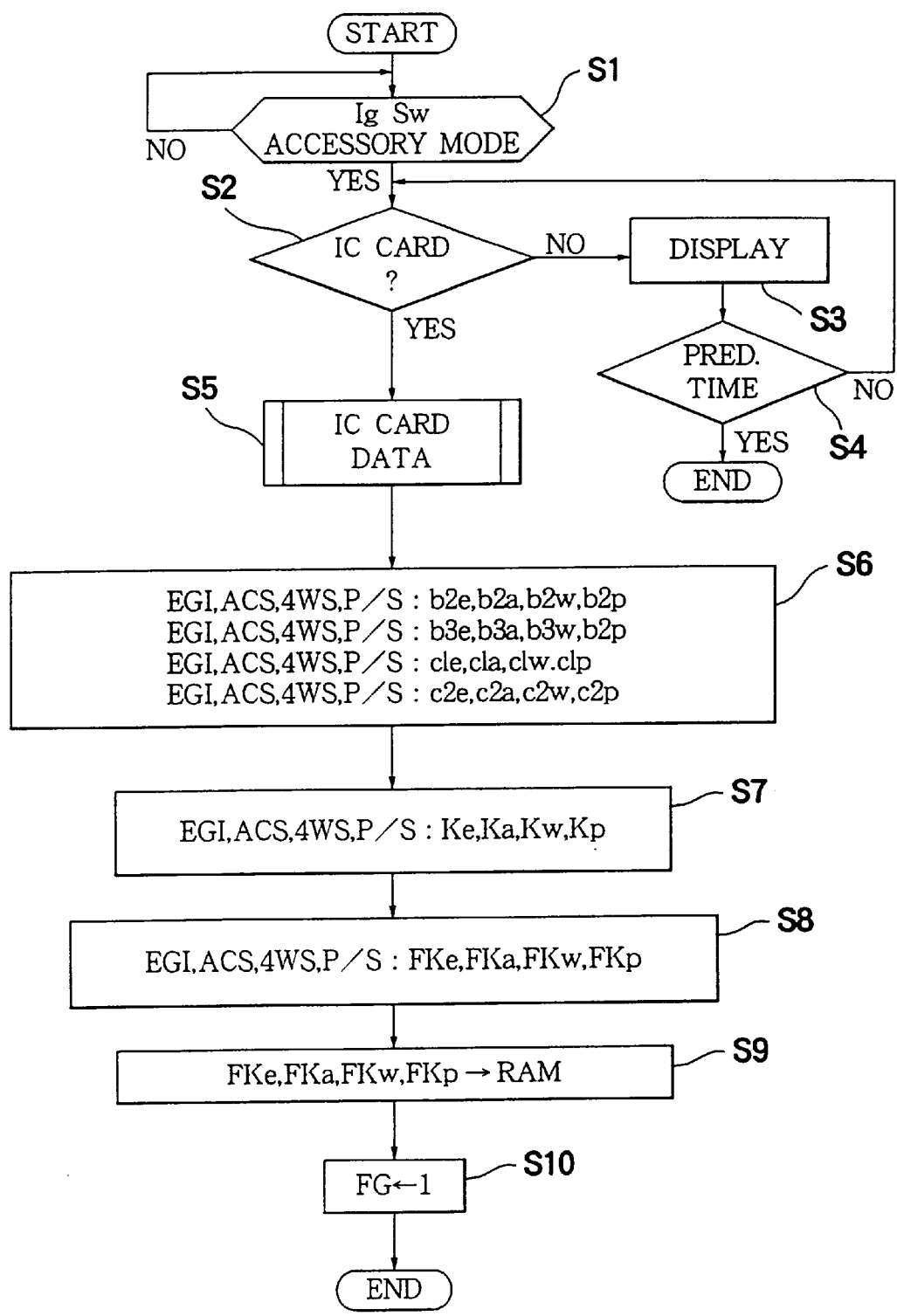
FIG. 68 is a flow chart of a process for obtaining compensation coefficient in accordance with the embodiment of FIG. 56.

Hereinafter, there is described a characteristic change control executed by the main control unit 221 of the object vehicle 201 taking reference with FIGS. 68 and 69. FIG. 68 shows a compensation coefficient calculation procedure for calculating the final compensation coefficient based on the data in the RAM 223 transferred from the IC card 260. The control unit 221 judges whether or not the vehicle 201 is in an accessory mode in which the engine is not started based on an ignition switch signal from EGI210 (S1). Then, control unit 221 judges whether or not the IC card 260 is inserted into the connector 224. If the judgment is No and a certain time period is passed the control unit 221 ends the procedure. In this case, the characteristics of the vehicle is not changed and the vehicle 201 is controlled in accordance with the base characteristics.

Figure 66:
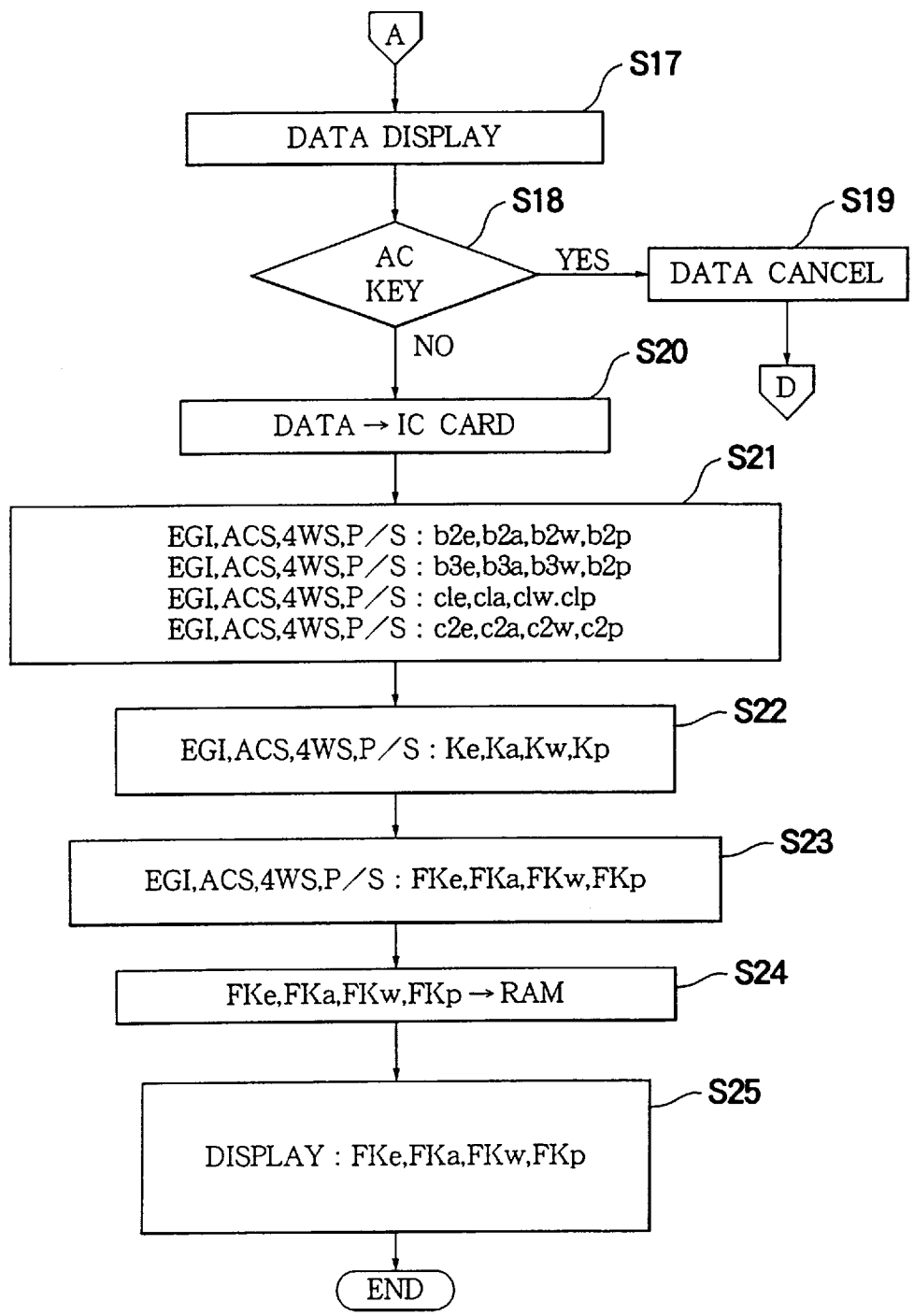

In step S2, the judgment is Yes, the control unit 221 reads the data of the IC card 260 (S5). The data is stored in the RAM 223. The steps S6 through S9 are the same as those of S20 through S24 in FIG. 66 for calculating the final characteristic compensation coefficient. In step S9, a flag FG is set for indicating the end of the calculation.

If the final characteristic compensation coefficients FKe, FKa, FKw and FKp calculated in the characteristic information forming device 240 are stored in the IC card 260, the steps S6 through S9 can be omitted.

Figure 69:
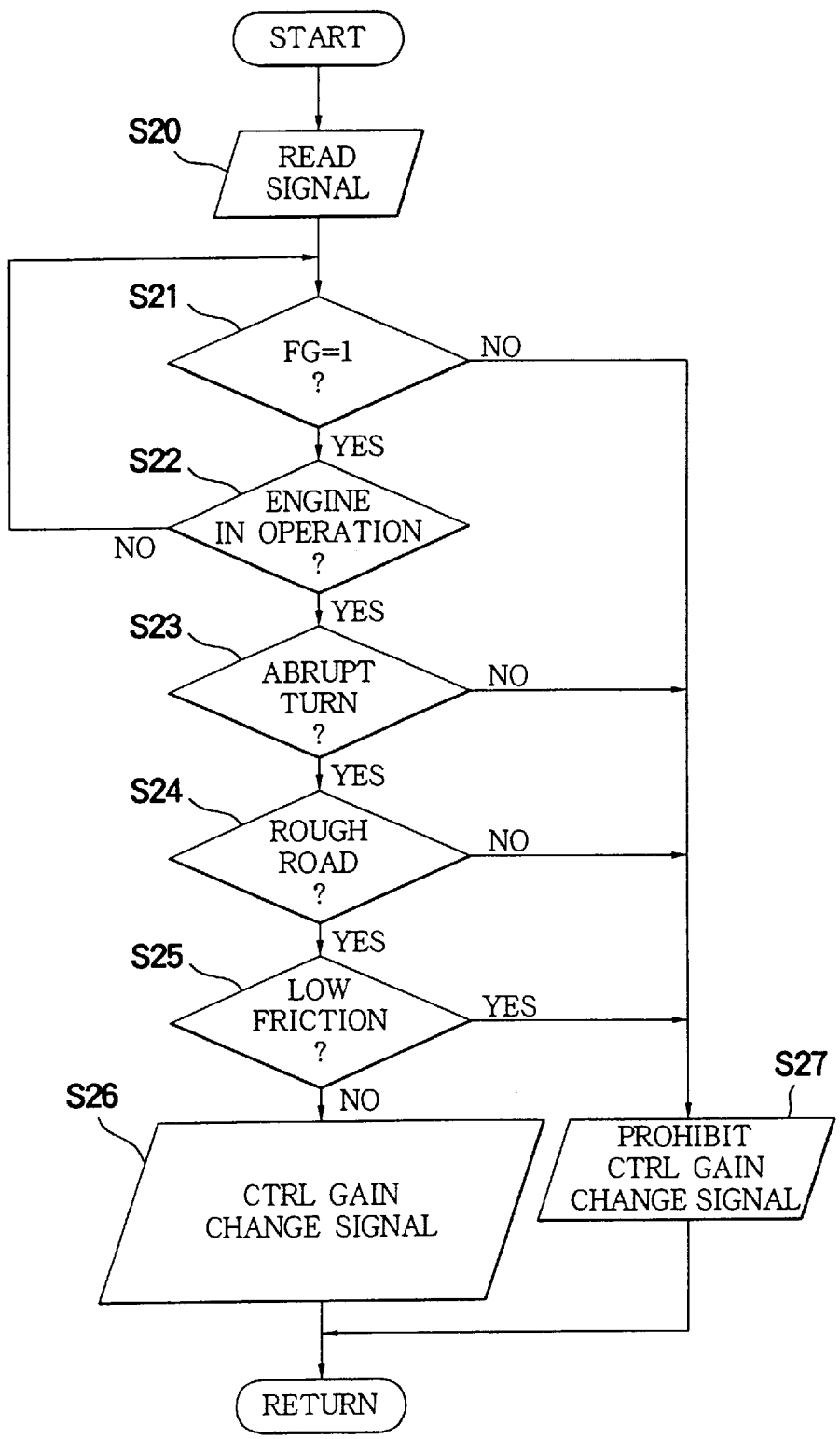
FIG. 69 is a flow chart of a process for changing the characteristics of the object vehicle in accordance with the embodiment of FIG. 56.

Referring to FIG. 69, The control unit 221 of the object vehicle 201 changes the characteristics of EGI 210, ACS211, 4WS212, P/S213 based on the final characteristic compensation coefficients FKe, FKa, FKw and FKp.

When the ignition switch is turned on, the control unit 221 of the vehicle 201 reads the signals from the vehicle speed sensor, steering angle sensor 229, friction coefficient sensor 230, vertical acceleration sensor 231 (S20). In step S21, the control unit 221 judges whether or not the flag FG is set. If No, the control unit 221 executes the step S27 and prohibits the change of the characteristics of the vehicle 201. If the engine is started, the procedure goes to step S23. In step S23, the control unit 221 judges whether or not the vehicle is in the abrupt cornering based on the signals from the vehicle speed sensor 228 and the steering angle sensor 229. In step S24, the control unit 221 judges whether or not the vehicle 201 runs on a rough road based on the vertical acceleration sensor 231. In step S26, the control unit 221 judges whether or not the vehicle 201 runs of a low friction road based on the signal from the friction coefficient sensor 230. If the vehicle does not make an abrupt turn, neither runs on a rough road nor on a low friction road, the procedure goes to step S26.

In step S26, the characteristic change signals corresponding to the final characteristic compensation coefficients FKe, FKa, FKw and FKp are calculated and entered to the EGI210, ACS211, 4WS212 and P/S213 so as to change the base characteristics. When the engine is in operation, the characteristic change signals are produced every short time period.

If the flag FG is reset, or If the vehicle 201 is making the abrupt turn, or runs on the rough or low friction road, the procedure goes to step S27 so that the vehicle is operated based on the base characteristics originally provided therein. Likewise, when the IC card 260 is not connected with the connector 224 of the vehicle 224, or when the cancel switch 226 is operated, the vehicle 201 is operated in accordance with the base characteristics.

The RAM 223 includes a previous data storage section and the present data storage section as well as the RAM 255 of the characteristic information forming device 240.

The control unit 221 is provided with the display 225 as well as the characteristic information forming device 240. Thus, the similar display as the display 244 is made on the display 225.

Referring to FIG. 70, there is shown another embodiment utilizing data list 262b. In the illustrated embodiment, the characteristic compensation coefficient are directly introduced to the characteristic information forming device 240. This system is considered to be suitable specifically to a skilled person have a sufficient knowledge about automobile. As shown in FIG. 70, specific figures such as, 0.8, 0.9, 1.0, 1.1, 1.2 are provided for the engine characteristics (intake amount, fuel injection, ignition timing), shift operation characteristics of the transmission, brake characteristics, TCS characteristics of the traction control, ABS characteristics of the anti-lock braking characteristics, power steering characteristics, rear wheel steering characteristics, air conditioning characteristics, and the like respectively. The driver are supposed to selectively enter a specific figure as a characteristic compensation coefficient. For example, data of item A are 1, 1.1, 2, 0.9, 3, 1.1 for the intake amount, fuel injection, and ignition timing characteristics. When the entry of the data from item A through H, the data are stored in the RAM 255 of the characteristic information forming device 240 and the IC card 260. The main control unit 221 of the object vehicle 201 reads the IC card 260 and introduces the characteristic change signal corresponding to the characteristic compensation coefficient from the IC card 260 into the control devices.

The characteristic change system in accordance with the present invention may include third through fifth pattern data list (not shown) in addition to the first pattern (shown in FIGS. 63 and 64) and second pattern (shown in FIG. 70). The data entered in the characteristic information forming device 240 are shown on the display 244 as aforementioned in connection with the first pattern shown in FIGS. 63 and 64 and can be revised through key operation in the key board 242.

The third, fourth and fifth patterns could be arranged for a highway drive, mountain road drive, and low friction road drive respectively so that the characteristics of the vehicle can be desirably changed by the driver through the key operation of the characteristic information forming device 240 in respective drive conditions.

The characteristics established for each of the patterns from the first to fifth can be selectively changed by designating a specific pattern among the above five patterns. One or more patterns can be selectively utilized. The change of the data in the patterns can be made even in the vehicle driving. The IC card 260 which defines the characteristics of the object vehicle 201 can be prepared for each of the drivers for the object vehicle 201 so that the characteristics of the object vehicle 201 can be changed depending on the driver. Alternatively, the IC card 260 can store the data of plural drivers wherein one set of the data corresponding to a specific driver can be selected to change the characteristics of the object vehicle 201. In this case, a single IC card can be commonly used for plural drivers.

Each driver may have his or her own IC card having a copy data of a master IC card and can select his or her own data through a certain identifying operation to transfer the data to the object vehicle. According to this system, plural drivers can change the characteristics of the object vehicle 201 suitable for his or her own taste. Even when the driver changes, the characteristics can readily changed only by inserting his or her card to the connector 224 of the object vehicle.

As another modification, the driver can prepare plural IC cards having data directing different pattern so that the driver can select a pattern by selecting a specific IC card among the plural cards.

Figure 71:
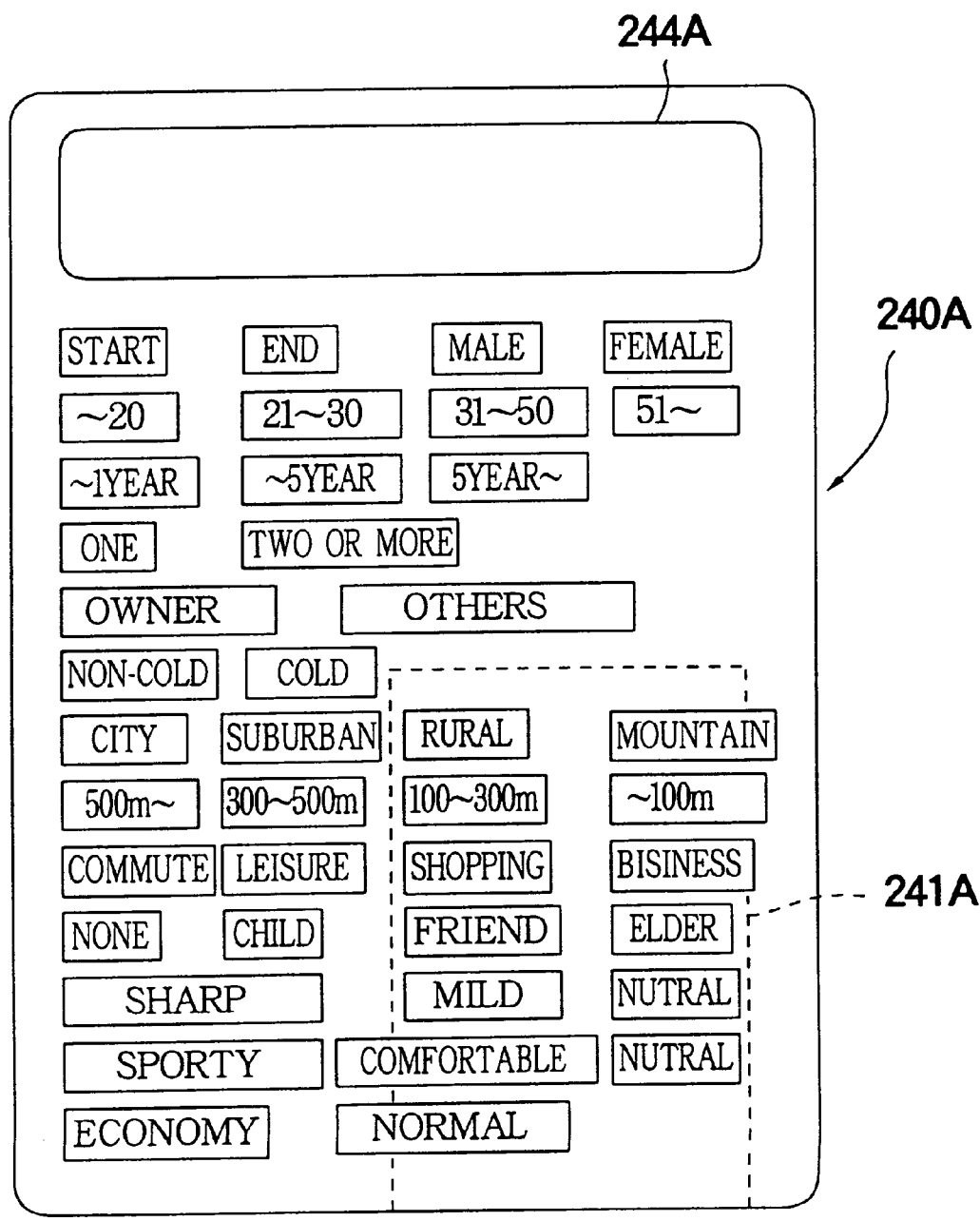
FIG. 71 is a schematic plan view of another characteristic information forming device in accordance with the embodiment of FIG. 56.

Referring to FIG. 71, there is shown another embodiment of the characteristic information forming device 240A provided with keys corresponding to the number of items in the list 26a, liquid crystal display 244A and card connector 241A. Top surface of the key has an indication of the content the corresponding item.

The final compensation coefficients FKe, FKa, FKw, and FKp may be provided in accordance with a road condition, such as ordinary road, highway, mountain road, low friction road and the like. The data can be stored in the IC card previously and the driver may select a set of the final compensation coefficients by operating switches on an instrument panel of the object vehicle 201 so that the set of the compensation coefficients are read from the IC card to change the characteristics of the vehicle 201 suitable for a specific road condition.

The IC card as an information medium can be replaced by a magnetic card, floppy disc, photo disc and the like together with a suitable drive mechanism.

Hereinafter, there is described another embodiment of the present invention.

According to the illustrated embodiment, the characteristic information are directly entered to the object vehicle from an data entry device 324.

Figure 72:
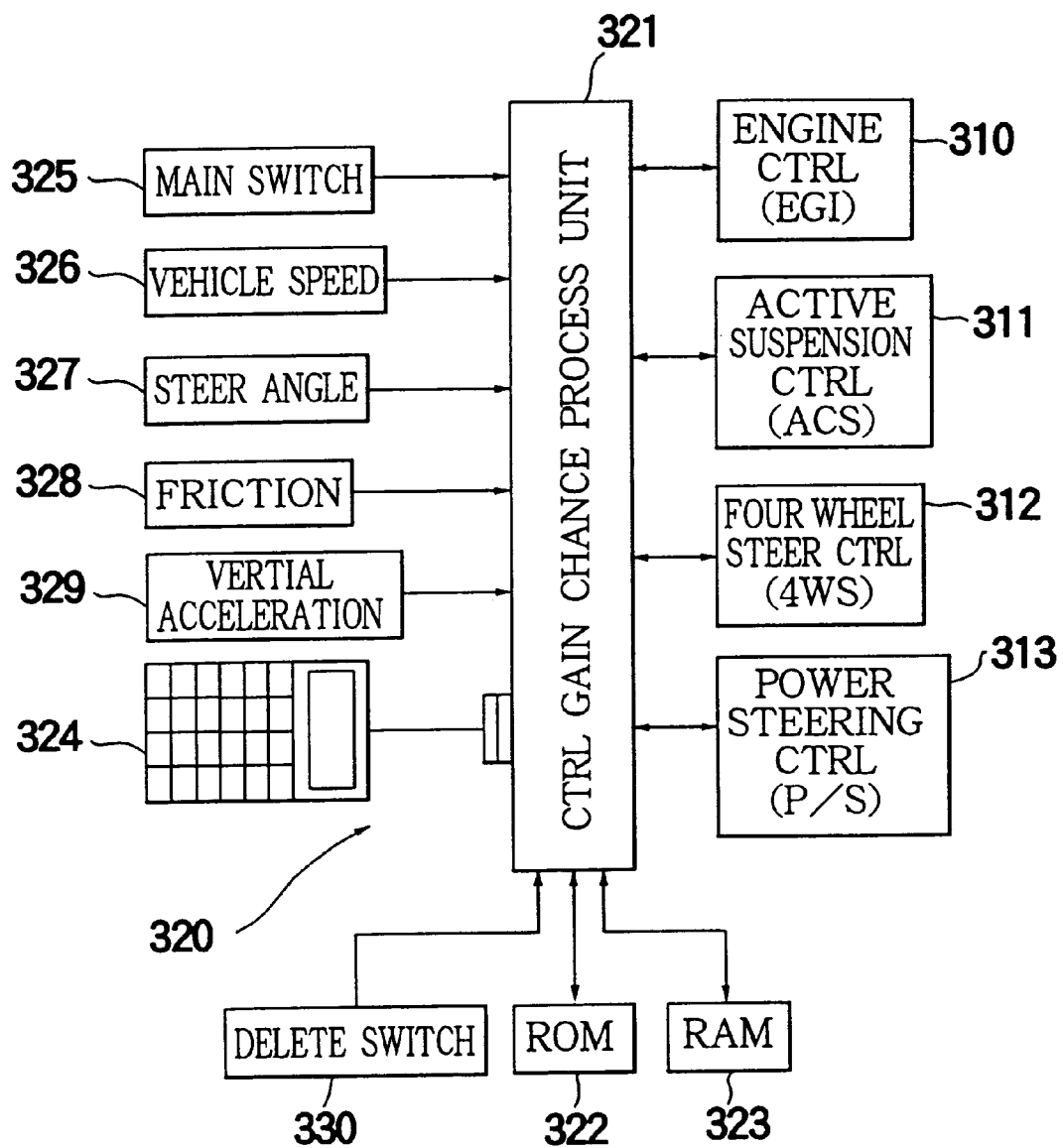
FIG. 72 is a block diagram of another characteristic change system in accordance with the present invention.

As shown in FIG. 72, the characteristic change system 320 includes a characteristic change processing unit 321, ROM 322, RAM 323, data entry device 324 and sensors provided in the object vehicle 201.

The processing unit 321 including an interface and CPU is connected with engine control device 310, power steering control device 311, active suspension control device 312, four wheel steering control device 313, ROM 322 and RAM 323. ROM stores characteristic change programs. RAM 323 includes various memories for executing controls and storing data. The control devices 310 through 313 are provided with one or more units.

With the processing unit are connected a main switch 325, vehicle speed sensor 326, steering sensor 327, friction coefficient sensor 328, vertical acceleration sensor 329, and the like.

The processing unit 321 includes A/D converter, wave shaping circuit for processing the signals from the sensors and cancel switch 330 as well as the former embodiment.

The entry device 324 are removably connected with the processing unit 321 only when the characteristic data are entered to the object vehicle therethrough. The entry device 324 are provided with a data entry system as the characteristic information forming devices 240, 240A as aforementioned. It should be noted that the data entered from the entry device are directly introduced into the processing unit 321 without calculating the final compensation coefficient therein unlike the characteristic information forming device 240 in the former embodiment. Therefore, the final compensation coefficients for the respective control devices are calculated in the processing unit 321 in the illustrated embodiment. In addition, although the final compensation coefficients are stored in the IC card 260 and transferred to the object vehicle 201 through the IC card 260 in the former embodiment, the data are introduced directly from the entry device 324 to the processing unit 321 without being intervened by the IC card 260 in the illustrated embodiment. Thus, more compact system for changing the characteristics of the object vehicle 201 can be provided.

Figure 73:
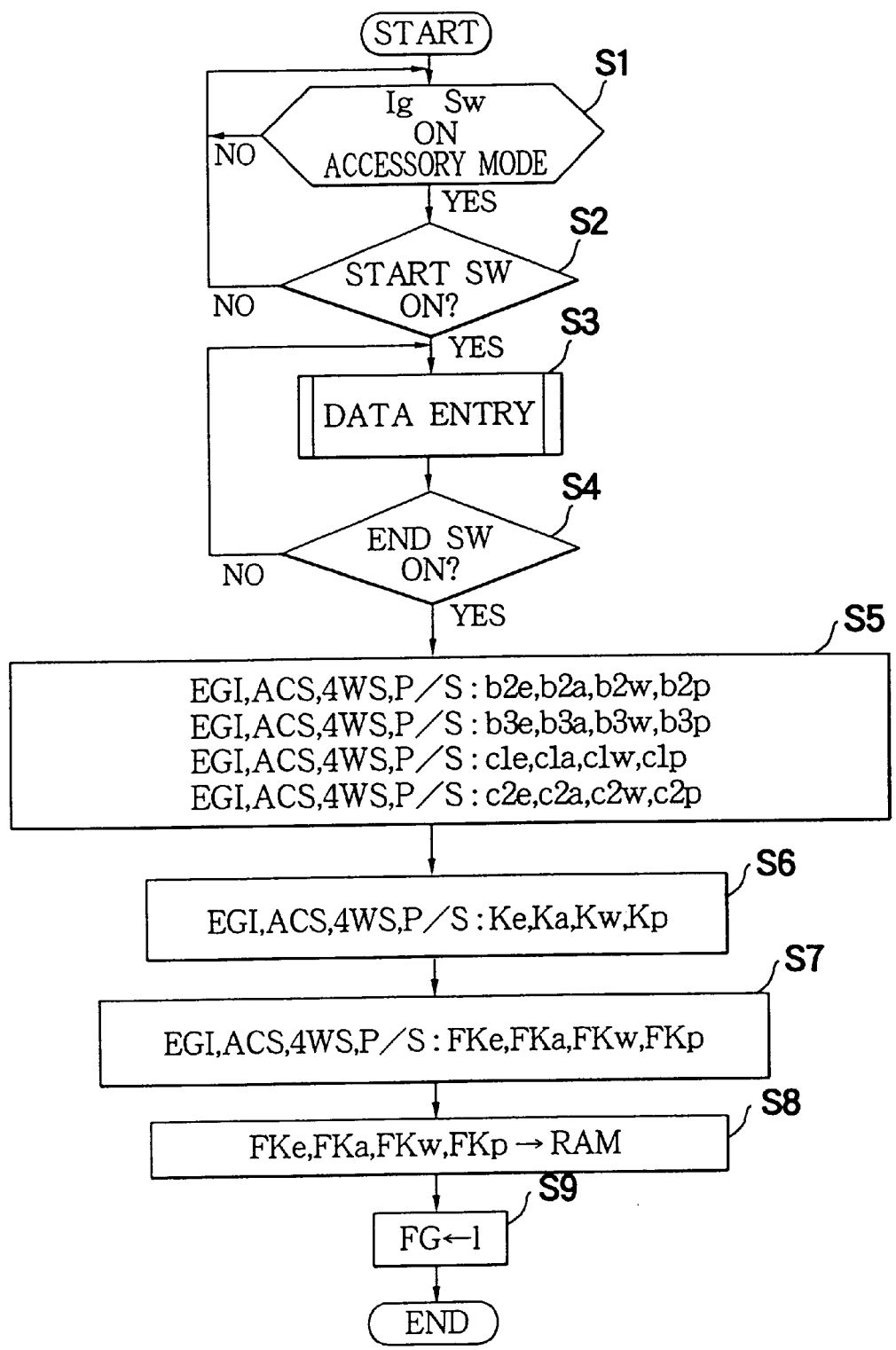
FIG. 73 is a flow chart of a process for obtaining compensation coefficients in accordance with the embodiment of FIG. 72.
Figure 74:
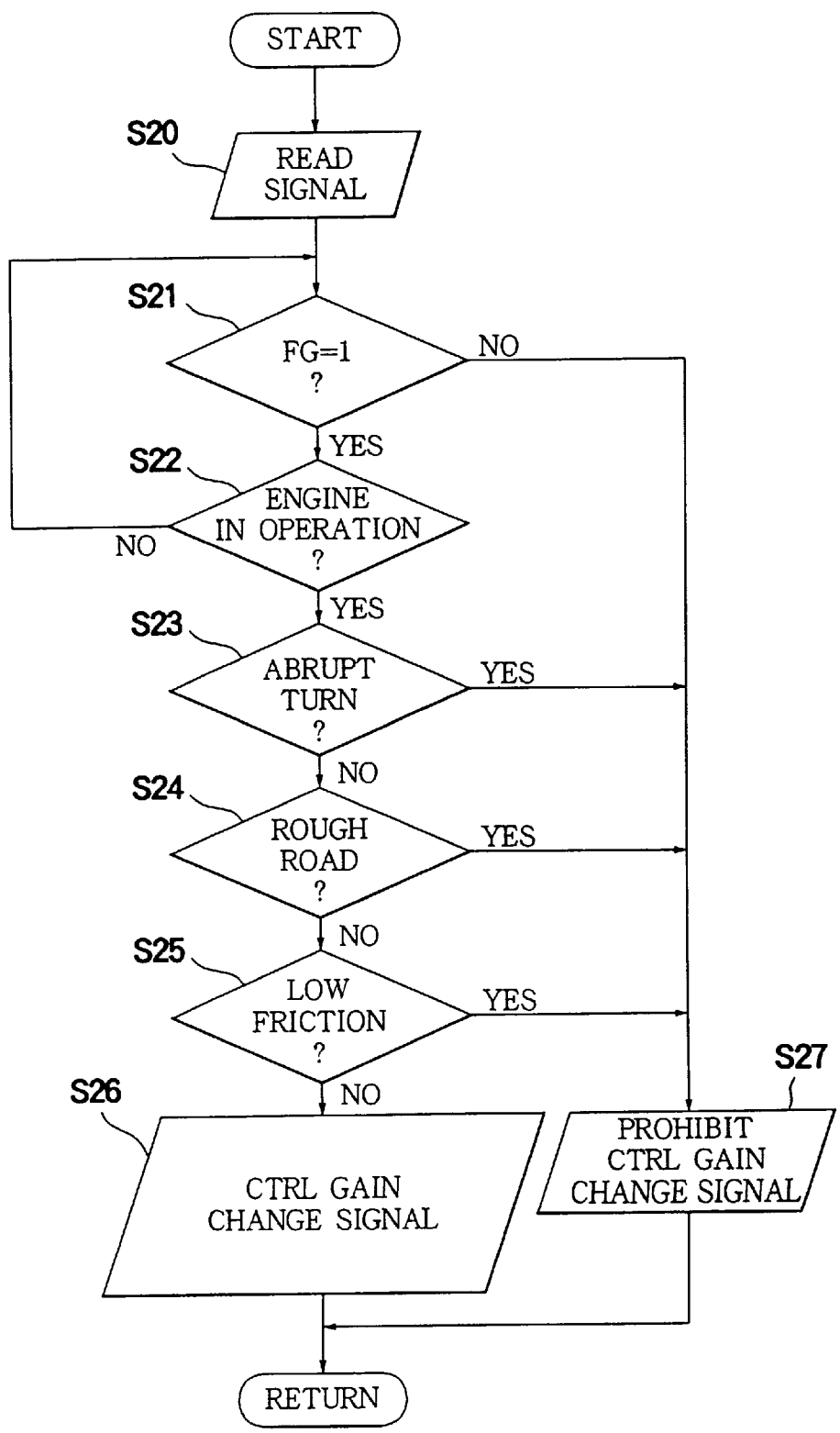
FIG. 74 is a flow chart of characteristic change of the object vehicle in accordance with the embodiment of FIG. 72.

There are shown flow charts of controls for changing the characteristics of the object vehicle 201 in FIGS. 73 and 74. This procedure is the same as that in the former embodiment explained taking reference with FIGS. 68 and 69. Thus, the detailed explanation is omitted.

In the above embodiment, the data can be entered for plural drivers in which a set of data corresponds to a specific driver. In this case, the set of data is entered together with information for identifying the driver or ID signal of the driver. The processing unit 321 determines the characteristics based on the ID signal entered through a switch provided on the instrument panel of the object vehicle 201.

In another embodiment, the entry device is provided on the object vehicle , preferably, so as not to be readily accessible to the driver.

Figure 75:
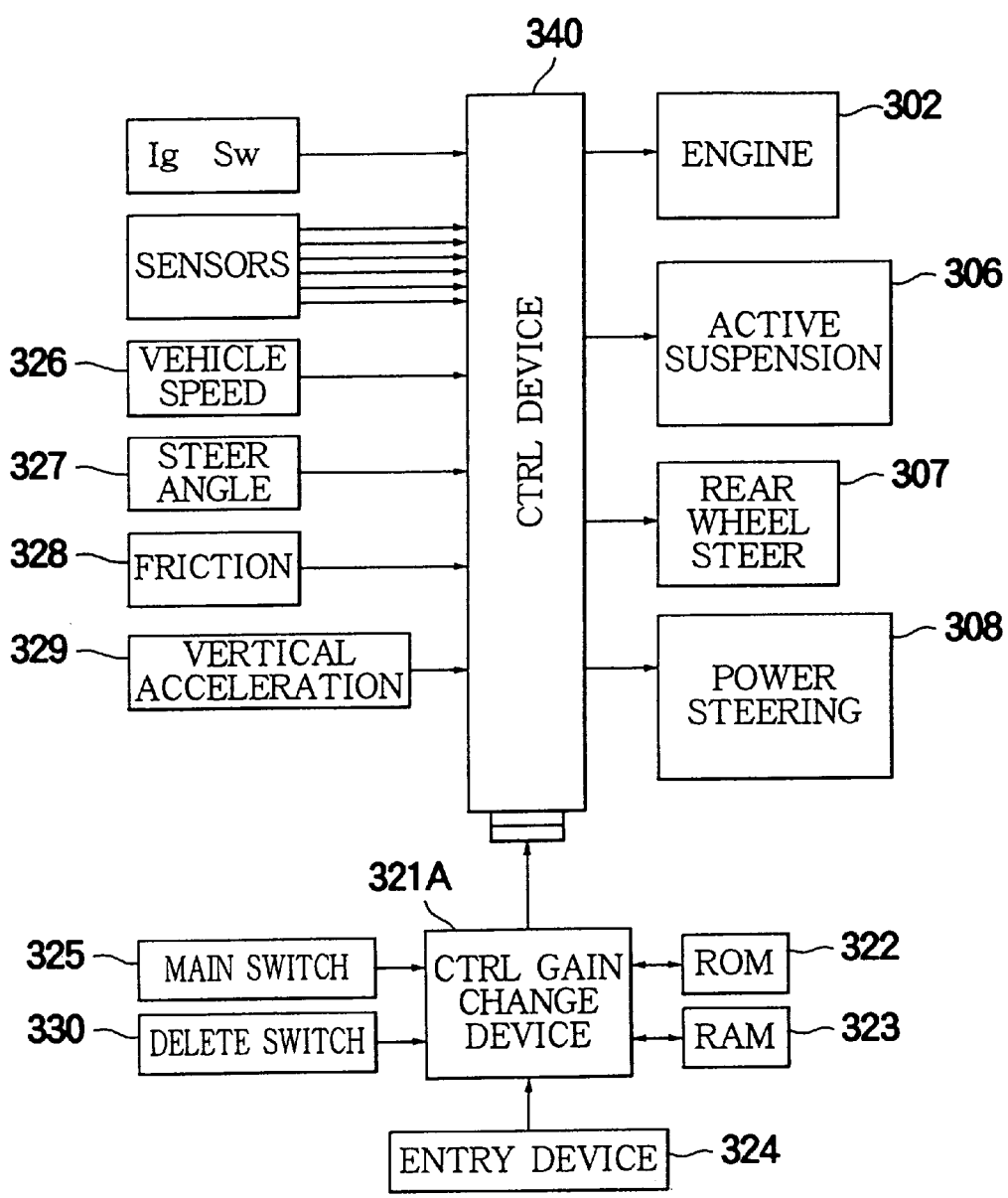
FIG. 75 is a block diagram of further embodiment of a characteristic change system in accordance with present invention.

Referring to FIG. 75, a diagram of the system of further embodiment is shown. As shown in FIG. 75, a processing unit 321A, which has the same function as the processing unit 321 in the former embodiment, is connected with a single unit of control device 340 for controlling the engine 302, active suspension 306, steering device 307, power steering device 308. In this embodiment, the entry device 324 is integrally connected with the processing unit 321A but the processing unit 321A is removably connected with the control device 340. When the data or characteristic change signals are formed in the processing unit 321A and entered to the control device 340, the processing unit 321A together with the entry device 324 is disconnected from the control device 340 of the object vehicle 201.

Hereinafter, there is described still another embodiment of the present invention.

Figure 76:
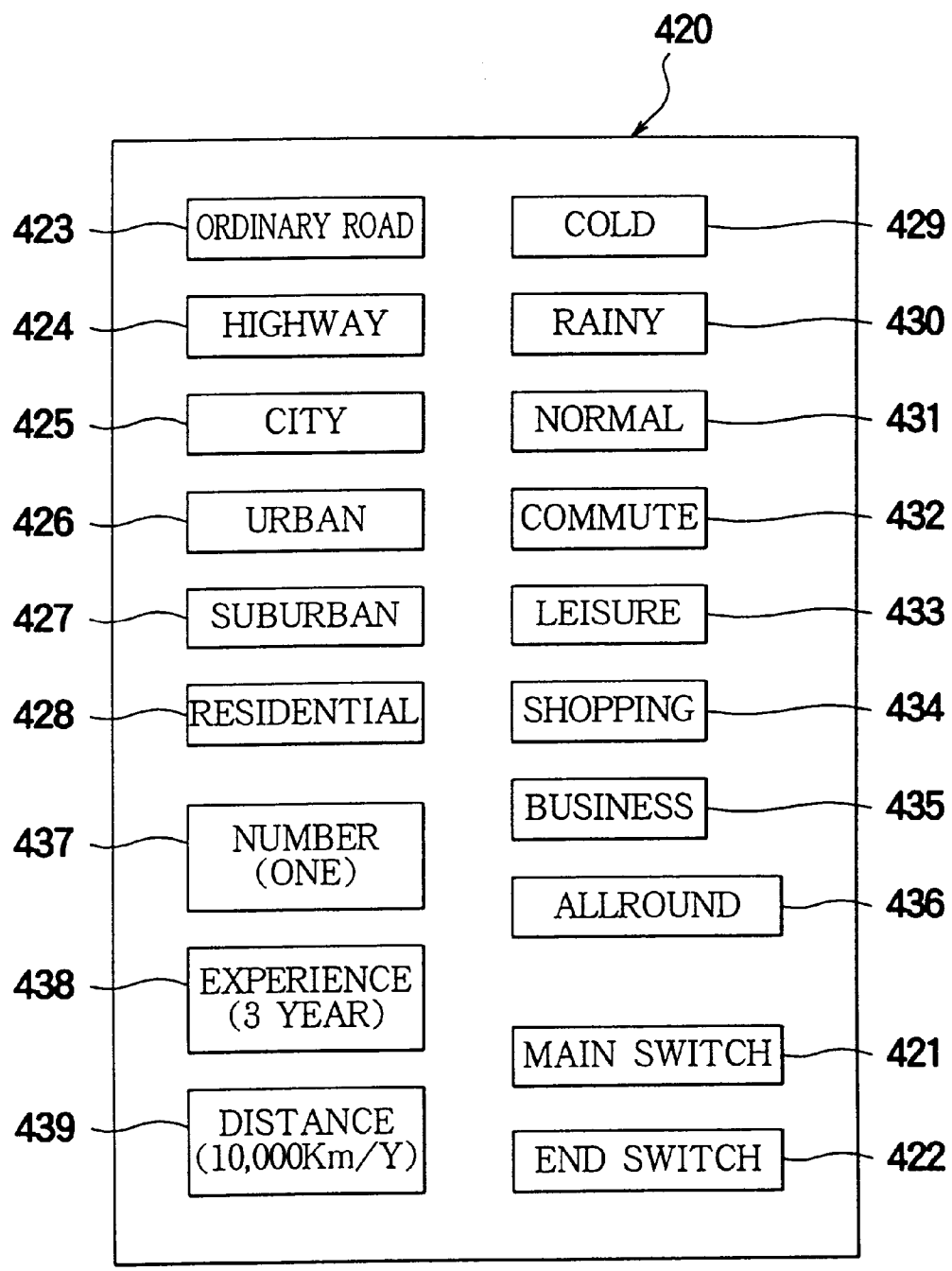
FIG. 76 is a view showing a layout of switches of a characteristic change system for changing the characteristics of the object vehicle in accordance with still further embodiment of the present invention.

In this embodiment, characteristic change switches are provided on the instrument panel of the object vehicle 201. The characteristics of the object vehicle can be changed by an operation of the switches in accordance with use conditions and the like. As shown in FIG. 76, a switch board 420 includes ordinary road switch 423 for selecting a characteristic suitable for the drive in an ordinary road, highway switch 424 for selecting a characteristic suitable for the drive in highway. The switch board 420 also includes switches for selecting condition of running area, such as city area switch 425 for a city area drive, urban area switch 426 for an urban area drive, suburban area switch 427 for a suburban area drive, residential area switch 428 for a residential area drive, one of which can be selected. As for a selection of weather condition, the switch board 420 includes a cold area switch 429 for a cold area drive, rainy area switch 430 for a rainy area drive, normal switch 431 for a normal weather condition, one of which can be selected. As for use condition, there are provided a commuting use switch 432, leisure use switch 433, shopping use switch 434, business use switch 435 and all round switch for controlling overall characteristics of the vehicle 201, one of which can be selected. As auxiliary switches, car switch 437 for indicating the number of vehicle owned by the driver, drive experience switch 438 indicating more than three years of drive experience, distance switch 439 for indicating more than 10,000 km /year drive distance by the driver. Hereinafter, the switches 423 through 439 are referred to as set switches. The switch board 420 also includes a main switch 421 for starting the system and end switch 422 for indicating completion of data entry. The set switches are ON and OFF switches in which photo-diode lamps are built so that operations thereof are visible respectively. The main switch 421 is a hold switch and the end switch 422 is normally opened.

Figure 77:
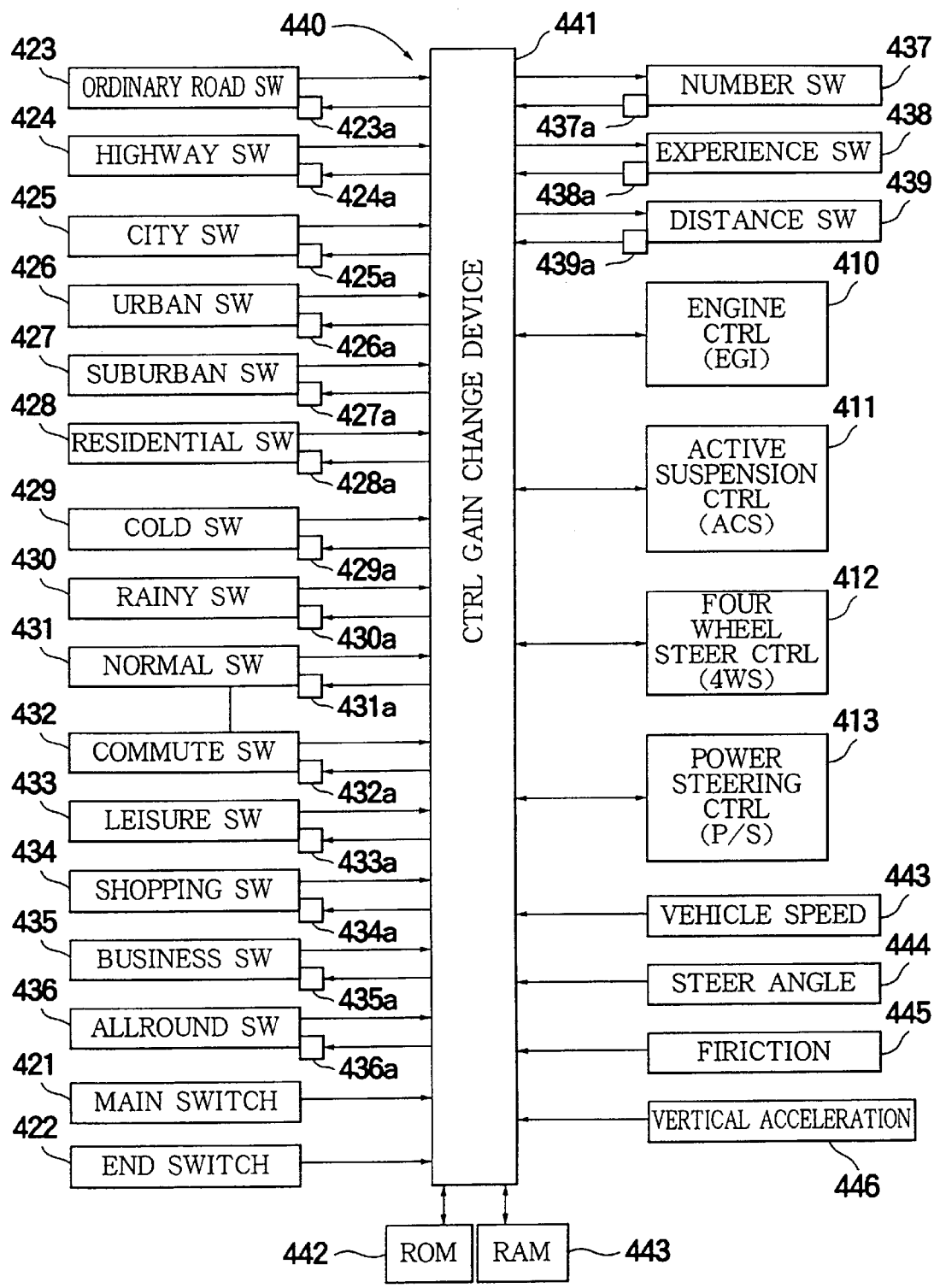
FIG. 77 is a block diagram of the characteristic change system in accordance with the embodiment of FIG. 76.

Referring to FIG. 77, there is shown a characteristic change device 440 includes processing unit 441, ROM 442, RAM 443 and the switches 421 through 439.

The processing unit 321 including an interface and CPU is connected with engine control device 410, power steering control device 411, active suspension control device 412, four wheel steering control device 413, ROM 422 and RAM 423. ROM 442 stores characteristic change programs and table referred to by the programs . RAM 423 includes various memories for executing controls and storing data.

With the processing unit 441 are connected the set switches 421 through 439 and lamps 423a through 439a thereon, vehicle speed sensor 443, steering sensor 444, friction coefficient sensor 445, vertical acceleration sensor 446, and the like.

The processing unit 441 includes A/D converter, wave shaping circuit for processing the signals from the sensors and drivers for the lamps 423a through 439a.

Referring to FIG. 78, there are shown compensation coefficients corresponding to the set switches 423 through 439. ROM 442 stores the table of the compensation coefficients as shown in FIG. 78. Flags Fa1 through Fg are also provided corresponding to the set switches 423 through 439. The set switches 423 through 431 are provided for EGI410, ACS411, 4WS412, P/S413 as shown in items A through D. The car switch 437, drive experience switch 438 and drive distance switch 439 are provided commonly for EGI410, ACS411, 4WS412, P/S413 in item E, F and G as shown in FIG. 78 so as to compensate the compensation coefficients in items A through D.

In order to prevent a big charge of the characteristic of the vehicle, the compensation coefficients is set within a range of 0.8–1.2 in the illustrated embodiment. With regard to the characteristic compensation coefficients of item E, F and G, characteristic "small" generally means that the characteristics are controlled toward the base characteristics a and "large" means that the characteristics of the vehicle 201 are controlled away from the base characteristics. In determining the compensation coefficient, fuel consumption and steering stability are taken into account for the highway drive. Fuel consumption and turning performance are taken into account for the city or urban drive. Low noise and turning performance are considered for the residential area drive.

In addition, the determination of compensation coefficients takes into account of low friction coefficient of road in the cold area, reduction of viscosity of oil. In addition, if the vehicle is mainly used for commuting, the compensation coefficient is determined taking account of the riding comfort. If the vehicle is mainly used for leisure, the steering stability is improved to enable an active driving. If the vehicle is mainly used for shopping, and business, the compensation coefficients of the vehicle are determined to improve fuel consumption efficiency, and turning performance.

If the driver has a long driving experience, for example more than 3 years, or if the driver drives more than 10,000 km/year, they are considered skilled driver so that the compensation coefficients are set at a large value. If the number of vehicle owned is one, the coefficient is set at a small value. In this situation, the vehicle 201 is possibly driven by plural persons.

Figure 79:
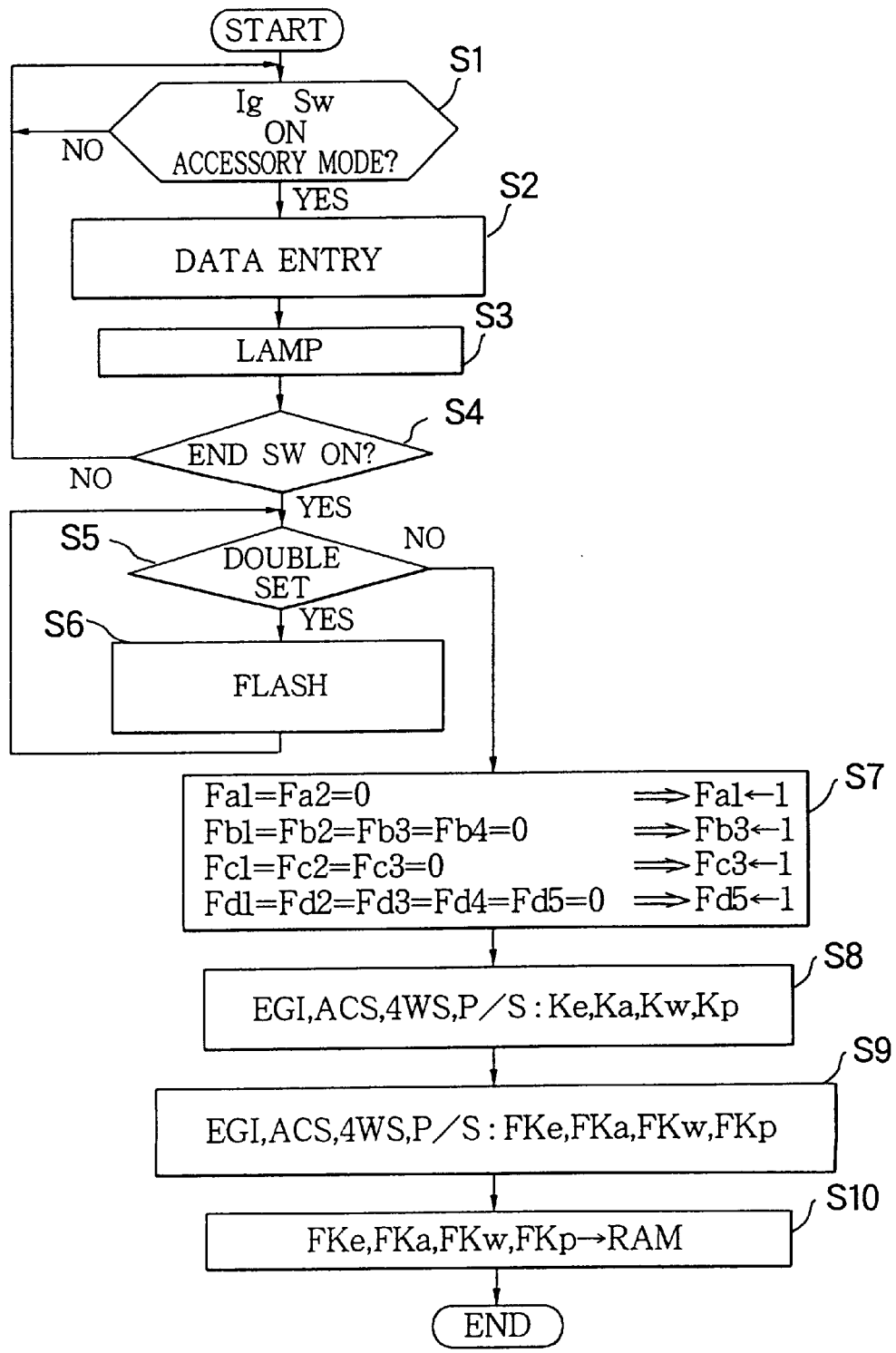

Referring to FIG. 79, there is shown a flow chart of characteristic change control in accordance with the illustrated embodiment.

When the ignition switch 425 is turned on, the control unit 441 of the vehicle 201 judges whether or not the ignition switch is ON but the engine is not started or in accessory mode based on the signal from the ignition switch (S1). If Yes, the control unit 441 sets the flags Fa1 through Fg in response to the operation of the set switches 423 through 439 (S2). In step S3, the control unit 441 lights up the lamps 423a through 439a corresponding to the switches 423 through 439 which are turned on. In step S4, the control unit 441 judges whether or not the end switch 422 is turned on. If Yes, the procedure goes to step S5 in which the control unit 441 judges if there is a duplicated operation on the switches 423 through 439. If there is a duplicated operation, the control unit 441 makes flashing the lamp of the switch which is operated more than once by mistake so as to warn the driver or operator. If there is wrong setting operation for the switches 423 through 439, the control unit 441 sets the flags at a predetermined value automatically. For example, the flag Fa1 is set at 1 for Fa1=Fa2=0, the flag Fb3 is set at 1 for Fb1=Fb2=Fb3=Fb4=0, the flag Fc3 is set at 1 for Fc1=Fc2=Fc3=0, and the flag Fd5 is set at 1 for Fd1=Fd2=Fd3=Fd4=Fd5=0 (S7).

In step S8, combined characteristic information compensation coefficients Ke, Ka, Kw, Kp are calculated as follows;

$$Ke=Cae*Cbe*Cce*Cde$$

$$Ka=Caa*Cba*Cca*Cda$$

$$Kw=Caw*Cbw*Ccw*Cdw$$

$$Kp=Cap*Cbp*Ccp*Cdp$$

Suffix e, a, w, p means EGI, ACS, 4WS and P/S.

In step S9, final characteristic compensation coefficients FKe, FKa, FKw, FKp for EGI210, ACS211, 4WS212, P/S213 can be obtained by multiplying the compensation coefficient Ce, Cf, and Cg as follows;

$$FKe=1.0+(Ke-1.0)*Ce*Cf*Cg$$

$$FKa=1.0+(Ka-1.0)*Ce*Cf*Cg$$

$$FKw=1.0+(Kw-1.0)*Ce*Cf*Cg$$

$$FKp=1.0+(Kp-1.0)*Ce*Cf*Cg$$

If the flag Fe, Ff or Fg is not set, the coefficient Ce, Cf or Cg is omitted from the above formulas. Then, the final compensation coefficients are stored in RAM 443. The change of the characteristics of the object vehicle 201 is made using the final compensation coefficients through the same manner as the former embodiment.

The switches 423 through 439 is preferably provided in the control box only accessible by an authorized person.

Although the present invention has been explained with reference to a specific, preferred embodiment, one of ordinary skill in the art will recognize that modifications and improvements can be made while remaining within the scope and spirit of the present invention. The scope of the present invention is determined solely by the appended claims.

What is claimed is:

1. A method for changing characteristics of a vehicle for sale comprising the steps of;

ordering a vehicle for a user from a manufacturer in response to the user's request to buy the vehicle, providing electronic devices in the vehicle with first characteristics, providing the user with a device for recording data for forming second characteristics different from the first characteristics, receiving the data for forming the second characteristics from the user, transferring the data relating to the second characteristics to the vehicle to change the first characteristics of the electronic devices to the second characteristics when the vehicle is supplied from the manufacturer, and providing the vehicle to the user.

2. The method for changing characteristics of a vehicle for sale according to claim 1 wherein the user employs a survey sheet for recording data with respect to modifying at least one of said first characteristics in order to form a second characteristic different from the correlated first characteristic, and using the survey sheet to transfer the data to the vehicle to modify to the second characteristic which satisfies the user's need, when the vehicle is supplied from a manufacturer and provided to the user.

3. The method for changing characteristics of a vehicle for sale according to claim 1 wherein the user employs a second characteristic information collector including a removable memory device which is able to collect information of at least one of a use of the vehicle, circumstances of the use and favorite characteristics in order to form second characteristics different from the first characteristics, receiving the removable memory from the user and transferring the information stored in the removable memory to the vehicle to modify to the second characteristic which satisfies the user's need when the vehicle is supplied from the manufacturer and provided to the user.

4. The method for changing characteristics of a vehicle for sale according to claim 1 further comprising a step of providing a characteristic entry device for a dealer's use to transfer the data of the second characteristics obtained from the user to the vehicle when the vehicle is supplied from the manufacturer to the dealer so as to accomplish the modification of characteristics of the vehicle required by the user.

5. The method for changing characteristics of a vehicle for sale according to claim 2 further comprising a step of providing a characteristic entry device for a dealer's use to modify the vehicle to the second characteristics based on the data of the survey sheet prior to delivery of the vehicle to the user.

6. The method for changing characteristics of a vehicle for sale according to claim 1 wherein at least one of the electronic devices is one of an engine control device and an automatic transmission, and the data with respect to the second characteristic relates to one of information concerning engine output characteristics and shift pattern of the automatic transmission.

7. The method for changing characteristics of a vehicle for sale according to claim 1 wherein the data with respect to the second characteristic relates to one of drive experience and age, with control gain of the second characteristic being changed as the age or the drive experience is increased.

8. The method for changing characteristics of a vehicle for sale according to claim 2 wherein the data with respect to the second characteristic relates to circumstances of the use and favorite characteristics of the user and wherein the survey sheet is a data entry card or sheet in which a plurality of item names and recording areas corresponding thereto are provided.

9. The method for changing characteristics of a vehicle for sale according to claim 4 wherein the characteristic entry device is constituted by a diagnostic device of a computer.

10. The method for changing characteristics of a vehicle for sale according to claim 4 wherein the characteristic entry device is used by a dealer to transfer the data regarding the second characteristics based on a survey sheet.

11. The method for changing characteristics of a vehicle for sale according to claim 1 wherein at least one of the electronic devices is one of an engine control device and an automatic transmission, and the data relating to second characteristics are one of information concerning engine output characteristics and shift pattern of the automatic transmission.

12. The method for changing characteristics of a vehicle for sale according to claim 1 wherein the second characteristics include data relating to drive experience or age, and control gain of corresponding electronic devices are modified to second characteristics as the age or the drive experience is increased.

13. The method for changing characteristics of a vehicle for sale according to claim 2 wherein the data relates to at least one of a use a vehicle, circumstances of the use and favorite characteristics, with the second characteristics being modified based on data recorded on a data entry card or sheet in which a plurality of item names and recording areas corresponding thereto are provided.

14. The method for changing characteristics of a vehicle for sale according to claim 4 wherein the characteristic entry device is detachably coupled to the vehicle to effect change of the first characteristics to the second characteristics.

15. A method for tuning characteristics of a vehicle to the needs, uses, desires or personal data of a purchaser comprising the steps of:
(1) obtaining a vehicle provided with controlling electronic devices, controllable by a vehicle computer, having first operating gain characteristics,
(2) determining, from a purchaser, data corresponding to second operating gain characteristics different from the first operating gain characteristics, that comply with the purchaser's needs, uses, desires or personal data regarding the operation of the purchased vehicle, and incorporating the determined data in a computer readable medium,
(3) transferring the data onto the computer readable medium corresponding to the second operating gain characteristics to the controlling electronic devices of the vehicle via the vehicle computer to tune the vehicle to the second operating gain characteristics when the vehicle is delivered to the purchaser, and
(4) delivering the vehicle to the purchaser with the vehicle provided with the electronic devices tuned to the second operating gain characteristics.

16. The method for tuning characteristics of a vehicle to the needs, uses, desires or personal data of a purchaser according to claim 15 wherein the purchaser employs a survey sheet for recording data with respect to modifying at least one of said first operating gain characteristics in order to form a second operating gain characteristic different from the correlated first operating gain characteristic, and using a survey sheet to incorporate the data onto the computer readable medium.

17. The method for tuning characteristics of a vehicle for sale according to claim 15 wherein the purchaser employs a second operating gain characteristic information collector that includes a removable memory device which is able to collect information of at least one of a use of the vehicle, circumstances of the use and favorite characteristics in order to form second operating gain characteristics different from the first operating gain characteristics.

18. The method for tuning characteristics of a vehicle for sale according to claim 15 further comprising a step of providing a characteristic entry device for a dealer's use to transfer the data on the computer readable medium of the second operating gain characteristics to the vehicle when the vehicle is received by a dealer from a supplier so as to accomplish the modification of characteristics of the vehicle as required by the purchaser.

19. The method for tuning characteristics of a vehicle for sale according to claim 15 further comprising a step of providing a characteristic entry device for a dealer's use to modify the vehicle to the second operating gain characteristics based on a survey sheet prepared by the purchaser.

20. The method for tuning characteristics of a vehicle for sale according to claim 15 wherein at least one of the electronic devices is one of an engine control device and an automatic transmission, and the data with respect to the second gain characteristic relates to one of information concerning engine output characteristics and shift pattern of the automatic transmission.

21. The method for tuning characteristics of a vehicle for sale according to claim 15 wherein the data with respect to the second operating gain characteristic relates to one of drive experience and age, and the gain of the second operating gain characteristic is controlled according to the age or the drive experience of the purchaser.

22. The method for tuning characteristics of a vehicle for sale according to claim 15 wherein the data with respect to the second operating gain characteristic relates to circumstances of the use and favorite characteristics of the purchaser and wherein a survey sheet in the form of a data entry card or sheet in which a plurality of item names and recording areas corresponding thereto is provided.

23. The method for tuning characteristics of a vehicle for sale according to claim 15 wherein a characteristic entry device is provided that is constituted by a diagnostic device of a computer.

24. The method for tuning characteristics of a vehicle for sale according to claim 23 wherein the characteristic entry device is used by a dealer to transfer the data regarding the second operating gain characteristics based on a purchaser survey sheet.

25. The method for tuning characteristics of a vehicle for sale according to claim 15 wherein at least one of the electronic devices is one of an engine control device and an automatic transmission, and the data relating to second operating gain characteristics relate to one of engine output characteristics and shift pattern of the automatic transmission.

26. The method for tuning characteristics of a vehicle for sale according to claim 15 wherein the second operating gain characteristics include data relating to drive experience or age, and control gain of corresponding electronic devices are modified to second operating gain characteristics proportional to the age or the drive experience.

27. The method for tuning characteristics of a vehicle for sale according to claim 15 wherein the data relates to at least one of a use a vehicle, circumstances of the use and favorite characteristics, with the second operating gain characteristics being modified based on data recorded on the computer readable medium derived from a data entry card or sheet in which a plurality of item names and recording areas corresponding thereto were provided.

28. The method for tuning characteristics of a vehicle for sale according to claim 15 wherein a characteristic entry device is detachably coupled to the vehicle to effect change of the first operating gain characteristics to the second operating gain characteristics.

29. A method for merchandising vehicles to prospective purchasers comprising the steps of:
    (1) offering to a prospective purchaser a vehicle provided with electronic devices having first gain characteristics,
    (2) contracting with the prospective purchaser for sale of the vehicle provided with the electronic devices modified to second gain characteristics that suit the needs, uses, desires, or personal data of the purchaser,
    (3) obtaining the contracted for vehicle provided with electronic devices having said first gain characteristics from a supplier of such vehicles,
    (4) determining, from the purchaser, data corresponding to second gain characteristics different from the first gain characteristics, that comply with the purchaser's needs, uses, desires or personal data regarding the purchased vehicle,
    (5) transferring the data corresponding to the second gain characteristics to the electronic devices of the vehicle to set the vehicle to the second gain characteristics when the vehicle is delivered to the purchaser, and
    (6) delivering the vehicle to the purchaser with the vehicle provided with the electronic devices set to the second gain characteristics.

30. A method for merchandising vehicles to prospective purchasers according to claim 29 wherein the purchaser employs a survey sheet for recording data with respect to modifying at least one of said first gain characteristics in order to form a second gain characteristic different from the correlated first gain characteristic, and using the survey sheet to transfer the data to the computer readable medium.

31. A method for merchandising vehicles to prospective purchasers according to claim 29 wherein the purchaser employs a second gain characteristic information collector that includes a removable memory device which is able to collect information of at least one of a use of the vehicle, circumstances of the use and favorite characteristics in order to form second gain characteristics different from the first gain characteristics.

32. A method for merchandising vehicles to prospective purchasers according to claim 29 further comprising a step of providing a characteristic entry device for a dealer's use to transfer the data of the second gain characteristics on the computer readable medium to the vehicle when the vehicle is received by a dealer from a supplier so as to accomplish the modification of characteristics of the vehicle required by the purchaser.

33. A method for merchandising vehicles to prospective purchasers according to claim 29 further comprising a step of providing a characteristic entry device for a dealer's use to modify the vehicle to the second gain characteristics based on a survey sheet prepared by the purchaser.

34. A method for merchandising vehicles to prospective purchasers according to claim 29 wherein at least one of the electronic devices is one of an engine control device and an automatic transmission, and the data with respect to the second gain characteristic relates to one of engine output characteristics and shift pattern of the automatic transmission.

35. A method for merchandising vehicles to prospective purchasers according to claim 29 wherein the data with respect to the second gain characteristics relates to one of drive experience and an age, and the gain of the second gain characteristic is controlled to age or drive experience of the purchaser.

36. A method for merchandising vehicles to prospective purchasers according to claim 29 wherein the data with respect to the second characteristics relates to circumstances of the use and favorite characteristics of the purchaser, and wherein a survey sheet in the form of a data entry card or sheet in which a plurality of item names and recording areas corresponding thereto is provided.

37. A method for merchandising vehicles to prospective purchasers according to claim 29 wherein a characteristic entry device is provided that is constituted by a diagnostic device of a computer.

38. A method for merchandising vehicles to prospective purchasers according to claim 29 wherein a characteristic entry device is used by a dealer to transfer the data regarding the second gain characteristics based on a purchaser survey sheet.

39. A method for merchandising vehicles to prospective purchasers according to claim 29 wherein at least one of the electronic devices is one of an engine control device and an automatic transmission, and the data relating to second gain characteristics relates to one of engine output characteristics and shift pattern of the automatic transmission.

40. A method for merchandising vehicles to prospective purchasers according to claim 29 wherein the second gain characteristics include data relating to drive experience or age, and gain of corresponding electronic devices are modified to second gain characteristics proportional to the purchaser's age or drive experience.

41. A method for merchandising vehicles to prospective purchasers according to claim 29 wherein the data relates to at least one of a use a vehicle, circumstances of the use and favorite characteristics, with the second gain characteristics being modifications based on data recorded on the computer readable medium derived from a data entry card or sheet in which a plurality of item names and recording areas corresponding thereto were provided.

42. A method for merchandising vehicles to prospective purchasers according to claim 29 wherein a characteristic entry device is detachably coupled to the vehicle to effect change of the first gain characteristics to the second gain characteristics.

* * * * *

UNITED STATES PATENT AND TRADEMARK OFFICE
CERTIFICATE OF CORRECTION

PATENT NO. : 6,230,084 B1
DATED : May 8, 2001
INVENTOR(S) : Takao Kijima, Shin Takehara, Shigefumi Hirabayashi, Tomoko Nagata, Hiroshi Ohmura, Tetsuya Tachihata, Kiyoshi Sakamoto, Tomoji Izumi It is certified that error appears in the above-identified patent and that said Letters Patent is hereby corrected as shown below:

<u>Title page,</u>
Item [75], the name of "Shigerumi Hirabayashi" should read -- Shigefumi Hirabayashi --

Item [62], change "Division of application No. 09/013,302, filed Jan. 26, 1998, now abandoned" should read -- Division of application No. 09/013,302, filed Jan. 26, 1998, Pat. No. 6,205,374, --

Signed and Sealed this

Twenty-second Day of January, 2002

Attest:

*Attesting Officer*

JAMES E. ROGAN
*Director of the United States Patent and Trademark Office*